(12) United States Patent
Mukund et al.

(10) Patent No.: US 11,886,154 B2
(45) Date of Patent: Jan. 30, 2024

(54) SYSTEMS AND METHODS FOR OPTIMIZING REFINERY COKER PROCESS

(71) Applicant: Imubit Israel Ltd., Modiin (IL)

(72) Inventors: Abishek Mukund, Houston, TX (US); Matthew Stephens, Houston, TX (US); Elhanan Ilani, Jerusalem (IL); Ofer Salhov, Houston, TX (US); Nadav Cohen, Yavne (IL)

(73) Assignee: Imubit Israel Ltd., Modiin (IL)

( * ) Notice: Subject to any disclaimer, the term of this patent is extended or adjusted under 35 U.S.C. 154(b) by 0 days.

(21) Appl. No.: 17/968,655

(22) Filed: Oct. 18, 2022

(65) Prior Publication Data

US 2023/0037667 A1    Feb. 9, 2023

Related U.S. Application Data

(63) Continuation of application No. 17/831,227, filed on Jun. 2, 2022, which is a continuation-in-part of application No. 17/384,660, filed on Jul. 23, 2021, which is a continuation-in-part of application No. 17/308,474, filed on May 5, 2021, which is a continuation-in-part of application No. 16/950,643, filed on Nov. 17, 2020, and a continuation-in-part of application No. 16/888,128, filed on May 29, 2020, now Pat. No. 11,494,651, which is a
(Continued)

(51) Int. Cl.
*G05B 13/04*    (2006.01)
*G05B 13/02*    (2006.01)

(52) U.S. Cl.
CPC ......... *G05B 13/048* (2013.01); *G05B 13/027* (2013.01)

(58) Field of Classification Search
CPC ............................ G05B 13/048; G05B 13/027
USPC ............................................................ 700/44
See application file for complete search history.

(56) References Cited

U.S. PATENT DOCUMENTS

| 4,176,052 A | 11/1979 | Bruce et al. |
| 4,374,021 A | 2/1983 | Bartholic |

(Continued)

FOREIGN PATENT DOCUMENTS

| SU | 844626 A1 | 7/1981 |
| WO | WO-2021/025841 A1 | 2/2021 |

OTHER PUBLICATIONS

International Search Report and Written Opinion issued in PCT/US2022/015474 dated May 12, 2022.
(Continued)

*Primary Examiner* — Allen C Wong
(74) *Attorney, Agent, or Firm* — Foley & Lardner LLP

(57) ABSTRACT

A control system for automatic operation of a coker includes a drum feeder operable to modulate a feed of oil into a coke drum of the coker and a controller. The controller is configured to obtain an objective function that defines a control objective as a function of one or more controlled variables affected by modulating the feed of oil into the coke drum and use a predictive model and the objective function to generate a target coker feed rate indicating a target rate at which to feed the oil into the coke drum. The predictive model is configured to predict values of the one or more controlled variables predicted to result from the target coker feed rate. The controller is configured to operate the drum feeder using the target coker feed rate to modulate the feed of oil into the coke drum.

20 Claims, 34 Drawing Sheets

Related U.S. Application Data continuation-in-part of application No. 15/883,114, filed on Jan. 30, 2018, now Pat. No. 11,200,489, said application No. 16/950,643 is a continuation-in-part of application No. 15/883,114, filed on Jan. 30, 2018, now Pat. No. 11,200,489.

(56) References Cited

U.S. PATENT DOCUMENTS

| | | | |
|---|---|---|---|
| 5,311,421 | A | 5/1994 | Nomura et al. |
| 5,825,646 | A | 10/1998 | Keeler et al. |
| 6,246,972 | B1 | 6/2001 | Klimasauskas |
| 7,720,641 | B2 | 5/2010 | Alagappan et al. |
| 9,690,312 | B2 | 6/2017 | Steven et al. |
| 2002/0059202 | A1 | 5/2002 | Hadzikadic et al. |
| 2003/0108244 | A1 | 6/2003 | Li et al. |
| 2006/0178762 | A1 | 8/2006 | Wroblewski et al. |
| 2007/0156288 | A1 | 7/2007 | Wroblewski et al. |
| 2007/0168328 | A1 | 7/2007 | Peralta et al. |
| 2010/0050025 | A1 | 2/2010 | Grichnik et al. |
| 2012/0053762 | A1 | 3/2012 | Stiefenhofer et al. |
| 2015/0185717 | A1 | 7/2015 | Sayyar-Rodsari et al. |
| 2015/0379429 | A1 | 12/2015 | Lee et al. |
| 2016/0258361 | A1 | 9/2016 | Tiwari et al. |
| 2017/0061249 | A1* | 3/2017 | Estrada ............... G06V 10/82 |
| 2017/0139423 | A1 | 5/2017 | El Ferik et al. |
| 2017/0183573 | A1 | 6/2017 | Arora et al. |
| 2018/0016503 | A1* | 1/2018 | Prasad ............... C10G 9/005 |
| 2018/0275692 | A1* | 9/2018 | Lattanzio ............ G01K 3/14 |
| 2019/0236447 | A1 | 8/2019 | Cohen et al. |
| 2020/0074486 | A1 | 3/2020 | Motohashi et al. |
| 2020/0311547 | A1 | 10/2020 | Mukund et al. |
| 2020/0355391 | A1 | 11/2020 | Wenzel et al. |
| 2021/0096518 | A1 | 4/2021 | Ilani et al. |
| 2021/0253956 | A1 | 8/2021 | Jagnanan et al. |
| 2021/0348066 | A1 | 11/2021 | Clark et al. |

OTHER PUBLICATIONS

International Search Report and Written Opinion issued in PCT/US2022/024645 dated Jul. 1, 2022.

International Search Report and Written Opinion issued on PCT/US2021/030723 dated Jul. 28, 2021.

International Search Report and Written Opinion on PCT/IB2021/057421 dated Nov. 4, 2021.

Lawrynczuk,"Predictive Control of a Distillation Column Using a Control-Oriented Neural Model," ICANNGA, 2011, part 1, pp. 230-239.

Lawrynczuk, "Neural Dynamic Matrix Control Algorithm with Disturbance Compensation," IEA/AIE, 2010, part 3, pp. 52-61.

Nguyen et al., "Multiple neural networks for a long term time series forecast", Neural Computing & Applic (2004) 13:90-98 (Year: 2004).

International Search Report and Written Opinion on PCT/US23/22036 dated Aug. 4, 2023.

Chang A I et al: "Advanced control project stabilizes delayed coker, increases throughput", Oil and Gas Journal, Pennwell, Houston, TX, US vol. 99, No. 34 Aug. 20, 2001 (Aug. 20, 2001), pp. 52-56.

Extended European Search Report issued in EP application No. 21813354.4 dated Nov. 20, 2023.

Yu, et al., "Implementation of neural network predictive control to a multivariable chemical reactor", Control Engineering Practice 11 92003) 1315-1323 (Year: 2003).

Zahedi Gholamreza et al: A Neural Network Approach for Identification and Modeling of Delayed Coking Plant:, International Journal of Chemical Reactor Engineering, [Online] vol. 7, No. 1, May 6, 2009.

* cited by examiner

Neural Network Predicts Actual Coke Rate Resulting From Actual Coker Feed Rate and Real-Time System Conditions

SYSTEMS AND METHODS FOR OPTIMIZING REFINERY COKER PROCESS

CROSS-REFERENCE TO RELATED PATENT APPLICATIONS

This application is a continuation of U.S. patent application Ser. No. 17/831,227 filed Jun. 2, 2022, which is a continuation-in-part of U.S. patent application Ser. No. 17/384,660 filed Jul. 23, 2021, which is a continuation-in-part of U.S. patent application Ser. No. 17/308,474 filed May 5, 2021, which is a continuation-in-part of U.S. patent application Ser. No. 16/888,128 filed May 29, 2020, which is a continuation-in-part of U.S. patent application Ser. No. 15/883,114 filed Jan. 30, 2018 (now U.S. Pat. No. 11,200,489). U.S. patent application Ser. No. 17/308,474 is also a continuation-in-part of U.S. patent application Ser. No. 16/950,643 filed Nov. 17, 2020, which is a continuation-in-part of U.S. patent application Ser. No. 15/883,114 filed Jan. 30, 2018 (now U.S. Pat. No. 11,200,489). The entire disclosures of each of these patent applications and patents are incorporated by reference herein.

BACKGROUND

The present application relates to optimizing oil refinery processes. More particularly, the present application relates to optimizing coke production in an oil refinery system using a neural network.

SUMMARY

One implementation of the present disclosure is a control system for automatic operation of a coker. The control system includes a drum feeder operable to modulate a feed of oil into a coke drum of the coker and a controller including a processing circuit. The processing circuit is configured to obtain an objective function that defines a control objective as a function of one or more controlled variables affected by modulating the feed of oil into the coke drum and use a predictive model and the objective function to generate a target coker feed rate indicating a target rate at which to feed the oil into the coke drum. The predictive model configured to predict values of the one or more controlled variables predicted to result from the target coker feed rate. The processing circuit is further configured to operate the drum feeder using the target coker feed rate to modulate the feed of oil into the coke drum.

In some embodiments, the control objective defined by the objective function is a function of a target coke rate indicating a target rate at which to accumulate coke within the coke drum.

In some embodiments, the controller is configured to generate the target coker feed rate by performing a model predictive control (MPC) process using the predictive model and the objective function, the predictive model defines a relationship between the target coker feed rate and the values of the one or more controlled variables predicted to result from the target coker feed rate, and performing the MPC process includes the objective function to generate an optimal value of the target coker feed rate which optimizes the control objective according to the relationship defined by the predictive model.

In some embodiments, the predictive model includes a predictor neural network configured to predict the values of the one or more controlled variables based on values of one or more manipulated variables comprising the target coker feed rate and the controller is configured to generate the target coker feed rate by training a controller neural network using the predictor neural network and the objective function and using the controller neural network to generate the values of the one or more manipulated variables comprising the target coker feed rate based on a current state of the coker.

In some embodiments, the predictive model includes a predictor neural network configured to generate a gains matrix based on a current state of the coker and the controller is configured to generate the target coker feed rate by using the gains matrix to predict the values of the one or more controlled variables predicted to result from values of one or more manipulated variables comprising the target coker feed rate and performing an optimization process to determine optimal values of the one or more manipulated variables comprising the target coker feed rate according to a relationship between the values of the one or more controlled variables and the values of the one or more manipulated variables defined by the gains matrix.

In some embodiments, the predictive model includes a predictor neural network configured to generate a gains matrix based on a current state of the coker and the controller is configured to generate the target coker feed rate by training a controller neural network using the gains matrix to predict the values of the one or more controlled variables predicted to result from values of one or more manipulated variables comprising the target coker feed rate and using the controller neural network to generate the values of the one or more manipulated variables comprising the target coker feed rate based on the current state of the coker.

In some embodiments, the predictive model includes a predictor neural network configured to generate a plurality of gains matrices using a set of historical state data for the coker and the controller is configured to generate the target coker feed rate by training a controller neural network using the set of gains matrices to predict the values of the one or more controlled variables predicted to result from values of one or more manipulated variables comprising the target coker feed rate and using the controller neural network to generate the values of the one or more manipulated variables comprising the target coker feed rate based on a current state of the coker.

Another implementation of the present disclosure is a controller for automatic operation of a coker. The controller includes a processing circuit configured to obtain an objective function that defines a control objective as a function of one or more controlled variables affected by modulating a feed of oil into a coke drum of the coker and use a predictive model and the objective function to generate a target coker feed rate indicating a target rate at which to feed the oil into the coke drum. The predictive model is configured to predict values of the one or more controlled variables predicted to result from the target coker feed rate. The processing circuit is further configured to operate a drum feeder using the target coker feed rate to modulate the feed of oil into the coke drum.

In some embodiments, the control objective defined by the objective function is a function of a target coke rate indicating a target rate at which to accumulate coke within the coke drum.

In some embodiments, the processing circuit is configured to generate the target coker feed rate by performing a model predictive control (MPC) process using the predictive model and the objective function, the predictive model defines a relationship between the target coker feed rate and the values of the one or more controlled variables predicted to result from the target coker feed rate, and performing the MPC process includes optimizing the objective function to generate an optimal value of the target coker feed rate which optimizes the control objective according to the relationship defined by the predictive model.

In some embodiments, the predictive model includes a predictor neural network configured to predict the values of the one or more controlled variables based on values of one or more manipulated variables comprising the target coker feed rate and the processing circuit is configured to generate the target coker feed rate by training a controller neural network using the predictor neural network and the objective function and using the controller neural network to generate the values of the one or more manipulated variables comprising the target coker feed rate based on a current state of the coker.

In some embodiments, the predictive model includes a predictor neural network configured to generate a gains matrix based on a current state of the coker and the processing circuit is configured to generate the target coker feed rate by using the gains matrix to predict the values of the one or more manipulated variables predicted to result from values of one or more manipulated variables comprising the target coker feed rate and performing an optimization process to determine optimal values of the one or more manipulated variables comprising the target coker feed rate according to a relationship between the values of the one or more controlled variables and the values of the one or more manipulated variables defined by the gains matrix.

In some embodiments, the predictive model includes a predictor neural network configured to generate a gains matrix based on a current state of the coker and the processing circuit is configured to generate the target coker feed rate by training a controller neural network using the gains matrix to predict the values of the one or more controlled variables predicted to result from values of one or more manipulated variables comprising the target coker feed rate and using the controller neural network to generate the values of the one or more manipulated variables comprising the target coker feed rate based on the current state of the coker.

In some embodiments, the predictive model includes a predictor neural network configured to generate a plurality of gains matrices using a set of historical state data for the coker and the processing circuit is configured to generate the target coker feed rate by training a controller neural network using the set of gains matrices to predict the values of the one or more controlled variables predicted to result from values of one or more manipulated variables comprising the target coker feed rate and using the controller neural network to generate the values of the one or more manipulated variables comprising the target coker feed rate based on a current state of the coker.

Another implementation of the present disclosure is a method for automatic operation of a coker. The method includes obtaining an objective function that defines a control objective as a function of one or more controlled variables affected by modulating one or more manipulated variables provided as inputs to the coker and using a predictive model and the objective function to generate values of the one or more manipulated variables. The predictive model is configured to predict values of the one or more controlled variables predicted to result from the values of the one or more manipulated variables. The method further includes operating controllable equipment of the coker to modulate the one or more manipulated variables provided as inputs to the coker.

In some embodiments, the method includes generating the values of the one or more manipulated variables by performing a model predictive control (MPC) process using the predictive model and the objective function. In some embodiments, the predictive model defines a relationship between the values of the one or more manipulated variables and the values of the one or more controlled variables predicted to result from the values of the one or more manipulated variables. Performing the MPC process may include optimizing the objective function to generate optimal values of the one or more manipulated variables which optimize the control objective according to the relationship defined by the predictive model.

In some embodiments, the predictive model includes a predictor neural network configured to predict the values of the one or more controlled variables based on the values of the one or more manipulated variables. Generating the values of the one or more manipulated variables may include training a controller neural network using the predictor neural network and the objective function and using the controller neural network to generate the values of the one or more manipulated variables based on a current state of the coker.

In some embodiments, the predictive model includes a predictor neural network configured to generate a gains matrix based on a current state of the coker. Generating the values of the one or more manipulated variables may include using the gains matrix to predict the values of the one or more controlled variables predicted to result from the values of the one or more manipulated variables and performing an optimization process to determine optimal values of the one or more manipulated variables according to a relationship between the values of the one or more controlled variables and the values of the one or more manipulated variables defined by the gains matrix.

In some embodiments, the predictive model includes a predictor neural network configured to generate a gains matrix based on a current state of the coker. Generating the values of the one or more manipulated variables may include training a controller neural network using the gains matrix to predict the values of the one or more controlled variables predicted to result from the values of one or more manipulated variables and using the controller neural network to generate the values of the one or more manipulated variables based on the current state of the coker.

In some embodiments, the predictive model includes a predictor neural network configured to generate a plurality of gains matrices using a set of historical state data for the coker. Generating the values of the one or more manipulated variables may include training a controller neural network using the set of gains matrices to predict the values of the one or more controlled variables predicted to result from the values of one or more manipulated variables and using the controller neural network to generate the values of the one or more manipulated variables based on a current state of the coker.

DETAILED DESCRIPTION

Overview

Referring generally to the FIGURES, systems and methods optimizing coke production in an oil refinery process are shown, according to exemplary embodiments. In some embodiments, the systems and methods disclosed herein determine a rate for the amount of coke being generated (e.g., a coke rate) within a coke drum and use a trained neural network to determine a rate at which to feed the coke drum (e.g., a target feed rate) that will cause the coke to be generated at the determined coke rate. In some embodiments, the neural network can generate a target coke rate that will optimize coke production and remain feasible based on constraints from the feeder, user preferences, and system operations. The neural network can be trained using hundreds or thousands of previously performed drum cycle batches and their respective historical coke rates.

Oil Refinery Process Overview

Figure 1:
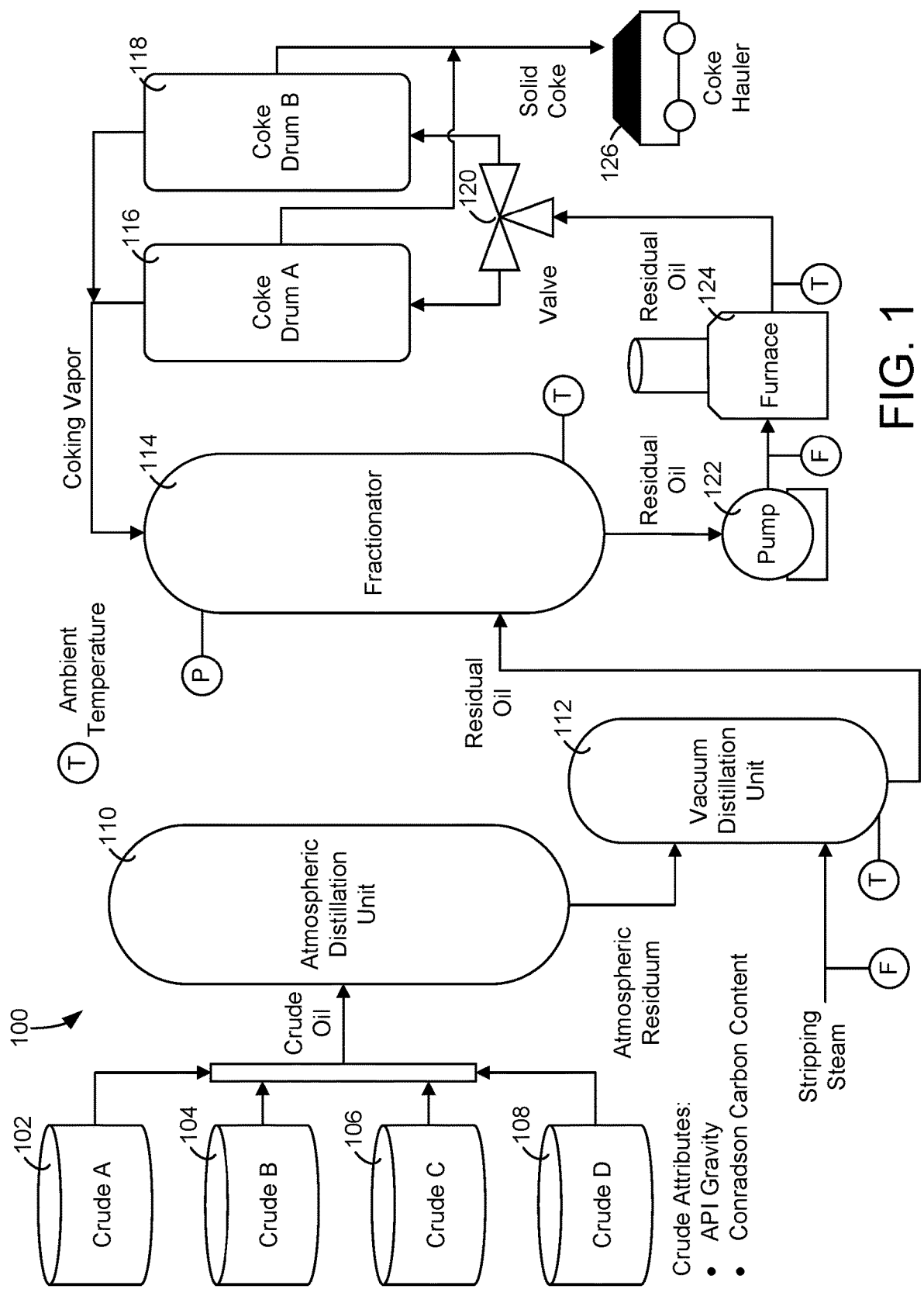
FIG. 1 is a diagram of a petroleum refinery system, accordingly to some embodiments.

Referring now to FIG. 1, a system 100 for refining petroleum to transform crude oil (or other crude petroleum products) into more useful products (e.g., gasoline, petrol, kerosene, etc.) is shown, according to exemplary embodiments. FIG. 1 depicts a general system for refining crude oil, but systems including other refinery tools (e.g., a de-salter for the crude oil, hydrocrackers, hydrotreaters, etc.), different configurations of system 100 that include the same components, more or less drums and/or storage containers, and other modifications to system 100 can be considered. System 100 is shown to include crude oil storage tanks (e.g., "oil tanks") 102-108, atmospheric distillation unit (ADU) 110, vacuum distillation unit (VDU) 112, fractionator 114, coke drums 116,118, valves 120, pump 122, furnace 124, and coke hauler 126.

Before describing the components of system 100 in detail, it is noted that although system 100 is described primarily as refining oil, it should be understood that the systems and methods described herein can be used to refine or produce any of a variety of petroleum products. For example, system 100 can be operated to produce butane, methane, diesel fuel, fuel oil, gasoline, kerosene, liquefied natural gas, liquefied petroleum gas, propane, microcrystalline wax, napalm, naphtha, naphthalene, paraffin wax, petroleum jelly, petroleum wax, refined asphalt, refined bitumen, refined petroleum gas, slack wax, sulfur, petroleum coke, petrochemicals, or any other type of petroleum product. In general, system 100 may be configured to convert one or more input petroleum products into one or more output or derived petroleum products. Although system 100 is described primarily as producing petroleum coke (referred to herein as "coke") as the derived petroleum product, it should be understood that the systems and methods described herein can be applied to any type of petroleum product without departing from the teachings of the present disclosure.

Oil tanks 102-108 may represent the mechanical components and/or methods for storing and providing petroleum into system 100. As disclosed herein, the terms "petroleum" and "crude oil" may be used interchangeably when referring to the mixture of hydrocarbons received prior to oil refining. In some embodiments, the oil stored in oil tanks 102-108 has an American Petroleum Institute (API) gravity of 15-45 degrees, wherein a high API indicates a lower density crude oil and a low API indicates a higher density crude oil. In some embodiments, the oil stored in oil tanks 102-108 has a lower or higher API gravity. In some embodiments, the level of concarbon content (CCR) (e.g., Conradson carbon residue, etc.) is measured to provide an indication of the coke-forming tendencies of the crude oil, prior to providing crude oil to system 100 via oil tanks 102-108. The crude oil stored in oil tanks 102-108 may be recovered through various forms of oil drilling and/or natural petroleum springs. A pumping system may then transfer the received crude oil to store in oil tanks 102-108 and provide the crude oil into atmospheric distillation unit 110.

ADU 110 may be configured to superheat the received crude oil to temperatures that separate the crude oil into its various naturally-occurring components, such as gasoline, kerosene, diesel, fuel oil, and residual oil. While FIG. 1 shows a single atmospheric distillation unit, system 100 may include any number of atmospheric and/or vacuum distillation units for refining the crude oil. Additionally, the crude oil may be preheated (e.g., by a furnace, by one or more tube-still heaters, etc.) such that the crude oil enters ADU 110 at a temperature where some or most of the crude oil is already vaporized. For example, crude oil may be preheated to a temperature of 250-260° C. The oil then enters a tube-still heater to reach a temperature of 350-360° C., where it is then fed into ADU 110. Upon entering ADU 110, the crude oil is further heated to increase vaporization of the crude oil. The vapor rises within ADU 110 and separates to fractions (e.g., subcomponents, layers, levels, etc.). These fractions may be determined by the temperature at which the vapor phase changes back into a liquid. As such, once the vapor reaches an appropriate fraction layer, the vapor changes back into a liquid and is successfully separated into a distillate of the crude oil. Various distillates may be produced via ADU 110, including light distillates (e.g., liquid petroleum gasoline (LPG), gasoline, naphtha, etc.), middle distillates (e.g., kerosene, jet fuel, diesel, etc.), heavy distillates (e.g., fuel oil, etc.), and residuum (e.g., heavy fuel oil, lubricating oils, vax, asphalt, etc.). In a general embodiment, light distillates may have a boiling point around 150-200° C., middle distillates may have a boiling point around 250-300° C., heavy distillates may have a boiling point around 300-350° C., and residuum may have a boiling point around 350° C. and above. The processes performed by ADU 110 may be referred to a fractional distillation or fractionation. ADU 110 is shown providing the distilled residuum to VDU 112 for further distillation.

VDU 112 may act as another process for distilling petroleum products in a heated container. As shown in FIG. 1, the crude oil residuum is provided to VDU 112 for further distillation. System 100 further shows stripping steam entering VDU 112, which may be included in the distillation process. The stripping steam may be controlled based on flow measurements taken by flow sensors, prior the stripping steam entering VDU 112. VDU 112 may perform vacuum distillation, a process similar to ADU 110, but in a vacuum or close to a vacuum (e.g., 10 mmHg, 20 mmHg, etc.). This process for distilling crude oils may help to produce petroleum products from heavier oils left over from atmospheric distillation, as the low pressure in the vacuum decreases the boiling point for the petroleum products in the crude oil. VDU 112 may produce similar distillates as ADU 110 and decrease the overall residuum left over after distillation. However, residuum from the vacuum distillation of VDU 112 may still be present, and is sent to fractionator 114 for further processing.

Fractionator 114 (in combination with pump 122, furnace 124, and drums 116,118) may be configured to act as a coking system and convert the residual oil from VDU 112 into more distillates, such as hydrocarbon gases, naphtha, gas oils, and coke. Fractionator 114 may be similar to ADU 110 in that it separates the feed (e.g., received crude oil) and separates the feed into various distillates using heat. In a general embodiment, fractionator 114, coke drums 116,118, valves 120, pump 122, and furnace 124 are all part of a coker system (e.g., coker process, coker unit, etc.) configured to process the residual oil received in fractionator 114.

For example, residual oil enters fractionator 114 via VDU 112. Pumping the incoming residual oil into the bottom of fractionator 114, rather than directly into furnace 124, preheats the residual oil by having it contact hot vapors (e.g., coking vapor, gas oil vapors, etc.) in the bottom of fractionator 114. Additionally, some of the hot vapors may condense into a high-boiling liquid, recycling back into furnace 124 along with the heated residual oil. The temperature inside of fractionator 114 may be measured by one or more temperature sensors, as shown in FIG. 1.

The residual oil is then pumped through pump 122 to furnace 124. Here, the residual oil is heated to a cracking temperature (e.g., 480° C.) at which the long hydrocarbon molecules of the residual oil break, converting the residual oil into lighter components (e.g., gas oil, etc.) and petroleum coke. To mitigate deposition of coke within piping to coke drums 116,118, steam may be injected into fractionator 114 along with the residual oil (not shown in FIG. 1). Cracking continues to occur in coke drums 116,118 as gas oil and other distillates turn into vapor and return to fractionator 114. The solid coke is deposited into coke drum 116 via operation of valve 120. Once coke drum 116 is filled (e.g., reached its intended fill point, reached a drum outage target of zero, etc.), coke drum 118 is opened and coke drum 116 is closed. The heated residual oil from furnace 124 is routed to the second drum (coke drum 118). While filling coke drum 118, coke drum 116 is steamed out (e.g., forcibly injected with steam) to lower the hydrocarbon content within the coke. Once one or more coke drums are filled, the coke is discharged from the drums and hauled away via coke hauler 126.

As disclosed herein, coke may refer to any raw petroleum coke (e.g., green coke) produced in a coker (e.g., a delayed coker, a non-delayed coker, etc.). The coke may include any combination of components including carbon, hydrogen, nitrogen, sulfur, and ash. Additionally, the coke may include any combination of metals, including aluminum, boron, calcium, chromium, cobalt, iron, manganese, magnesium, molybdenum, nickel, potassium, silicon, sodium, titanium, and vanadium. In a general embodiment, the coke is mostly carbon byproducts from the heavy distillates produced in ADU 110.

Coker Process Control System

Figure 2:
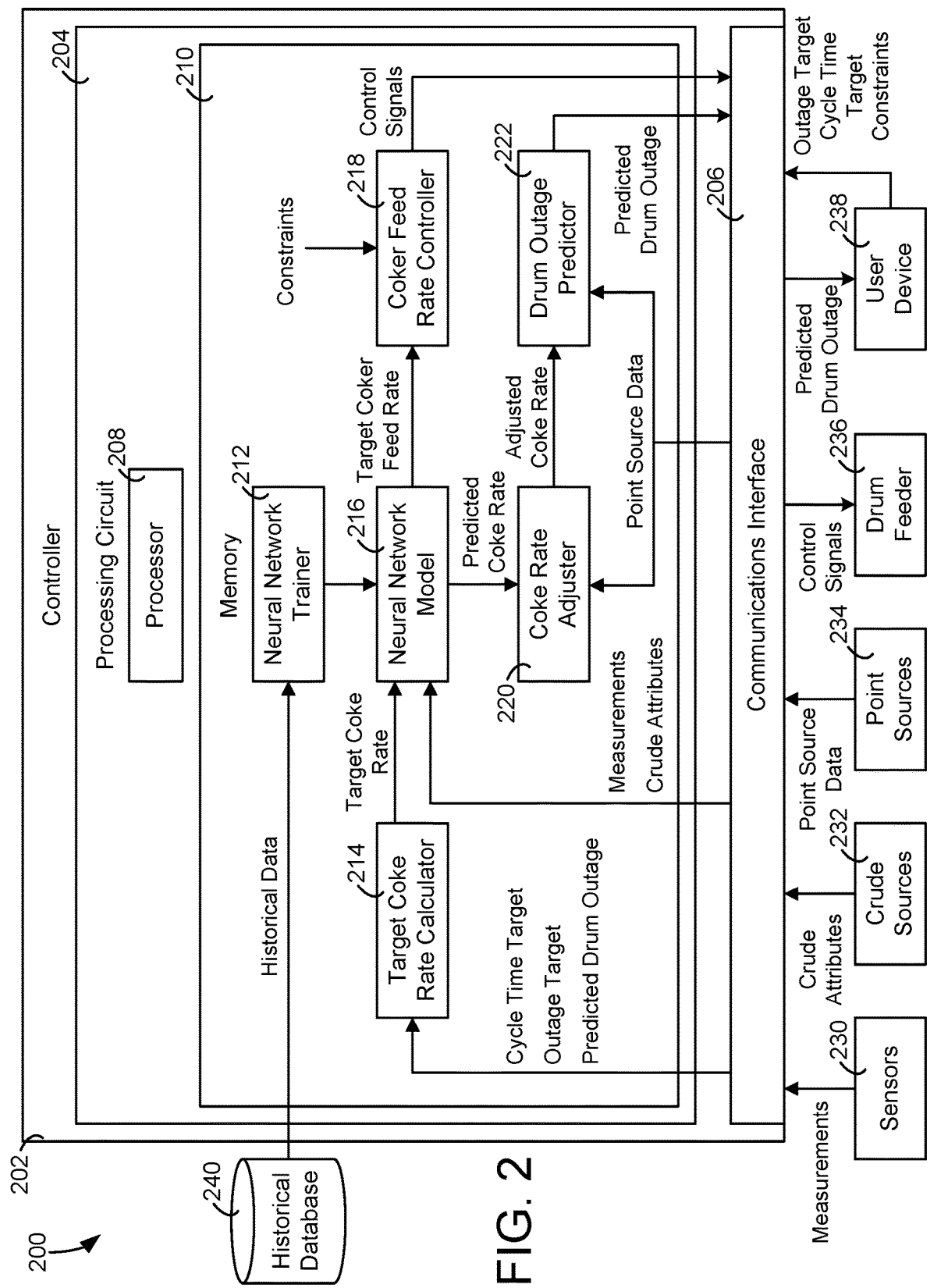
FIG. 2 is a block diagram of a controller, which can be used to control the system of FIG. 1, according to some embodiments.

Referring now to FIG. 2, a system 200 for monitoring, controlling, and optimizing the processing for refining residual oil in a coker unit is shown, according to some embodiments. System 200 is shown to include controller 202 and other components (e.g., sensors 230, crude sources 232, point sources 234, drum feeder 236, user device 238, etc.) and can include some or all parts of system 100 as shown in FIG. 1. Controller 202 may be configured to perform site linear programming (LP), real time optimization (RTO), base control, and control logic based on a neural net, processes that are described in greater detail below. In some embodiments, controller 202 is implemented within a single computer (e.g., one server, one housing, etc.). In various other embodiments controller 202 can be distributed across multiple servers or computers (e.g., that can exist in distributed locations).

Controller 202 is shown to include a communications interface 206 and a processing circuit 204. Communications interface 206 may facilitate communications between controller 202 and external applications (e.g., point sources 234, drum feeder 236, etc.) for allowing control, monitoring, and adjustment to controller 202. Communications interface 206 may also facilitate communications between controller 366 and various user devices (e.g., user device 238, etc.).

Communications interface 206 can be or include wired or wireless communications interfaces (e.g., jacks, antennas, transmitters, receivers, transceivers, wire terminals, etc.) for conducting data communications with external systems or devices. In various embodiments, communications via communications interface 206 can be direct (e.g., local wired or wireless communications) or via a communications network (e.g., a WAN, the Internet, a cellular network, etc.). For example, communications interface 206 can include an Ethernet card and port for sending and receiving data via an Ethernet-based communications link or network. In another example, communications interface 206 can include a Wi-Fi transceiver for communicating via a wireless communications network. In another example, communications interface 206 can include cellular or mobile phone communications transceivers. In one embodiment, communications interface 206 is a power line communications interface. In other embodiments, communications interface 206 is an Ethernet interface.

Processing circuit 204 is shown to include a processor 208 and memory 210. Processing circuit 204 can be communicably connected to communications interface 206 such that processing circuit 204 and the various components thereof can send and receive data via communications interface 206. Processor 208 can be implemented as a general purpose processor, an application specific integrated circuit (ASIC), one or more field programmable gate arrays (FPGAs), a group of processing components, or other suitable electronic processing components.

Memory 210 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 210 can be or include volatile memory or non-volatile memory. Memory 210 can include database components, object code components, script components, or any other type of information structure for supporting the various activities and information structures described in the present application. According to an exemplary embodiment, memory 210 is communicably connected to processor 208 via processing circuit 204 and includes computer code for executing (e.g., by processing circuit 204 and/or processor 208) one or more processes described herein. Memory 210 is shown to include neural network trainer 212, target coke rate calculator 214, neural network model 216, coker feed rate controller 218, coke rate adjuster 220, and drum outage predictor 222.

Neural network trainer 212 can be configured to train (e.g., create, generate, improve, update, optimize, etc.) a neural network model 216 implemented within controller 202. This may be performed by receiving historical data from historical database 240 and using the historical data as training data to improve the neural network model 216. For example, neural network trainer 212 receives time stamps (e.g., date, hour, minute, and second) of when a coke drum (e.g., coke drum 116) begins filling up with coke and when it reaches the intended fill point (e.g., outage of zero). Neural network trainer 212 may process this data for hundreds or thousands of previously ran coke batches in coke drum 116 to train the neural network model 216.

Neural network model 216 can be configured to act as an artificial neural network capable of learning to perform and improve upon tasks relating to controlling oil refinery processes. Particularly, neural network model 216 receives training information from neural network trainer 212, target coke rate information from target coke rate calculator 214, and real-time system conditions to make predictions (e.g., target coker feed rates, predicted coke rates, etc.) based on trained neural network model 216. Neural network model 216 may be configured to perform control logic based on a neural net to optimize the coke production in the drums of system 100. The neural network may be a control technique that processes historical points, operational and environmental constraints, economic goals, and point data to generate nonlinear models. The various differences between the neural network and base control are described throughout the application. Additionally, the neural network may be referred to as a processing component for implementing control logic or a control decision. Accordingly, the term, "neural network" may refer to implementation of target coker feed rates or predicted coke rates from neural network model 216.

Advantageously, neural network model 216 can be configured to model the relationship between the rate at which coke accumulates within coke drums 116,118 (i.e., the coke rate) and the rate at which residual oil (or other feed material) is fed into coke drums 116,118 (i.e., the coker feed rate). Neural network model 216 may model this relationship as a function of a variety of system conditions including, for example, the API gravity of the crude oil entering system 100, the crude concarbon content of the crude oil entering system 100, ambient temperature, the flow rate of the stripping steam in vacuum distillation unit 112, the flash zone temperature of vacuum distillation unit 112, the overhead pressure within fractionator 114, the flash zone temperature within fractionator 114, the outlet temperature of the residual oil exiting furnace 124, or any other factor that may impact the relationship between coker feed rate and coke rate. These types of system conditions are shown in FIG. 2 as measurements from sensors 230 (e.g., the various sensors shown in FIG. 1) and crude attributes from crude sources 232.

In some embodiments, neural network model 216 uses the modeled relationship between coker feed rate and coke rate to predict a target coker feed rate needed to achieve a target coke rate in view of current system conditions (e.g., measurements, crude attributes, etc.). For example, a target coke rate can be calculated by target coke rate calculator 214 (described in greater detail with reference to FIGS. 3-4) and provided as an input to neural network model 216. Neural network model 216 can use the target coke rate calculator 214 in combination with measurements from sensors 230 and crude attributes from crude sources 232 to generate a target coker feed rate predicted to result in coke accumulating within coke drums 116,118 at the target coke rate. The target coker feed rate can be provided to coker feed rate controller 218, which generates control signals for drum feeder 236. The control signals may cause drum feeder 236 to feed residual oil (or other feed material) into coke drums 116,118 at the target coker feed rate. In some embodiments, coker feed rate controller 218 applies a set of constraints to the target coker feed rate and makes adjustments to the control signals, as described in greater detail with reference to FIGS. 14-16.

In some embodiments, neural network model 216 uses the modeled relationship between coker feed rate and coke rate to predict a coke rate that will result from the actual coker feed rate in view of current system conditions (e.g., measurements, crude attributes, etc.). For example, neural network model 216 may receive measurements or other data indicating the actual coker feed rate at which drum feeder 236 is operating. Neural network model 216 may predict the coke rate as a function of the coker feed rate and provide the predicted coke rate to coke rate adjuster 220. Coke rate adjuster 220 can be configured to adjust the predicted coke rate using the point source data from point sources 234, as described in greater detail with reference to FIGS. 10-11. The adjusted coke rate can be provided as an input to drum outage predictor 222, which determines the drum outage (i.e., an amount of empty space in whichever drum 116,118 is currently being filled) as a function of the adjusted coke rate, as described in greater detail with reference to FIGS. 12-13. The predicted drum outage can be provided as an output to user device 238 via communications interface 206 and/or used internally by controller 202 (e.g., by coker feed rate controller 218) to control the various devices of systems 100-200.

Target Coke Rate Calculator

Figure 3:
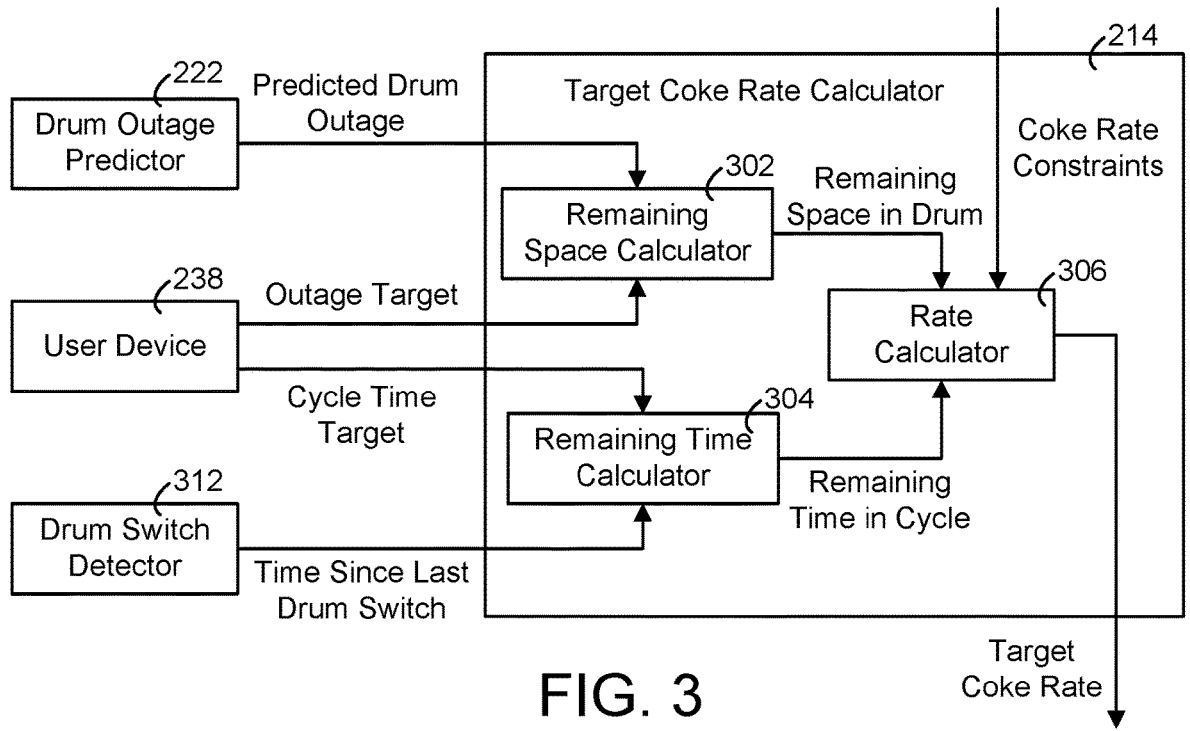
FIG. 3 is a block diagram of a target coke rate calculator, which can be implemented by the controller of FIG. 2, according to some embodiments.

Referring now to FIG. 3, a detailed block diagram of target coke rate calculator 214 is shown, according to exemplary embodiments. Target coke rate calculator 214 can be configured to determine the target rate at which to accumulate coke within coke drums 116,118, referred to herein as the "target coke rate." In some embodiments, the target coke rate is specified as a time rate of change in the coke level (e.g., ft./min., inches/second, cm/second, m/min, etc.). The target coke rate may be calculated in order to achieve a desired outage target within a desired amount of time. Target coke rate calculator 214 may take into account cycle time targets, outage targets, predicted drum outages, and other criteria to determine a target coke rate. As described herein, a target coke rate can refer to the desired rate at which to generate coke in coke drums 116,118. For example, if coke has been generated up to the 4 m mark (e.g., which can be determined by point source data, etc.) in coke drum 116 after 20 minutes, coke drum 116 may be filling up at an average coke rate of 0.2 m/min. In some embodiments, the coke rate may be recalculated after a certain predetermined period of time (e.g., 5 min, 10 min, etc.). This may be referred to as a neural network step. In some embodiments, the neural network step is a constant interval of time that allows control decisions to be made at every step. Similar embodiments are described in greater detail with reference to FIGS. 3-4.

Target coke rate calculator 214 is shown receiving a predicted drum outage from drum outage predictor 222 and an outage target from user device 238. Target coke rate calculator 214 can be configured to determine a target coke rate that satisfies user constraints (e.g., outage target, etc.) and coke rate constraints. In a general embodiment, drum outage predictor 222 is a module within controller 202 responsible for predicting the drum outage within a coke drum. As disclosed herein, drum outage or simply "outage" can refer to the difference between the absolute maximum fill level in the drum and the current fill level within the drum. When the target outage level is determined to be reached, the drum cycle may be considered complete and the coke is emptied from the drum. For example, if coke drum 116 is 20 m tall, the target outage level may be 12 m, allowing 12 m of height above the fill level for potential foam-over, space for coking vapor, etc. Once 12 m of outage is reached, the coke is emptied from coke drum 116.

In some embodiments, the outage target is received from a user device 238. Selecting an appropriate outage target may ensure efficient operation of system 100. For example, if the outage target is too low (i.e., the absolute maximum fill level and actual fill level are too close) coke drum 116 may "foam over." Foam exists in coke drums as the hot vapors of the disengaging gasses separate from the coal tar pitch in the crude oil in the coke drum. As the coke drum begins to fill up with solid coke, the liquid level and the foaming head are pushed up. If left unchecked, the foam may approach the top of the coke drum and potentially exit the drum, inducing foam-over. Conversely, if the outage target is too high (i.e., the absolute maximum fill level and actual fill level are too far distanced), coke yield may be significantly decreased and hinder productivity.

Drum outage predictor 222 may predict the current drum outage based on the point source data received by point sources 234 to optimize coke production. Point sources 234 may include past or present data relating to the density and/or other characteristics of the crude oil/coke composition within the coke drum, which provides an indication of where the coke is presently located within in the drum. This, combined with a determined coke rate (e.g., via neural network model 216 and coke rate adjuster 220) allows drum outage predictor 222 to predict the current drum outage level and provide the current drum outage level to target coke rate calculator 214. The operations performed by drum outage predictor 222 are described in greater detail with reference to FIGS. 12-13. The predicted drum outage is received by remaining space calculator 302.

Remaining space calculator 302 can use the predicted drum outage and outage target to calculate the remaining space in the drum. In some embodiments, this is done by subtracting the outage target from the predicted drum outage. The remaining space in the drum represents the amount of space that needs to be filled to reach the outage target. For example, if the outage target is 12 m and the current/predicted drum outage is 16.1 m, the remaining space in the drum is the difference between 16.1 m and 12 m (i.e., 4.1 m). In some embodiments, the outage target, as well as various other targets or measurements, may be measured, provided, and/or monitored using measurements measured via the metric system (e.g., m, etc.). The outage target is shown to be provided by user device 238. User device 238 may be one or more smartphones, computers, tablets, or other personal device configured to provide control instructions to controller 202. In some embodiments, user device 238 is a workstation within or near system 100. In a general embodiment, target coke rate calculator 214 (e.g., via remaining space calculator 302) determines the amount of remaining space to be filled in the drum by subtracting the outage target (received by user device 238) from the predicted drum outage (received by drum outage predictor 222). Remaining space calculator 302 then provides the determined remaining space in the coke drum to rate calculator 306. Rate calculator 306 is shown to receive another set of data from remaining time calculator 304.

Figure 9:
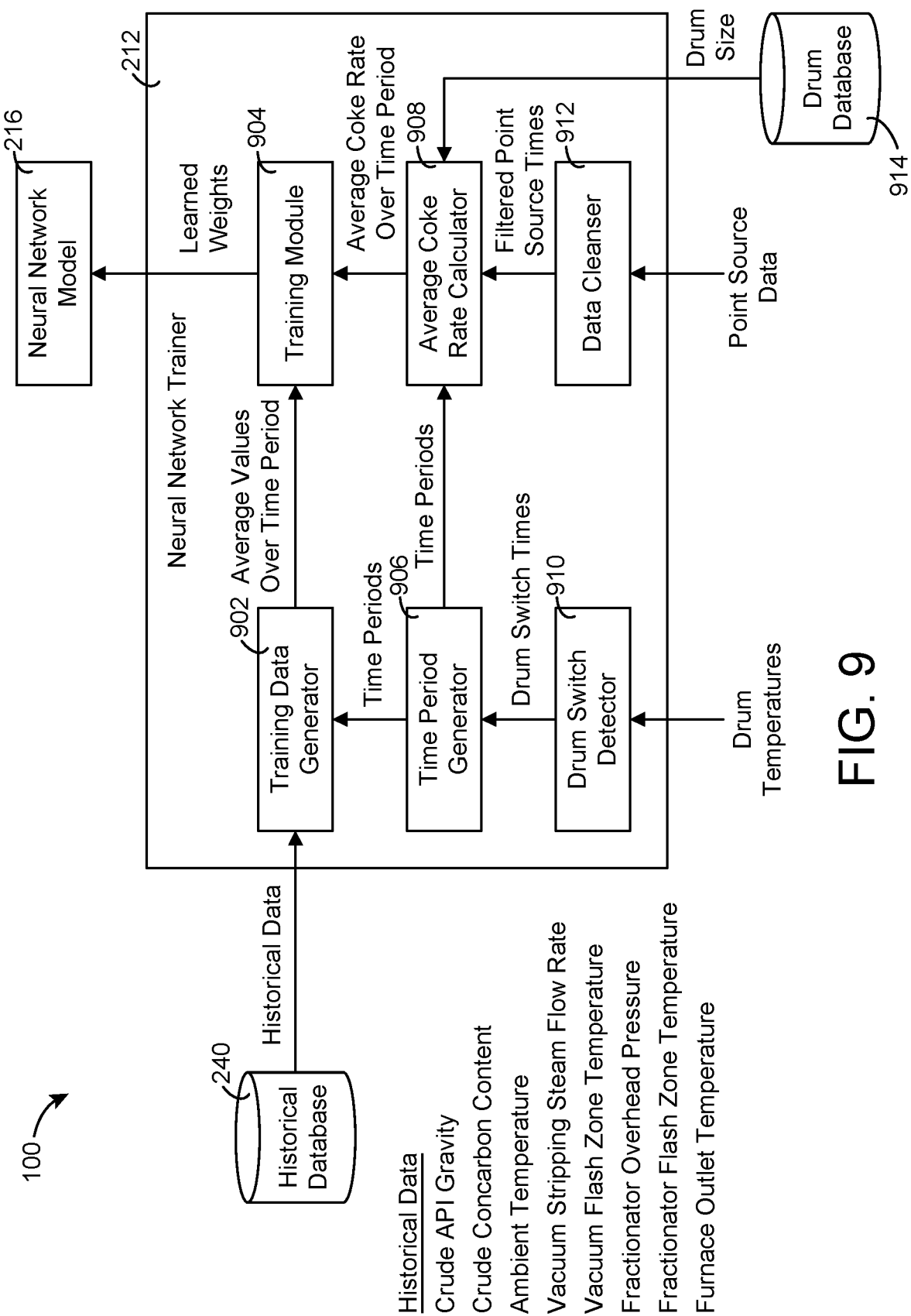
FIG. 9 is a block diagram of a neural network trainer, which can be implemented by the controller of FIG. 2, according to some embodiments.

Remaining time calculator 304 can be configured to determine the remaining time left within the cycle (e.g., period for generating a complete batch of coke within the coke drum, etc.). In an exemplary embodiment, user device 238 provides a cycle time target to remaining time calculator 304. This may indicate the total amount of time within which the user (e.g., system operator, control team, engineer, etc.) wishes to complete the cycle. Remaining time calculator 304 is shown to receive a time since the last drum switch from drum switch detector 312. Drum switch detector 312 may be another module within controller 202 (e.g., within neural network trainer 212 as shown in FIG. 9, etc.) configured to determine the time since the last drum switch. These outputs may be based on drum time data and/or drum temperature data received by various sensors 230 located within system 100. In other embodiments, the data is received from historical database 240. Once remaining time calculator 304 receives a cycle time target and the time since the last drum switch, remaining time calculator 304 determines the amount of remaining time in the drum cycle by subtracting the time elapsed since the last drum switch from the cycle time target. For example, if the cycle time target is 3 hours and the time since the last drum switch is 2.5 hours, remaining time calculator 304 may determine that 0.5 hours remain in the current drum cycle. Remaining time calculator 304 may then provide the remaining time in the cycle to rate calculator 306.

Rate calculator 306 can be configured to determine a target coke rate at which to generate coke within the coke drum, based on (i) the remaining space left in the drum and (ii) the remaining time left in the cycle. For example, if 12 m of drum space remains to be filled in the coke drum during this optimization process and 10 hours are left remaining in the cycle, the coke rate would need to be, on average, 0.02 m every minute. In some embodiments, the target coke rate is continually changing after every neural network step. Once determined, the target coke rate can then be provided to neural network model 216 for further processing.

Figure 4:
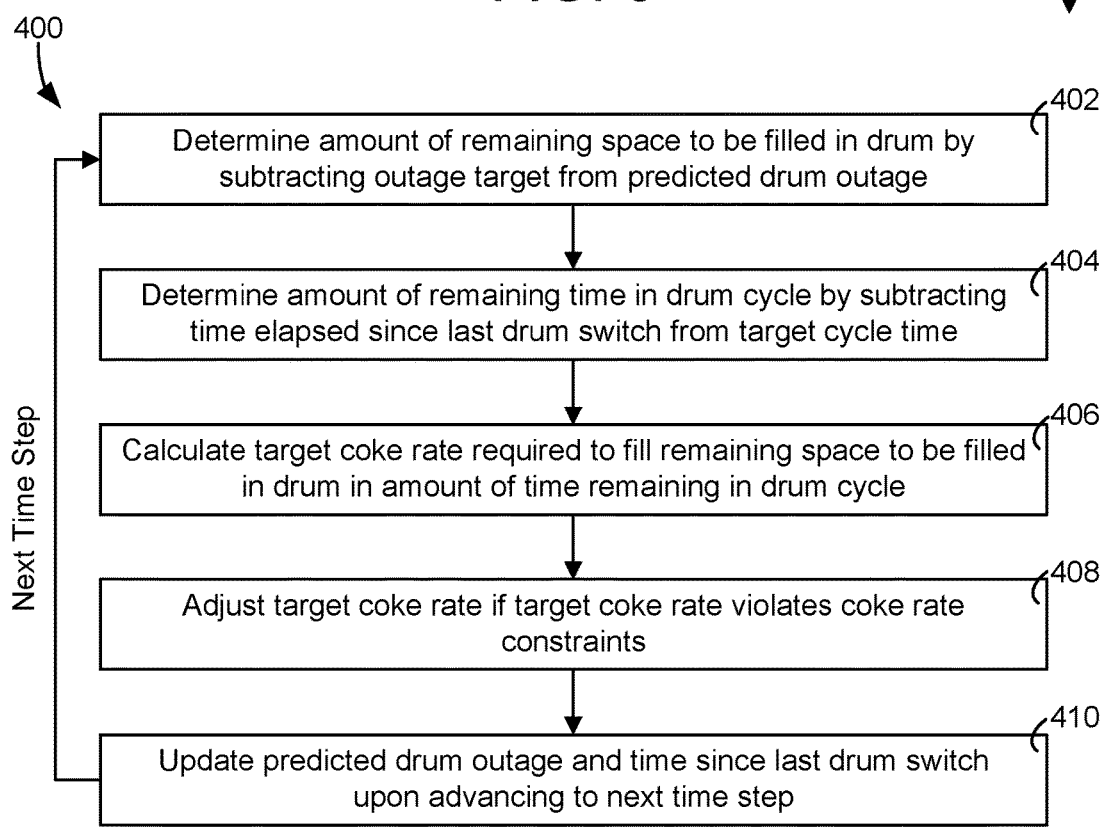
FIG. 4 is a flow diagram of a process for determining a target coke rate calculator, which can be performed by the calculator of FIG. 3, according to some embodiments.

Referring now to FIG. 4, a process 400 for calculating the target coke rate via target coke rate calculator 214 is shown, according to exemplary embodiments. Process 400 may be performed by target coke rate calculator 214 as described above with reference to FIGS. 2-3. Process 400 may be similar to the processes described above regarding target coke rate calculator with reference to FIG. 3.

Process 400 is shown to include determining the amount of remaining space to be filled in the drum by subtracting the outage target from the predicted drum outage (step 402). This step can be performed by remaining space calculator 302. Remaining space calculator 302 can receive the predicted drum outage from drum outage predictor 222 and the outage target from user device 238 and take the difference to determine the remaining space in the drum. Remaining space calculator 302 may determine the remaining space in the drum in various ways and is not limited to the methods disclosed herein. Additionally, remaining space calculator 302 may determine the space presently used or filled with coke, rather than the remaining space. Remaining space calculator 302 then provides the determined information to rate calculator 306.

Process 400 is shown to include determining the amount of remaining time in the drum cycle by subtracting the time elapsed since the last drum switch from the cycle time target (step 404). This step can be performed by remaining time calculator 304. Remaining time calculator 304 can receive the cycle time target from user device 238 and the time since the last drum switch from drum switch detector 312. Remaining time calculator 304 may then determine the remaining time in the drum cycle by taking the difference between the cycle time target and the time since the last drum switch.

Process 400 is shown to include calculating the target coke rate required to fill the remaining space in the drum and the amount of time remaining in the drum cycle (step 406). In some embodiments, rate calculator 306 can determine the target coke rate based on the received remaining space in the coke drum via remaining space calculator 302 and the remaining time in the cycle via remaining time calculator 304. Rate calculator 306 may divide these terms to determine a distance per time relationship, indicating the rate at which coke needs to fill the coke drum to satisfy the imposed constraints (e.g., user-defined outage target, coke rate constraints, etc.).

Process 400 is shown to include adjusting the target coke rate if the target coke rate violates the coke rate constraints (step 408). In some embodiments, coke rate constraints may be imposed on target coke rate calculator 214 that force the calculated coke rate to remain within operational bounds, such that the plan (e.g., system, system 100, the feeder, etc.) is capable of achieving the intended coke rate. In the event the calculated coke rate is outside of the bounds of the coke rate constraints, rate calculator 306 may re-calculate the target coke rate. This may result in deficiencies in satisfying other requirements, such as completing the coke cycle in the intended cycle time target provided by user device 238.

Process 400 is shown to include updating the predicted drum outage and time since the last drum switch upon advancing to the next time step (step 410). Upon completion of determining a target coke rate, target coke rate calculator 214 can update the predicted drum outage and time since the last drum switch and return to step 402 to restart the process. In a general embodiment, process 400 is being implemented by controller 202 on a continual basis during coke production within the coke drum. As certain variables are dynamic with respect to FIGS. 3-4 (e.g., predicted drum outage, etc.), process 400 continually updates the target coke rate to optimize the rate at which the coke drum achieves the outage target. In other embodiments, process 400 is performed not on a continuous basis (e.g., once before coke production, once during coke production, once before and during coke production) and the discreet target coke rates are provided to neural network model 216 accordingly.

Neural Network Model

Figure 5:
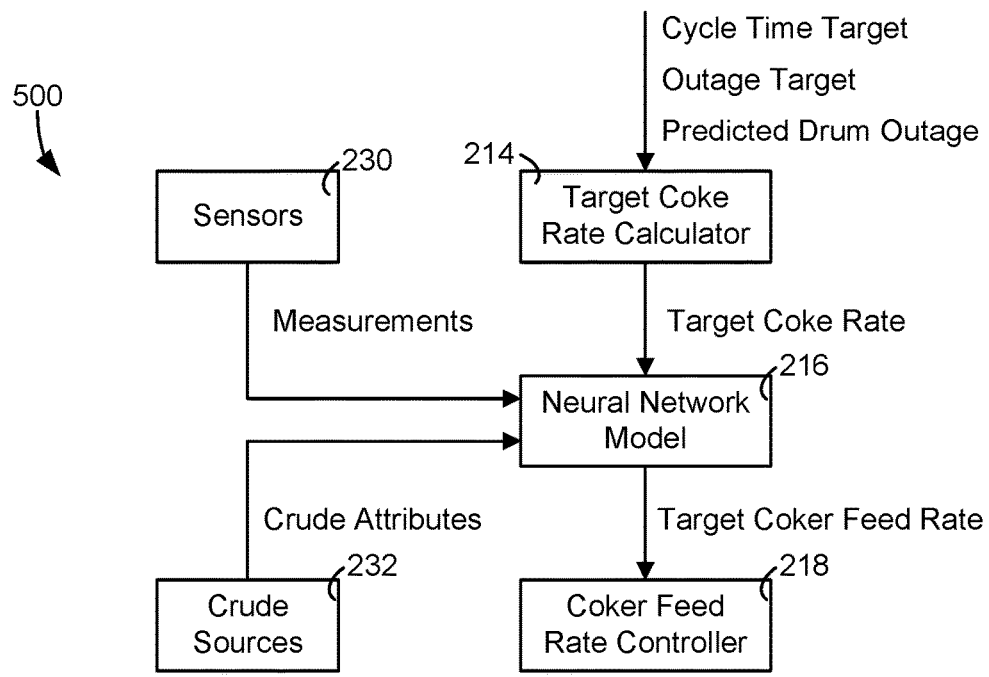
FIG. 5 is a block diagram of a system for determining a target coker feed rate, which can be performed by the controller of FIG. 2, according to some embodiments.

Referring back to FIG. 2, neural network model 216 is shown to receive a target coke rate from target coke rate calculator 214. Neural network model 216 is also shown to receive various measurements and attributes of the crude oil from communications interface 206. In some embodiments, neural network model 216 is configured to predict a target coker feed rate needed to achieve the target coke rate provided by target coke rate calculator 214. This target coker feed rate may be based on various real-time system conditions, such as the measurements and attributes received at neural network model 216. FIG. 5 shows this process in greater detail.

Referring now to FIG. 5, system 500 for predicting a target coker feed rate to achieve a target coke rate is shown, according to exemplary embodiments. System 500 may be incorporated partially or entirely into system 100 and/or 200. In the exemplary embodiment, neural network model 216 is receiving the target coke rate from target coke rate calculator 214, along with sensor measurements (e.g., temperature measurements of coke drum 116, flow measurements from the feed, ambient temperature measurements, etc.) from sensors 230 and crude attributes (e.g., oil density, sodium content, carbon content, etc.) from crude sources 232. Neural network model 216 may then predict the target coker feed rate such that it satisfies the target coke rate within the constraints provided by the real-time system conditions (e.g., measurements from sensors 230, crude attributes from crude sources 232, etc.). Neural network model 216 may take real-time system conditions into consideration when determining a target coker feed rate. For example, crude attributes received from crude sources 232 indicate that the crude oil is high in sodium content, which can increase the rate of cracking. As such, neural network model 216 reduces the target coker feed rate from the original intended target coker feed rate to adjust for the high sodium.

Figure 6:
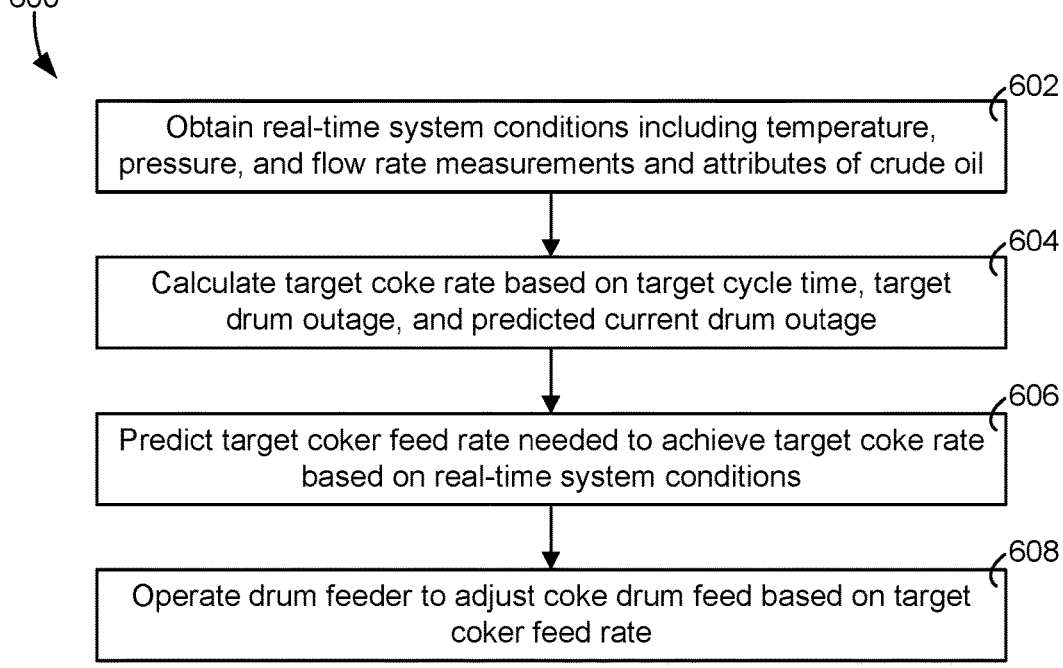
FIG. 6 is a flow diagram of a process for determining a target coker feed rate, which can performed by the system of FIG. 5, according to some embodiments.

Referring now to FIG. 6, a process 600 for predicting the target coker feed rate needed to achieve a target coke rate based on real-time system conditions. Process 600 may be performed by neural network model 216 or any other module shown within controller 202. In a general embodiment, process 600 is a process performed by a model (e.g., neural network model 216) that combines a received coke rate setpoint (e.g., target coke rate from target coke rate calculator 214) with real-time system conditions to produce a real-time target coker feed rate. In some embodiments, every step of process 600 is performed at a neural network step. In other embodiments, process 600 is performed at every neural network step.

Process 600 is shown to include obtaining real-time system conditions including temperature, pressure, and flow rate measurements and attributes of crude oil (step 602). In some embodiments, neural network model 216 receives temperature measurements from the interior of coke drum 116 or another coke drum being monitored/controlled by controller 202, temperature measurements from the ambient air around the coke drums, flow rate measurements measure the feed (e.g., the pump/inlet subsystem that provides the crude oil or residuum to fractionator 114, flow rates of the coking vapor returning to fractionator 114, flow rates after pump 122 to pump coke/steam to coke drums 116,118, temperature measurements of the fluid after leaving furnace 124, and various others. Neural network model 216 may also receive various crude attributes relating to the incoming crude oil and residuum entering fractionator 114. These crude attributes can include the elemental properties (e.g., how carbon-rich is it, high sodium content, etc.), aromatic properties (e.g., is the fluid highly paraffinic, etc.), density, viscosity, and various other properties. Neural network model 216 can process any of these data sets to aid in determining an appropriate target coker feed rate.

Process 600 is shown to include calculating the target coke rate based on the cycle time target, the target drum outage, and the predicted current drum outage. This step may be similar to the process described with reference to FIG. 4. Target coke rate calculator 214 determines a target coke rate based on user constraints (e.g., outage target, cycle time target), time since last drum switch, and predicted drum outage. As discussed above, target coke rate calculator 214 can include more or less variables in determining a target coke rate.

Process 600 is shown to include predicting a target coker feed rate needed to achieve the target coke rate based on real-time system conditions. Neural network model 216 may utilize a neural network to accurately determine the target coker feed rate. Training data from previous batches (e.g., temperature data, carbon contents of previous batches, density and/or viscosity of previous batches, etc.) may be used to train neural network model 216. Crude oil entering fractionator 114 may follow trends regarding the attributes of the crude oil that, when processed, improve the accuracy of neural network model 216.

Process 600 is shown to include operating the drum feeder 236 to adjust the coke drum feed based on the target coker feed rate (step 608). Once the target coker feed rate is determined, coker feed rate controller 218 operates the feed pump (e.g., pump 122, a pump pumping residual oil into fractionator 114, etc.) that allows the target coker feed rate to be satisfied.

Neural network model 216 may not be limited to determining a target coke rate and then predicting a target coker feed rate to satisfy the target coke rate. Neural network model 216 may also work in the reverse, by determining the feed rate for the coke drum and, based on real-time system conditions, predicting a coke rate of the coke being generated within the coke drum. This process is disclosed with reference to FIGS. 7-8. In some embodiments, the neural network model may be the same as or similar to any of the neural network models described in U.S. Patent Application Publication 2019/0236447, the entire disclosure of which is incorporated by reference herein.

Figure 7:
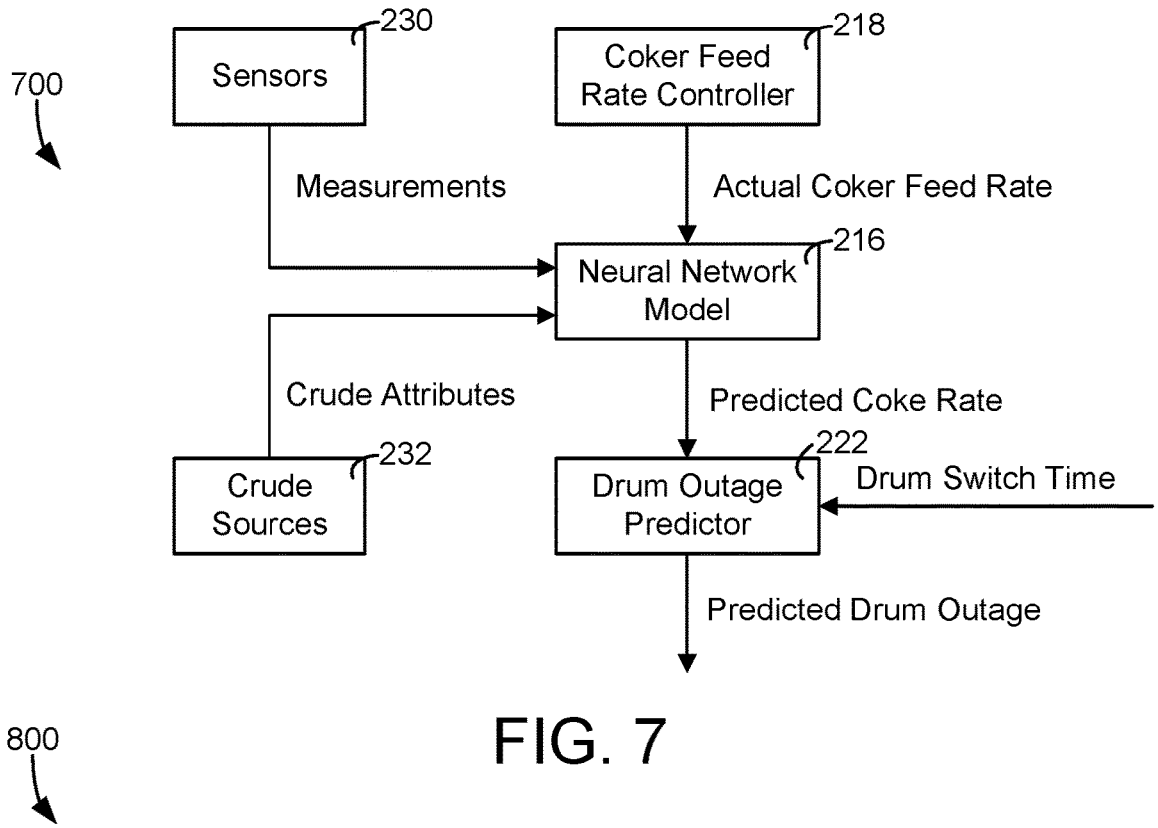
FIG. 7 is a block diagram of a system for predicting a coke rate, which can be performed by the controller of FIG. 2, according to some embodiments.

Referring now to FIG. 7, a system 700 for predicting a coke rate from an actual coker feed rate and real-time system conditions is shown, according to exemplary embodiments. System 700 may be incorporated partially or entirely into system 100 and/or 200. System 700 shows neural network model 216 receiving an actual coker feed rate (as opposed to a target coker feed rate) from coker feed rate controller 218. The actual coker feed rate can be determined by signals provided by flow rate sensors at or near the feed to fractionator 114, but could also use predicted drum outage, drum switch time, other sensor measurements, point source data, and user constraints in determining the actual coker feed rate. Actual coker feed rate may be directly measured. Upon receiving the actual coker feed rate from coker feed rate controller 218, neural network model 216 predicts the coke rate occurring in fractionator 114 based on real-time system conditions (e.g., sensor measurements, crude attributes etc.). Once neural network model 216 knows the amount of crude oil entering the drum, real time sensor data (e.g., data of temperatures within the drum, etc.) combined with historical data (e.g., typical batch time at particular feed rate, etc.) can allow neural network model 216 to generate a predictive coke rate without directly measuring the coke rate occurring within the drum.

Figure 8:
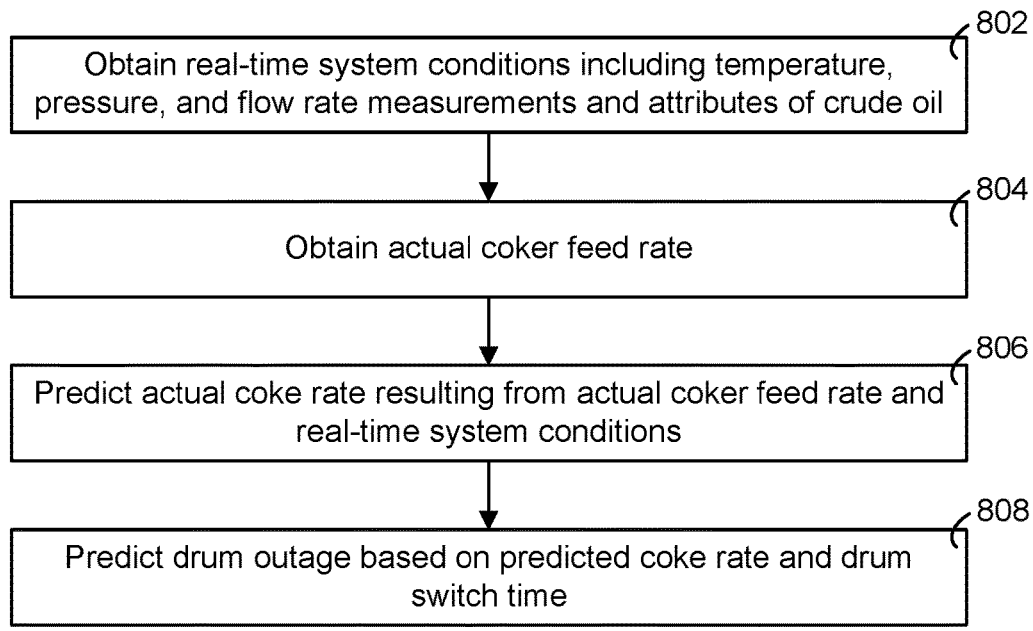
FIG. 8 is a flow diagram of a process for predicting a coke rate from a coker feed rate, which can be performed by the system of FIG. 7, according to some embodiments.

Referring now to FIG. 8, a process 800 for predicting a coke rate from an actual coker feed rate and real-time system conditions is shown, according to exemplary embodiments. Process 800 can be performed by neural network model 216 or any other module disclosed within controller 202.

Process 800 is shown to include obtaining real-time system conditions including temperature, pressure, and flow rate measurements and attributes of crude oil (step 802). In some embodiments, neural network model 216 receives various real-time system conditions, including flow measurements of the feed into fractionator 114, temperature measurements of the crude oil entering and exiting fractionator 114, temperature measurements before and after the crude oil (e.g., the fluid) enters and leaves furnace 124. The real-time system conditions can be considered when neural network model 216 needs to determine the predicted coke rate, as the actual coker feed rate is not the only contributing factor; the real-time system conditions can affect the target coke rate as well. For example, the sodium content within the oil entering fractionator 114 can affect the boiling point of the crude oil, as well as the potential for foam-over. Consistent and frequent operating data such as real-time system condition measurements may be provided to neural network model 216 before and during operation.

Process 800 is shown to include obtaining the actual coker feed rate (step 804). In the process of predicting a target coke rate, neural network model 216 will need to receive the actual coker feed rate, which may be received from a flow sensor or other set of measurements determining the flow of the oil into the fractionator or coker (e.g., fractionator 114). For example, neural network model 216 needs to receive the actual coker feed rate (e.g., 10 gpm, 100 gpm, 1000 gpm, 10,000 gpm, etc.) to determine the predicted coke rate (e.g., 0.03 m/hr., 0.09 m/hr., etc.).

Process 800 is shown to include predicting an actual coke rate resulting from an actual coker feed rate and real-time system conditions (step 806). Neural network model 216 may then combine the information from sensors 230 and crude sources 232 with the received actual coker feed rate (or actual flow measurements from a flow meter measuring the feed rate to determine an actual coker feed rate) to generate the predicted coke rate. Once generated, neural network model 216 may provide the predicted coke rate to drum outage predictor 222.

Process 800 is shown to include predicting drum outage based on predicted coke rate and drum switch time (step 808). Drum outage predictor 222 can receive drum attribute information (e.g., drum switch time, length of batches, etc.) and the predicted coke rate to determine the predicted drum outage. For example, if the predicted coke rate is 0.46 m/hr. and the typical or required drum switch time is 13 hours, the predicted drum outage may be 5.94 m.

Neural Network Trainer

Referring now to FIG. 9, a detailed block diagram of neural network trainer 212 is shown. Neural network trainer 212 trains neural network model 216 with various historical data, crude oil density characteristics (e.g., crude American Petroleum Institute (API) gravity, etc.), crude oil carbon characteristics/amounts (e.g., crude Concarbon content (CCR), crude Conradson carbon content, etc.), ambient temperature, vacuum stripping steam flow rate, vacuum flash zone temperature, fractionator overhead pressure, fractionator flash zone temperature, and furnace outlet temperature. Neural network trainer 212 is shown to include training data generator 902, training module 904, time period generator 906, average coke rate calculator 908, drum switch detector 910, and data cleanser 912. In a general embodiment, neural network trainer 212 combines received historical data with real-time system conditions to modify the weights provided to neural network model 216. This can include adjusting the weight of a received input to one or more hidden layers or output layer of the neural network.

Drum switch detector 910 can be configured to detect the times at which drum switches occur based on measurements of the drum temperatures. As described herein, a drum switch is the act of switching the flow of residual oil (or other feed material) from one drum to another drum. Drum temperature may increase while a drum is being filled and decrease after the drum switch occurs. In some embodiments, drum switch detector 910 receives temperature measurements from drums 116,118 (e.g., from sensors 230 or from historical database 240) and detects the times at which the temperatures are substantially equivalent or have reached a predetermined threshold. The times detected by drum switch detector 910 may be designated as the drum switch times. The drum switch times may include a list of times at which drum switches occurred.

Time period generator 906 may use the drum switch times to generate a set of time periods. In some embodiments, each of the time periods start at the time a drum switch occurs and end at the time the next drum switch occurs. Accordingly, each of the time periods may indicate the period during which a given drum is being filled. This information is useful because it allows training data generator 902 to match the timestamped values of historical data from historical database 240 to a given drum fill operation (i.e., to a given time period). For example, training data generator 902 may find all of the values of historical data that fall within each of the time periods generated by time period generator 906 and associate those values of historical data with the corresponding time period.

Training data generator 902 is shown receiving historical data from historical database 240 and time periods from time period generator 906. In some embodiments, training data generator 902 calculates average values for each of the variables of the historical data for each time period. For example, the crude API gravity variable may have several different values at different times within a given time period. Training data generator 902 may calculate an average value of the crude API gravity variable for the given time period by averaging all of the values of the crude API variable that have time stamps within the given time period or are otherwise associated with the given time period. Training data generator 902 may repeat this for all of the other variables for which historical values are available within historical database 240 to calculate an average value of each variable for each time period.

Data cleanser 912 may process incoming point source data (e.g., from sensors 230 or from historical database 240) to remove any false point source times. The point source data may include binary data (e.g., yes/no, on/off, I/O, true/false, etc.) indicating whether the coke level within coke drums 116,118 has reached a given level. The point source data may originate from sensors 230 installed on or within coke drums 116,118 at various levels. For example, coke drum 116 may have a "13 m" point source sensor located 13 m from the top of coke drum 116 and configured to detect when the coke level within coke drum 116 has reached a level of 13 m from the top of coke drum 116 (i.e., a drum outage of 13 m). Similarly, coke drum 116 may have a "12 m" point source sensor located 12 m from the top of coke drum 116 and configured to detect when the coke level within coke drum 116 has reached a level of 12 m from the top of coke drum 116 (i.e., a drum outage of 12 m). Coke drum 118, as well as any other coke drums in system 100, may have similar point source sensors.

In some cases, the readings from the point source sensors may be accurate indications of coke level within coke drums 116,118. However, foam buildup within coke drums 116,118 above the coke level may trigger the point source sensors to report false positive readings when the true coke level is actually lower. Foam buildup is a transient event that typically dissipates within a predetermined amount of time (e.g., 10-15 minutes). Accordingly, data cleanser 912 can be configured to filter the point source data to remove any positive readings that persist for less than the predetermined amount of time. This has the effect of removing false positive point source readings that were caused by foam buildup. Data cleanser 912 may output a list of filtered point source times. The filtered point source times may indicate the times at which each point source sensor was triggered and remained triggered for the predetermined amount of time within each time period. Accordingly, the filtered point source times represent the times at which the coke level within the coke drums reached a given level (e.g., 4.6 m for the 4.6 m point source, 8 m for the 8 m point source, etc.).

Average coke rate calculator 908 can be configured to calculate the average rate at which coke accumulated within each coke drum 116,118 within each of the time periods. The average coke rate calculation may be similar to the target coke rate calculation as described with reference to FIGS. 3-4. However, instead of using target values of the drum outage and cycle time, average coke rate calculator 908 may use the filtered point source data from data cleanser 912 and the time periods from time period generator 906. For example, average coke rate calculator 908 may use the time periods and the filtered point source data to determine the amount of time that elapsed between the beginning of each time period and the time at which a given point source sensor was triggered. That amount of time represents the time needed for the coke level to increase from zero to the level associated with the point source sensor. For example, if a point source sensor located 19 m from the bottom of coke drum 116 was first triggered 200 minutes after the beginning of the time period, average coke rate calculator 908 may determine that coke accumulated within coke drum 116 at an average coke rate of 19 m/200 minutes, or 0.095 m/min. Average coke rate calculator 908 may repeat this calculation for each of the time periods to determine an average coke rate for each time period.

Training module 904 can be configured to receive the average values of a time period and average coke rate over a time period and determine the learned weights needed for neural network model 216. Examples of training module 904 performing training processes are described in greater detail below with reference to FIGS. 25-26.

Coke Rate Adjuster

Figure 10:
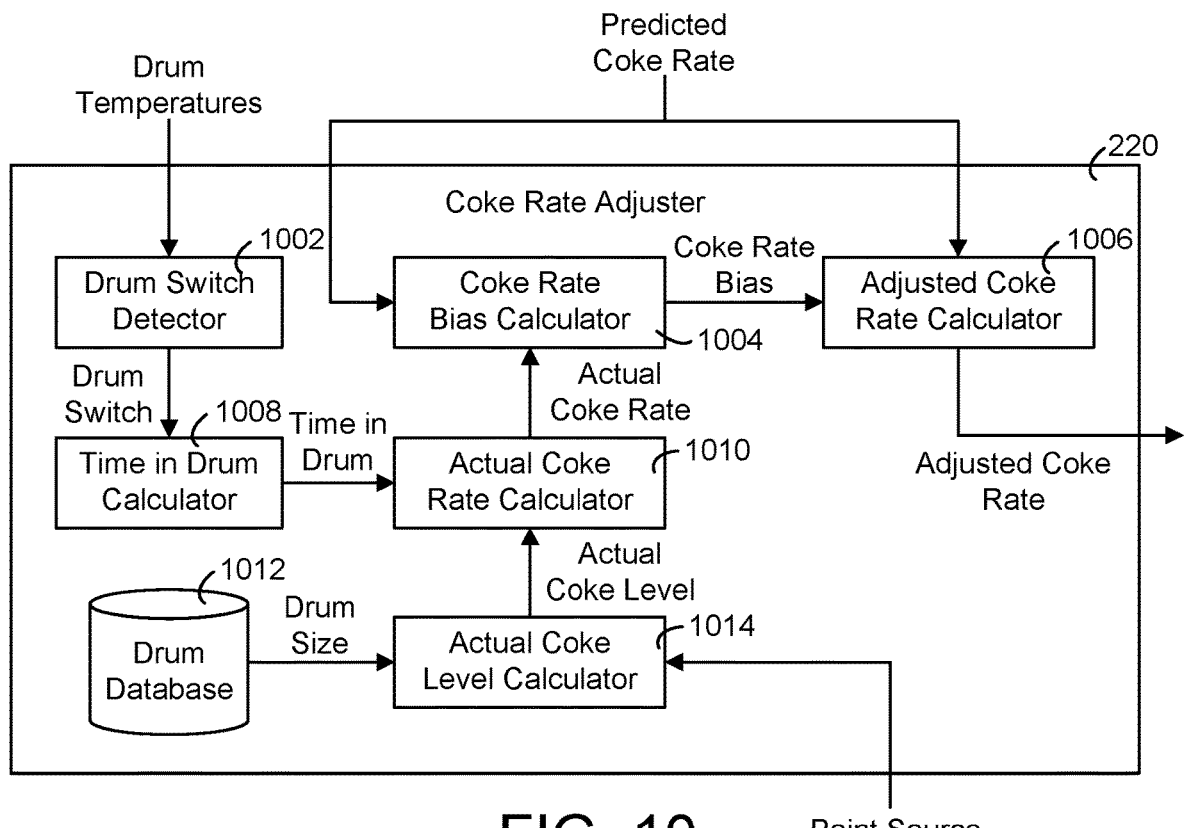
FIG. 10 is a block diagram of a coke rate adjuster, which can be implemented by the controller of FIG. 2, according to some embodiments.

Referring now to FIG. 10, a detailed block diagram of coke rate adjuster 220 is shown, according to some embodiments. Coke rate adjuster 220 can be configured to adjust the predicted coke rate generated by neural network model 216 to account for a coke rate bias. In some embodiments, the coke rate bias is based on real-time data taken from the coke production occurring within coke drums 116,118. The rate of coke being generated may be predicted at a certain rate from neural network model 216 and at a different rate from measurements received within coke drums 116,118. This might include density measurements of coke within coke drums 116,118 being constantly provided to controller 202. Controller 202 (e.g., coke rate adjuster 220) may use this data (e.g., point source data) to adjust the predicted coke rate to be more accurate. Coke rate adjuster 220 is shown to include drum switch detector 1002, coke rate bias calculator 1004, adjusted coke rate calculator 1006, time in drum calculator 1008, actual coke rate calculator 1010, drum database 1012, and actual coke level calculator 1014.

As shown in FIG. 10, the predicted coke rate is provided to coke rate bias calculator 1004. The coke rate bias calculator 1004 takes the predicted coke rate and actual coke rate and determines a coke rate bias. While described herein as the "actual coke rate", every measurement may include some error and may not represent the exact coke rate. In any case, the actual coke rate is determined by actual coke rate calculator 1010. Actual coke rate calculator 1010 takes into account the current level of coke (based on the received point source data) and the time since the last drum switch occurred, shown in FIG. 10 as the "time in drum."

In some embodiments, the time in drum may refer to the amount of time that has elapsed since the most recent drum switch occurred, as detected by drum switch detector 1002. In some embodiments, the time in drum is calculated by time in drum calculator 1008. Time in drum calculator 1008 may receive the time data that indicates the time since the last drum switch and determines the time left in the drum, the current time that the coke is being generated in the drum, or both. As referred to herein, "the drum" and/or "the coke drum" may refer to the location in which coke is being generated and where a feed is supplying residuum to be generated into coke. In other embodiments, "the drum" and/or "the coke drum" refers to where the coke is being stored. For example, feed enters the fractionator to be generated, then a pump pumps the coke into a drum.

Still referring to FIG. 10, time in drum calculator 1008 receives the data for determining the time in drum from drum switch detector 1002. Drum switch detector 1002 can receive drum temperatures and determine time data from the temperatures. For example, a temperature sensor 8 m high in the drum may indicate that temperatures are exceeding 700° C. at a first instance in time. At a second instance in time, the temperature sensor indicates that the temperature is 200° C. Drum switch detector 1002 may determine that this indicates the drum has emptied since the second instance in time and that a drum switch has occurred. In some embodiments, a temperature sensor is located at the bottom of the drum that, when coke begins filling up within the drum, drum switch detector 1002 receives higher than normal temperatures that indicate the coke drum is beginning to fill up and a drum switch has been made. Various methods of determining a drum switch are considered and are not limited to the embodiments disclosed herein. For example, timers within processing circuit 204 may automatically maintain the exact drum time switches for all coke batches. The time in drum is provided to actual coke rate calculator 1010 for determining the actual coke rate. Actual coke rate calculator 1010 is shown to also receive the actual coke level from actual coke level calculator 1014.

Actual coke level calculator 1014 can be configured to receive drum information (e.g., drum size from drum database 1012, etc.) and the point source data from point sources 234 to determine the actual coke level. As discussed above the "point source data" referred to various data points (e.g., the density of the generated coke, the temperature changes, etc.) to essentially determine how fast the drum is filling up. This can be referred to as the coke rate. In some embodiments, the point source data is obtained via nuclear technology (e.g., receives data at extremely small or nuclear units) and allows for measurements of the density across a certain distance or point of the material within the drum. In this exemplary embodiment, actual coke level calculator 1014 can convert this density data into a level of coke within the drum, with dimension information about the drum received by drum database 1012. Actual coke level calculator 1014 then provides the actual coke level to actual coke rate calculator 1010.

Actual coke rate calculator 1010 combines time in drum with the actual coke level to determine the actual coke rate. For example, if the actual coke level is 6 m and the time that coke has been generating within the drum is 7 hours, then the actual coke rate is 0.86 m/hr. While this exemplary embodiment is relatively straightforward, additional steps may be included in determining the actual coke rate. For example, an error adjustment may be included to account for the uncertainty/error from the point source data. Once the actual coke rate is determined, actual coke rate calculator 1010 provides the actual coke rate to coke rate bias calculator 1004.

Coke rate bias calculator 1004 receives the actual coke rate and the predicted coke rate to determine the appropriate amount of bias to provide such that the predicted coke rate is adjusted. In a general embodiment, the bias determined by coke rate bias calculator 1004 is significantly determined by the point source data provided by point sources 234. Various examples of coke rate bias calculator 1004 implementing a bias adjustment to the predicted coke rate is provided below. Additionally, while the process is not described in detail herein, system 100 may only use the actual coke rate and perform control/monitoring of system 100 using only the actual coke rate. Once the coke rate bias is determined, coke rate bias calculator 1004 provides the coke rate bias to adjusted coke rate calculator 1006. Adjusted coke rate calculator 1006 may simply combine the predicted coke rate with the coke rate bias to provide an adjusted coke rate to drum outage predictor 222.

In some embodiments, the bias is implemented after a predetermined period of time to account for a potential point source data error. For example, a typical issue that occurs in coke drums is the generation of foam that can potentially "foam-over" the lid of the drum. This phenomenon can occur both during filling and after the drum has been filled. In an exemplary embodiment, a foam-over can occur in fractionator 114. The reasons/causes of foam-overs within drums is variable, and can include a constant loss in drum pressure, a quick pressure drop (e.g., 1 psi in two minutes, etc.), a reduction in coke drum density, an open drain valve during the switching of drums, and others. As such, the point source data may indicate that the coke is at a certain level within the drum, when in reality the point source data is measuring the foam-over level, resulting in coke levels that are being measured higher than they really are. To solve this issue, coke rate bias calculator 1004 may wait a predetermined period of time (e.g., 5 minutes, 10 minutes, 15 minutes, 30 minutes, 1 hour, etc.) to implement the coke rate bias, to allow sufficient time for the foam to subside and see if lower coke levels are received from the point source data. If so, this can be an indication that there was a foam over and no (or less) bias is actually needed. If not, this can be an indication that the coke level determined by the point source data was relatively accurate, there was none or little foam-over, and the bias can be implemented accordingly. Various embodiments below describe biasing in greater detail.

Figure 11:
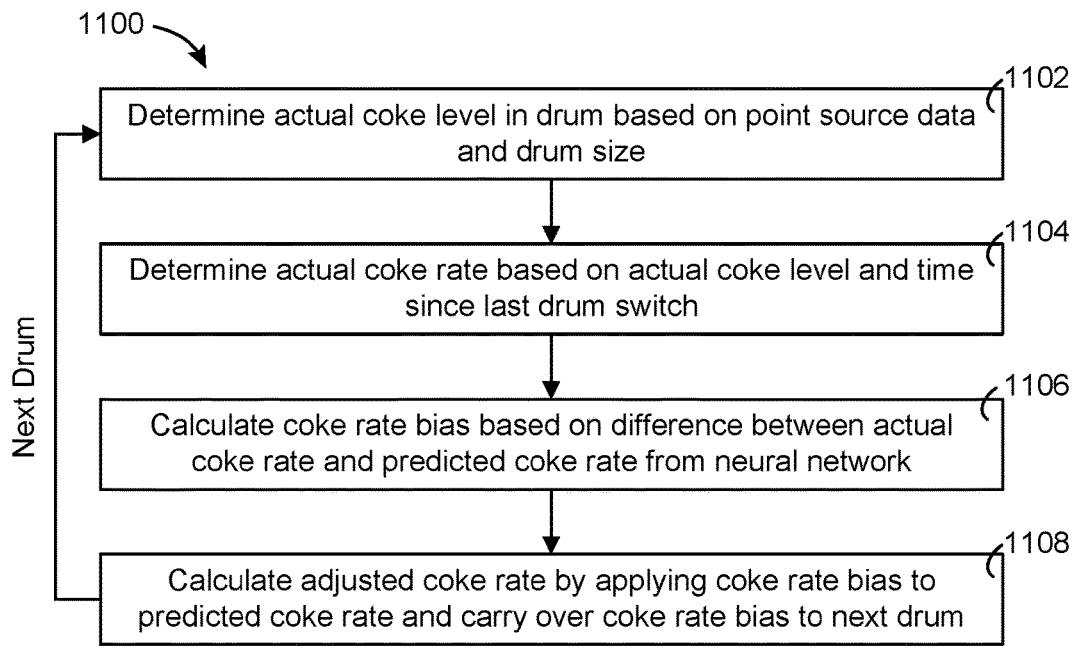
FIG. 11 is a flow diagram of a process for adjusting a coke rate with coke rate bias, which can be performed by the adjuster of FIG. 10, according to some embodiments.

Referring now to FIG. 11, a process 1100 for adjusting a predicted coke rate is shown, according to an exemplary embodiment. Process 1100 may be performed by coke rate adjuster 220 as shown in FIG. 10. Process 1100 is shown to be recurring, such that the predicted coke rate is constantly being adjusted (e.g., every clock cycle, every 10 milliseconds, every second, every minute, etc.).

Process 1100 is shown to include determining the actual coke level in the drum based on point source data and drum size (step 1102). This step can be performed by actual coke level calculator 1014. In some embodiments, the point source data is received from point sources 234. Point sources 234 may include various sensors or subsystems configured to provide density measurements and/or predictions for determining the coke level in the drum. While density is the general method for determining the coke level via the point source data, other attributes may be measured to determine the actual coke level. Actual coke level calculator 1014 may receive the point source data and drum size dimensions (e.g., via drum database 1012) to produce the actual coke level. This may be done by converting the point source data—which may indicate the density levels at specific points within the drum—into the coke level under the constraints of the drum size.

Process 1100 is shown to include determining the actual coke rate based on the actual coke level and time since the last drum switch (step 1104). In some embodiments, this step is performed by actual coke rate calculator 1010 as shown in FIG. 10. By combining the time in the drum (e.g., the time since the drum started generating coke) and the actual coke level, a rate between the coke level (height) and the time in the drum (time) can be determined.

Process 1100 is shown to include calculating the coke rate bias based on the difference between the actual coke rate and the predicted coke rate from the neural network (step 1106). In some embodiments, the predicted coke rate is determined by neural network model 216 and is provided to coke rate bias calculator 1004. Additionally, actual coke rate calculator 1010 determines the actual coke rate and provides the actual coke rate to coke rate bias calculator 1004. Coke rate bias calculator 1004 then determines an appropriate bias to provide to adjusted coke rate calculator 1006 that will adjust the predicted coke rate. In some embodiments, the appropriate bias is the difference between the predicted coke rate and the actual coke rate. In some embodiments, the bias is not initially implemented and a predetermined amount of time passes prior to implementing the coke rate bias in the event that the point source data was over-measuring the coke level due to foaming in the drum.

Process 1100 is shown to include calculating the adjusted coke rate by applying coke rate bias to the predicted coke rate and carry-over coke rate bias to the next drum (step 1108). This may be performed by adjusted coke rate calculator 1006 as shown in FIG. 10. Once adjusted coke rate calculator 1006 receives the coke rate bias, adjusted coke rate calculator 1006 may combine the coke rate bias with the predicted coke rate and provide an adjusted coke rate to drum outage predictor 222. Coke rate bias calculator 1004 and adjusted coke rate calculator 1006 may be combined into a single module for adjusting the coke rate based on a determined coke rate bias. Additionally, step 1108 shows an arrow back to step 1102, indicating that process 1100 is recurring, and that the predicted coke rate may consistently be adjusted based on the received point source data.

In a general embodiment, FIGS. 10-11 disclose systems and methods for adjusting a predicted coke rate based on data received on the density of the product within the drum. As the density of the product within the drum may indicate a different coke rate than one generated by a neural network trained with historical data, an adjustment may need to be made to account for the differences. However, both methods of determining are important and contribute to the accuracy of the coke rate. A predicted coke rate generated via neural network model 216 allows for numerous amounts of previously measured coke batches to aid in determining the general coke rate of the current batch. Additionally, various amounts of real-time system conditions can be provided to neural network model 216 such that current attributes regarding the batch (temperature, feed rate, etc.) can be combined with historical data to determine an accurate predicted coke rate. Conversely, the point source data provides important information relating to the density of the coke within the drum. Taking multiple point source data points over a period of time can provide a reasonably accurate indication of how quickly the coke is being generated within the drum. Advantageously, coke rate adjuster 220 combines both of these methods to provide a more accurate adjusted coke rate to drum outage predictor 222.

Drum Outage Predictor

Figure 12:
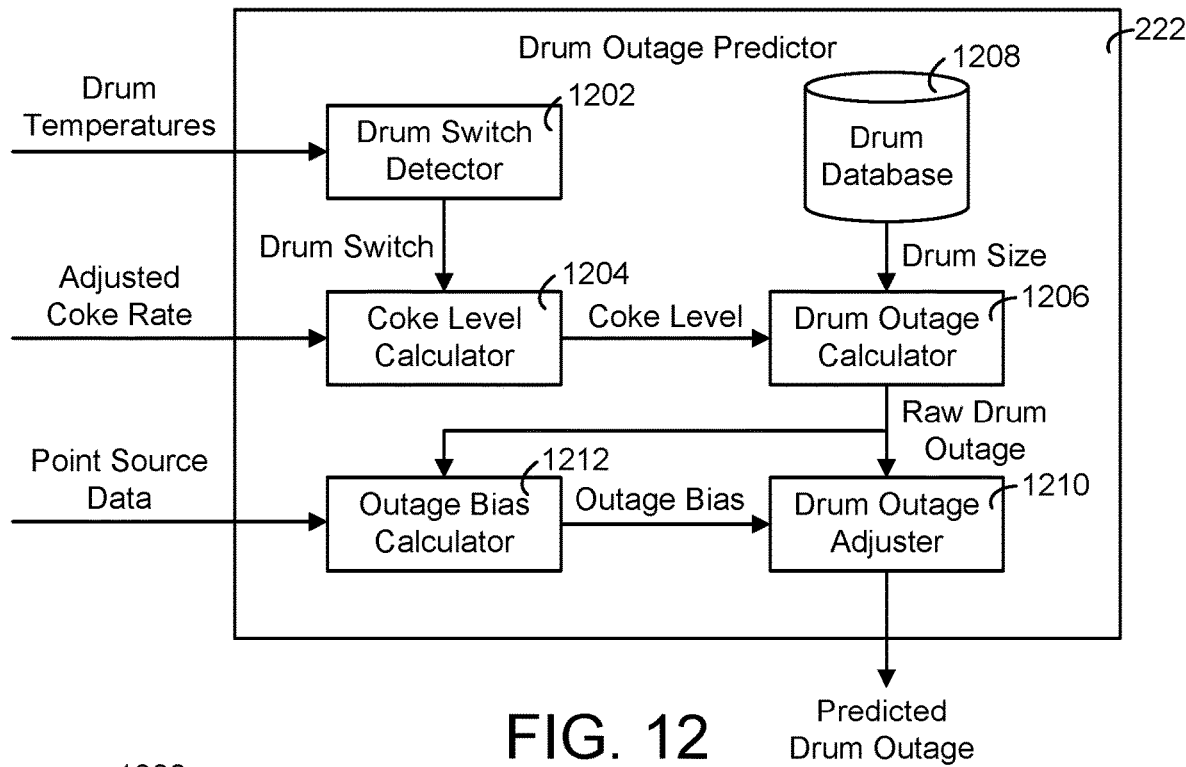
FIG. 12 is a block diagram of a drum outage predictor, which can be implemented by the controller of FIG. 2, according to some embodiments.

Referring now to FIG. 12, a detailed block diagram of drum outage predictor 222 is shown, according to exemplary embodiments. Drum outage predictor 222 can be configured to determine a predicted drum outage based on various predicted information (e.g., adjusted coke rate), real-time system conditions (e.g., drum temperatures, etc.) and point source data. Drum outage predictor 222 is shown to include drum switch detector 1202, coke level calculator 1204, drum outage calculator 1206, drum database 1208, drum outage adjuster 1210, and outage bias calculator 1212.

Drum switch detector 1202 is shown receiving drum temperatures and providing the drum switch information to coke level calculator 1204. This information can include determining the time since the last drum switch based on received drum temperatures. In some embodiments, drum switch detector 1202 is identical or substantially similar to drum switch detector 1002. Once the drum switch information is determined, drum switch detector 1202 provides the information to coke level calculator 1204. Coke level calculator 1204 receives the adjusted coke rate—which may be generated by the systems and methods disclosed above with reference to FIGS. 10-11—and drum switch information to determine the coke level within the drum. Coke level calculator 1204 provides the coke level to drum outage calculator 1206.

Drum outage calculator 1206 combines the coke level determined by coke level calculator 1204 with drum dimensions received by drum database 1208 to determine the raw drum outage. In some embodiments, the raw drum outage is calculated by subtracting the coke level from the drum size. For example, a drum having a size of 22 m and a current coke level of 21 m results in a calculated drum outage of 1 m In some embodiments, the adjusted coke rate is directly provided to drum outage calculator 1206 and combined with the drum size information to determine the raw drum outage. As referred to herein, the raw drum outage may simply represent the amount of space left within the drum before the drum is full of coke and/or coke vapor. The raw drum outage is provided to drum outage adjuster 1210 and outage bias calculator 1212.

Outage bias calculator 1212 uses the point source data and raw drum outage to determine an outage bias. The outage bias may be determined by outage bias calculator 1212 by calculating the difference between the raw drum outage and the drum outage indicated by the point source data. For example, the "4.6 m" point source sensor may be triggered at a given time, indicating that the current drum outage is 4.6 m at that time. However, the raw drum outage at that same time may be 12 m Accordingly, outage bias calculator 1212 may subtract the raw drum outage (12 m) from the drum outage indicated by the point source data (4.6 m) to calculate an outage bias of −7.4 m. The outage bias represents the amount by which the raw drum outage should be adjusted to match the outage level indicated by the point source data. Although a bias is implemented to determine the adjusted coke rate (as shown in FIG. 10), another bias may be implemented to the predicted drum outage (e.g., raw drum outage). Once determined, outage bias calculator 1212 provides the outage bias to drum outage adjuster 1210. Drum outage adjuster 1210 may simply combine the raw drum outage with the determined outage bias to generate a predicted drum outage for target coke rate calculator 214.

While some embodiments disclosed herein use historical point source data (e.g., coke rate adjuster 220, drum outage predictor 222, etc.) as an estimation for determining drum outage, other methods of determining drum outage may be considered. For example, system 200 may directly monitor drum outage in coke drum 116 via one or more sensors that directly measure the drum outage (e.g., one or more sensors 230, etc.). The sensors may be able to directly measure the drum outage based on volumetric properties, pressure, density, flow rate, gas rate, mass flow, force, viscosity, or other characteristics. In some embodiments, a combination of historical point source data and real-time measurements of drum outage are considered by controller 202 for determining control decisions.

Figure 13:
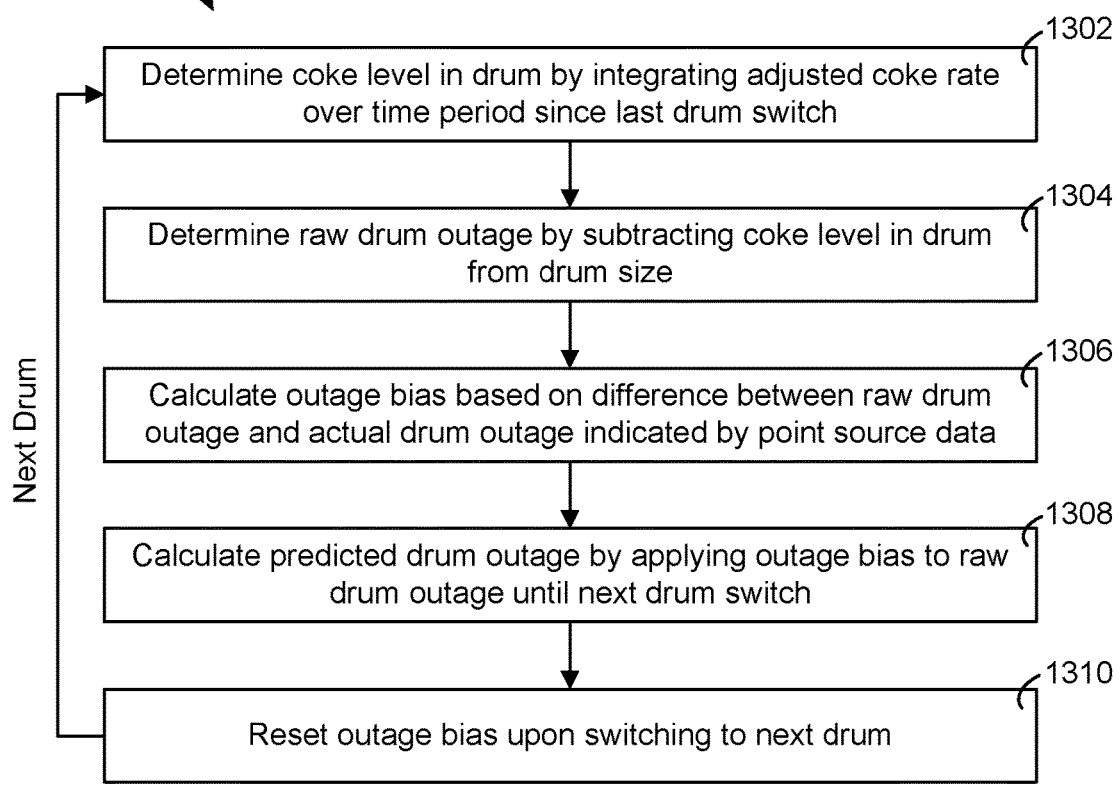
FIG. 13 is a flow diagram of a process for predicting the drum outage for a coke drum, which can be performed by the predictor of FIG. 12, according to some embodiments.

Referring now to FIG. 13, a process 1300 for adjusting a predicted drum outage is shown, according to exemplary embodiments. Process 1300 can be performed by drum outage predictor 22 as shown in FIG. 12. Process 1300 is shown to be recurring, such that once the final step is completed (step 1310), process 1300 returns to step 1302 to complete. This allows the drum outage to be constantly predicted based on the continually-received point source data, adjusted coke rate, and drum temperatures.

Figure 20:
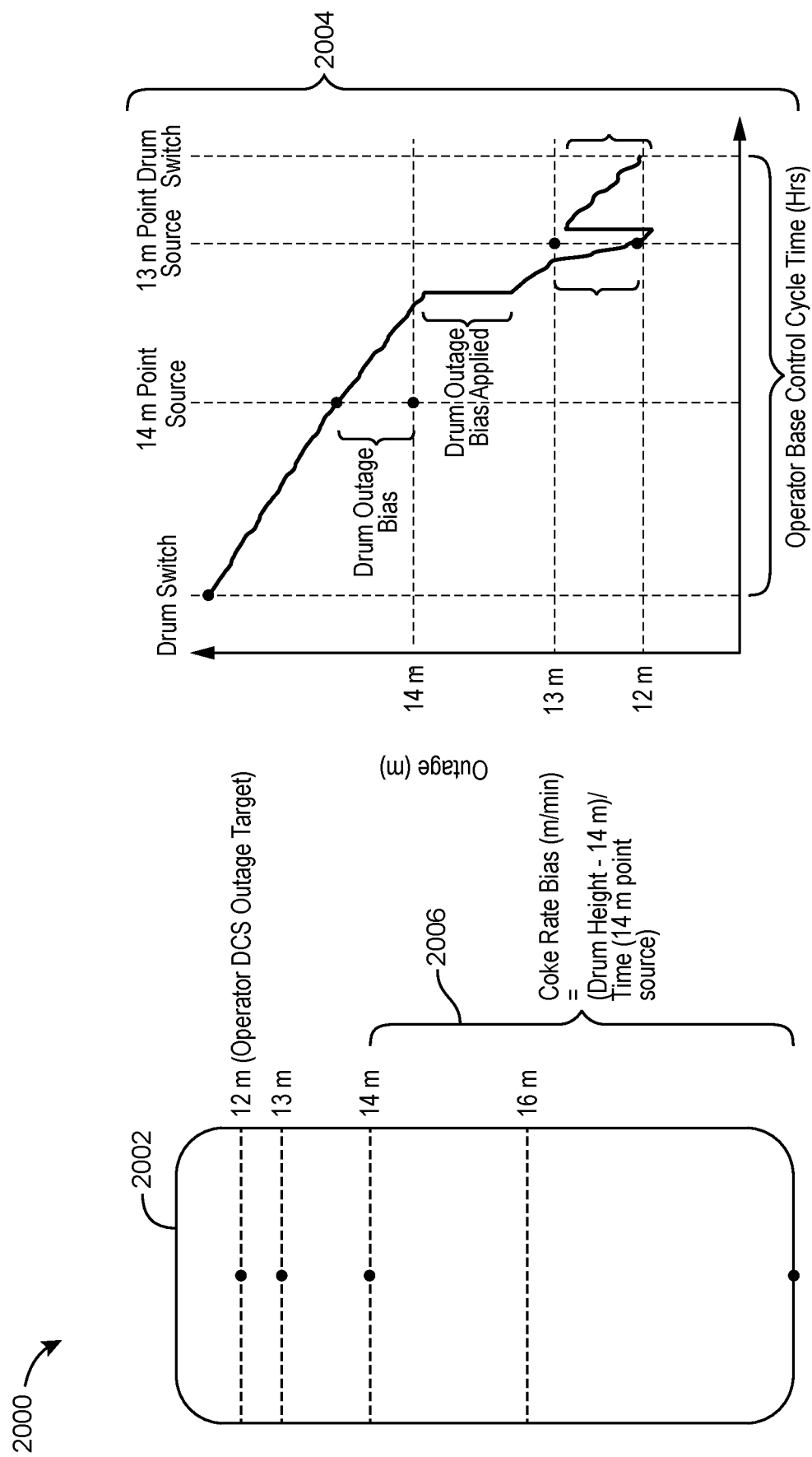
FIG. 20 is a diagram for determining the drum outage bias in a coke drum, which can be performed by the predictor of FIG. 12, according to some embodiments.

Process 1300 is shown to include determining the coke level in the drum by integrating the adjusted coke rate over the time period since the last drum switch (step 1302). An exemplary embodiment of this step is shown in FIG. 20 and described below in greater detail. Drum outage predictor 222 may determine the coke level in the drum by integrating the coke rate (e.g., ft./min, m/min, etc.) over the time during the drum cycle to determine the total drum outage.

Process 1300 is shown to include determining the raw drum outage by subtracting the coke level in the drum from the drum size (step 1304). In some embodiments, the raw drum outage is the drum outage value that has not been adjusted for bias. This may be determined by the drum outage predictor 222 receiving drum dimensions via drum database 1208, subtracting the coke level from the total size/height of the drum, and determining the drum outage. As such, the drum outage, or raw drum outage, is inversely related to the coke level within the drum.

Process 1300 is shown to include calculating the outage bias based on the difference between the raw drum outage and the actual drum outage indicated by the point source data (step 1306). In some embodiments, an outage bias needs to be calculated in case the drum outage level determined by the point source data is different than the drum outage determined by drum outage predictor 222. As discussed below, the typical process that has been described above generally refers to control logic implemented based on a neural net. As such, the drum outage bias may be a difference between the neural network drum outage and the drum outage determined by the point source data.

Process 1300 is shown to include calculating predicted drum outage by applying an outage bias to the raw drum outage until the next drum switch (step 1308). The outage bias may be applied to the raw drum outage to calculate a predicted drum outage. In some embodiments, this application is delayed to allow for determining whether the drum outage hitting specific markers in the drum (e.g., 4.6 m of drum outage, etc.) are false positives. As such, a time delay will be applied prior to applying the drum outage bias. Various examples of this are described below with reference to FIG. 23.

Process 1300 is shown to include resetting the outage bias upon switching to next drum (step 1310). Upon completion of a drum cycle, the outage bias will reset when the system switches over to filling the next drum. Process 1300 shows that step 1310 connects back to step 1302, indicating that this process can be repeated. In some embodiments, process 1300 is performed at every neural network step before, after, and/or during a drum cycle.

Coker Feed Rate Controller

Figure 14:
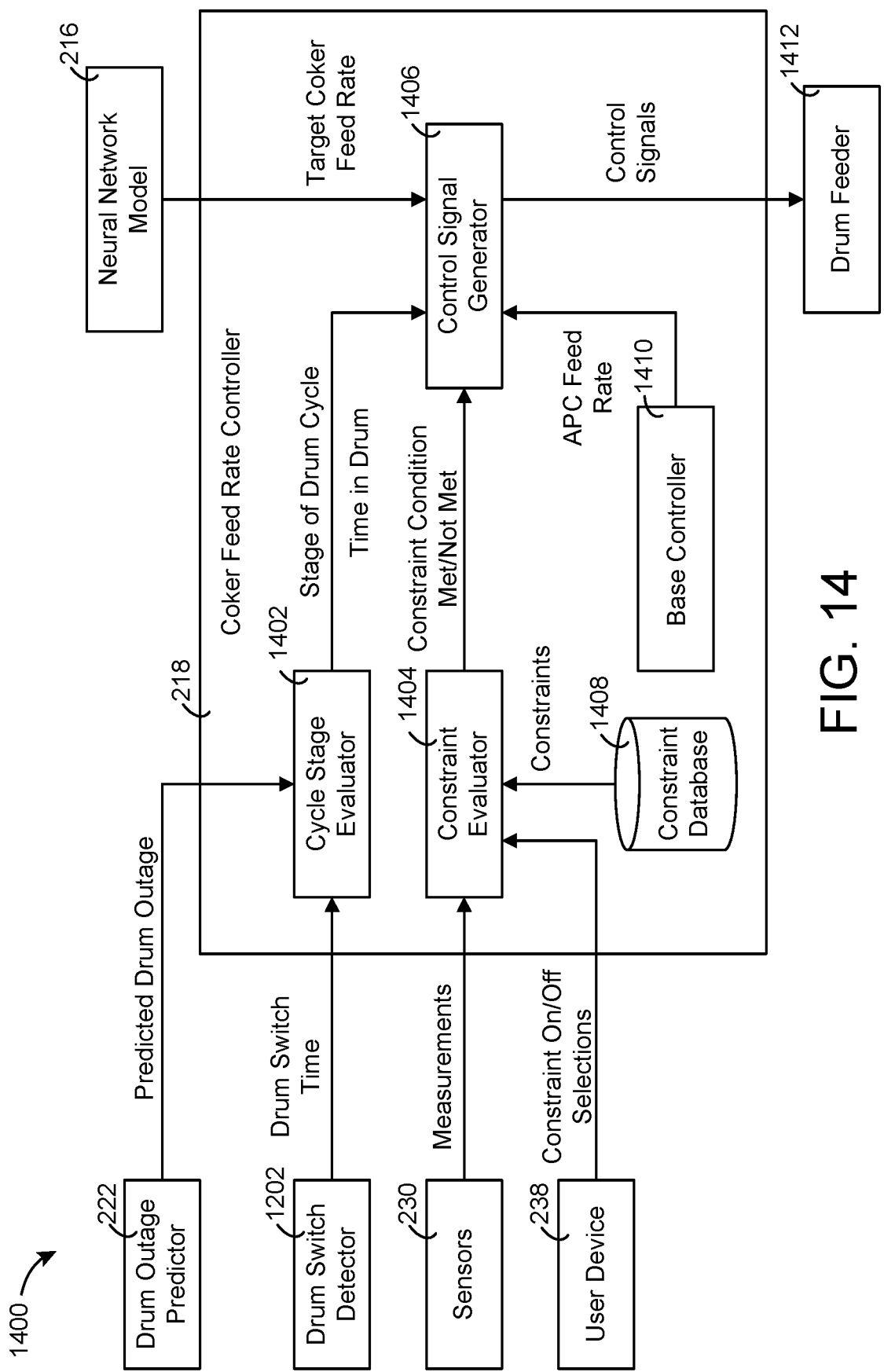
FIG. 14 is a block diagram of a coker feed rate controller, which can be implemented by the controller of FIG. 2, according to some embodiments.

Referring now to FIG. 14, a detailed block diagram of coker feed rate controller 218 is shown, according to exemplary embodiments. Coker feed rate controller 218 can be configured to control the operation of a feed (e.g., feed pump, amount of feed entering fractionator 114, etc.) by providing control signals to various components (e.g., valves 120, pump 122, etc.). Coker feed rate controller 218 is shown to include cycle stage evaluator 1402, constraint evaluator, control signal generator 1406, constraint database 1408, and base controller 1410.

Cycle stage evaluator 1402 can be configured to receive a predicted drum outage from drum outage predictor 222 and drum switch times from drum switch detector 1202. Based on this information, cycle stage evaluator 1402 may determine the current stage in the drum cycle. In a general embodiment, a drum cycle (e.g., a batch) may have various stages such that, when the drum cycle is in the particular stages, certain control actions are taken. For example, the first hour of the drum cycle may maintain a target feed rate established from the previous drum cycle, so as not to push the feed rate into new constraints in the present drum cycle. Once the first hour passes, coker feed rate controller 218 may then take in the present target coker feed rate and provide control signals based on the target coker feed rate. In another embodiment, the first hour of the drum cycle may maintain a predicted coke rate established from the previous drum cycle and make control decisions (e.g., operate the feed) based on the predicted coke rate from the previous drum cycle, so as not to push the feed rate into new constraints in the present drum cycle. Once the first hour passes, the present coker feed rate is used to make control decisions. Cycle stage evaluator 1402 can provide the current stage in the drum cycle and the time in the drum to control signal generator 1406. The above example is not limited to one hour intervals and various other time intervals (e.g., 2 hours, 5 hours, etc.) are considered.

Constraint evaluator 1404 can be configured to determine the constraints for operating drum feeder 1412. For example, if a user wants to operate drum feeder 1412 below a certain rate (e.g., 100 gpm, 1000 gpm, etc.), then constraint evaluator 1404 evaluates this constraint and determines whether the constraint has been met and provides the decision to control signal generator 1406. In some embodiments, if the constraint has not be met (i.e., satisfied), control signal generator 1406 may operate normally and provide control signals to drum feeder 1412. If the constraint has been met, this can affect the control signals sent to drum feeder 1412, as coker feed rate controller 218 does not want to provide control signals that will constrain the system. These affects can include mitigation controls to drum feeder 1412 or stopping operation of drum feeder 1412. In some embodiments, constraints are stored within controller 202 (e.g., within coker feed rate controller 218) in constraint database 1408 such that constraint evaluator 1404 can query constraint database 1408 to receive various constraints and evaluate whether they are being met.

Control signal generator 1406 can be configured to receive the stage of the drum cycle, time in the drum for the drum cycle, various constraints, and target coker feed rates received from neural network model 216 and determine control signals that satisfy the target coker feed rate. The control signals may include providing a control signal to an actuator or motor that opens/closes a feed to the drum (e.g., drum feeder 1412). Drum feeder 1412 may be located before any inlet to a drum configured to generate coke (e.g., fractionator 114) within system 100.

Base controller 1410 may be configured to provide base control of system 100 and various components therein. In some embodiments, base controller 1410 provides a base control feed rate to control signal generator 1406. This base control feed rate may be a target or predicted feed rate that was determined by base controller 1410. Base controller 1410 may perform different control schema and/or monitoring of system 100 and the various components therein than the systems and methods implemented by neural network trainer 212, target coke rate calculator 214, neural network model 216, coker feed rate controller 218, coke rate adjuster 220, or drum outage predictor 222. In a general embodiment, base controller 1410 performs base control, while controller 202 and the various controllers therein perform a method of control schema that utilizes a neural net (e.g., "the neural net"). The similarities and differences between these two control schema and how they work in conjunction within system 100 are disclosed in greater detail with reference to FIGS. 16-26.

As described herein, base control refers to a broad range of control techniques, control strategies, optimization techniques, and various technologies for controlling industrial process control systems. In some embodiments, base control, as performed by controller 202, coker feed rate controller 218, and/or base controller 1410, may include some or all functionality of a control schema known as Model Predictive Control (MPC). MPC may be a control strategy used to optimize a system based on changing a variety of variables and determining how that affects the system model. A high-level example of Model Predictive Control is described below.

The system model may include a variety of inputs, outputs, and associated objective function (e.g., an optimization equation). The MPC may begin with performing a simulation of the system by simulating multiple trajectories of the system inputs to optimize the objective function of the system model. This produces a model of the inputs over a period of time called the time horizon, the time horizon including several time steps distributed within (e.g., time horizon of 10 seconds with time steps at every second, etc.). The MPC may then only implement the first time step of the simulated inputs. In other words, a simulation to optimize control is run over many time steps, but only the first time step is implemented. The entire simulation to optimize control is re-ran over a new time horizon starting at the previously implemented time step, and the first time step of the newest simulation is implemented. This can allow the system to continuously re-optimize the control based on the newly implemented state. This process may be repeated to reach a desired output. In a general example of MPC that is void of any constraints, the control signal may be modeled as follows:

$$k(x_k)=u_{k+1}(x_k)$$

Where k is an control signal, $k(x_k)$ is the control signal at time $x_k$, u is the control signal over a set of inputs to the system, k+1 is a first time step starting from k, and $u_{k+1}$ is the optimal control for time step k+1, and $u_{k+1}(x_k)$ is the optimal short time control for time step k+1, starting at $x_k$.

In the above example, system identification may be used to generate detailed and complex models for various systems (e.g., linear, nonlinear, static, dynamic, etc.) that allow the MPC to accurately optimize continually. Additionally, MPC may impose constraints on various inputs into the system. Advantageously, this can allow the inputs to be modeled in a reasonable and realistic simulation such that step-by-step optimization can occur in accordance with the simulated optimization of inputs. The functionality of base control as disclosed herein may include several types and/or modifications of standard MPC, such as nonlinear MPC, linear MPC, explicit MPC, and robust MPC.

Figure 15:
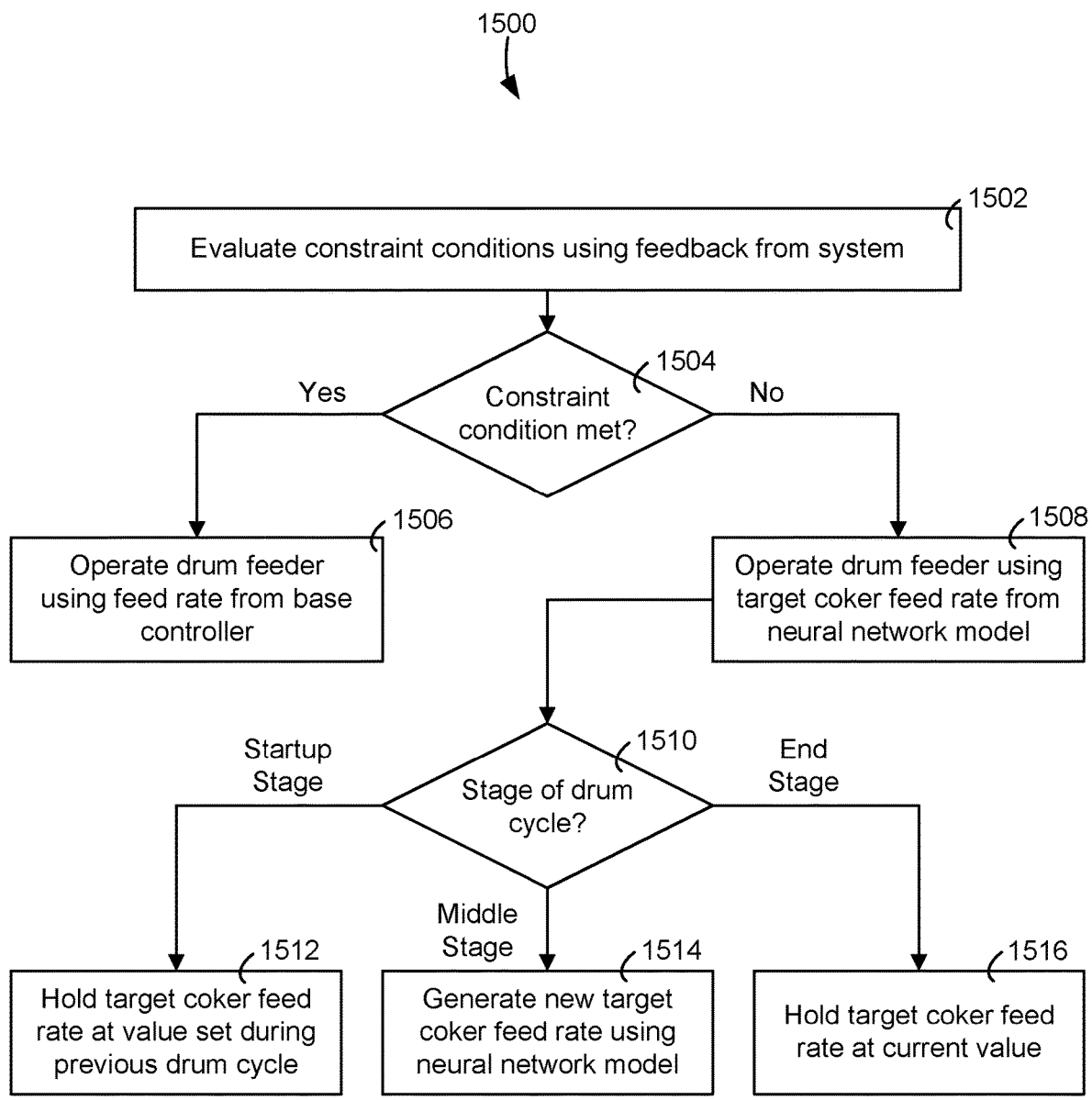
FIG. 15 is a flow diagram of a process for controlling a coker feed rate, which can be performed by the controller of FIG. 14, according to some embodiments.

Referring now to FIG. 15, a process 1500 for determining a control action based on whether or not constraints have been met within coker feed rate controller 218 is shown, according to exemplary embodiments. Process 1500 may be performed by various modules within coker feed rate controller 218, such as control signal generator 1406. In some embodiments, process 1500 acts as a process for implementing base control when a constraint has been met within coker feed rate controller 218. When the constraint has not been met, coker feed rate controller 218 maintains using the typical control schema (e.g., the neural network).

Process 1500 is shown to include evaluating constraint conditions using feedback from system 100 (step 1502). In some embodiments of this step, control signal generator 1406 and/or constraint evaluator 1404 evaluate the constraints received by sensors 230, user device 238, and/or constraint database 1408. In a general embodiment, constraints may include a predetermined threshold that, when met or crossed, indicates that a constraint has been met. For example, a temperature threshold may be implemented for the feed rate such that the feed is entering the drum at a high enough temperature. If the feed drops below this temperature, which may be determined by sensors 230, the constraint is met.

Process 1500 is shown to include determining whether the constraint has been met (step 1504). Step 1504 may be performed by control signal generator 1406. If control signal generator 1406 determines that a constraint has been met, control signal generator 1406 may generate control signals based on base control. This may include generating control signals based on the base control feed rate received by base controller 1410. For example, process 1500 operates drum feeder 1412 using the feed rate from the base controller (step 1506). In another embodiment, if control signal generator 1406 determines that a constraint has not been met, control signal generator 1406 may generate control signals based on the typical control operation, which can include the target coker feed rate from neural network model 216, and various information from cycle stage evaluator 1402 and constraint evaluator 1404. For example, control signal generator 1406 operates drum feeder 1412 using the target coker feed rate from neural network model 216 (step 1508).

Process 1500 is shown to include determining the stage of the drum cycle (step 1510). As discussed above with reference to FIG. 14, the control decisions may not only be based on the various constraints and whether they have been met, the control decisions may also be based on what stage of the drum cycle the batch is presently operating. Stages of the drum cycle may be separated by time or by outage levels. For example, the startup stage may be approximately the first hour of drum cycle operation. The middle stage may be time after the startup stage until 1.22 m from the outage target is reached. The end stage may be the last 1.22 m until the outage target is reached. These stages are meant to be exemplary and various thresholds for determining the stages may be considered. An exemplary embodiment of control actions based on different stages of the drum cycle is shown in greater detail with reference to FIG. 16 below.

Process 1500 is shown to include holding the target coker feed rate at the value set during the previous drum cycle (step 1512). In some embodiments, coker feed rate controller 218 may not want to implement the control actions based on the target coker feed rate of the immediate drum cycle, in the event that undetermined constraints are being met. In an exemplary embodiment, the constraints for the present drum cycle may take a certain amount of time to determine such that the some or all of the constraint decisions for the present drum cycle are indeterminate during the startup stage. Accordingly, the previous cycle's target coker feed rates may be used.

Process 1500 is shown to include generating a new target coker feed rate using neural network model 216 (step 1514). Once the startup stage has ended, the new target coker feed rate may be used to determine control actions. This middle stage of the drum cycle may be most of the drum cycle (e.g., 60%, 70%, 80%, etc.) and is where both the neural network and base control can be implemented. During the middle stage, processing of controller 202 is implementing normally without holds on the feed rate or any other manipulated variable.

Process 1500 is shown to include holding the target coker feed rate at the current value (step 1516). The end stage of the drum cycle can be the last portion of the drum cycle prior to switching over to the next drum. During this stage, the target coker feed rate determined from the nearly-finished drum cycle is maintained at the current value as was determined in the middle stage. In some embodiments, this is done to prevent any unanticipated constraints that may occur near the end of the cycle (e.g., incorrect drum outage prediction, foam-over potential, etc.). As such, the target coker feed rate is maintained at a constant value throughout the end stage. In other embodiments, the end stage includes little or no hold on the target coker feed rate.

Neural Net Control Schema
Neural Net-Base Control

Referring generally to FIGS. 16-21, various embodiments are shown of implementing the neural net, base control, or, at times, a combination of both, according to exemplary embodiments. The neural net, as referred to herein, may refer to the various control circuitry that implements the control logic of the various modules in controller 202. For example, text box 1604 in FIG. 16 states, ". . . the neural net will calculate the required coke rate to achieve the desired drum outage goal." This can refer to target coke rate calculator 214 or other components of controller 202.

Coke Rate Control Diagrams

Figure 16:
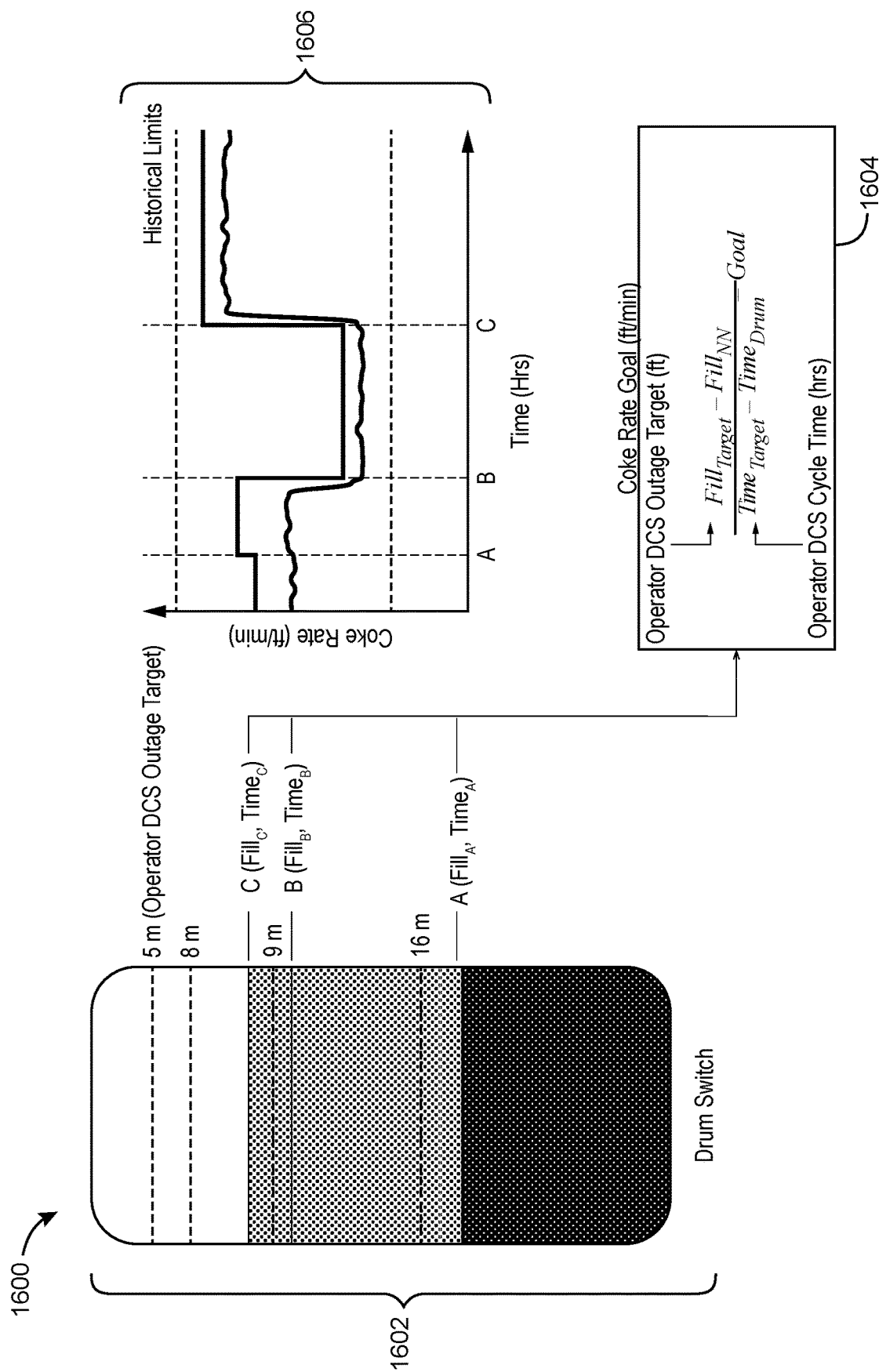
FIG. 16 is a diagram of determining a target coke rate, which can be performed by controller of FIG. 2, according to some embodiments.

Referring now to FIG. 16, a diagram 1600 for determining a coke rate goal is shown, according to exemplary embodiments. As referred to herein, a coke rate goal may be identical or substantially similar to the target coke rate determined by target coke rate calculator 214. The coke rate goal may be determined after every neural network step. In some embodiments, it used the operator base control inputs for outage target and cycle time and continually recalculates the predicted drum outage and cycle time.

In some embodiments, the coke rate goal (e.g., the target coke rate, etc.) cannot be set outside of an historical coke rate range. The historical coke rate range may include some or all of the previous drum cycle information relating to the range of coke rate values. For example, the historical coke rate range may be 0.08-0.11 m/min. This may be implemented to prevent the neural network chasing significantly large coke rate goals which can induce a significantly large feed rate. Diagram 1700 is shown to include drum diagram 1602, equation 1604, and graph 1606.

Drum diagram 1602 may show the various drum outage levels for generating equation 1704. Drum diagram 1602 shows the drum filling up to three distinct fill levels (Fill A at Time A, Fill B at Time B, and Fill C at Time C). These levels are shown on graph 1606. The coke rate goal and coke rate are shown on graph 1606 as they progress through a drum cycle that crosses the three distinct fill levels. These data lines are maintained within the limits of the historical coke rate range. The coke rate goal is determined based on equation 1604. Equation 1604 is provided below:

$$\frac{\text{Fill}_{Target} - \text{Fill}_{NN}}{\text{Time}_{Target} - \text{Time}_{Drum}} = \text{Goal}$$

where $\text{Fill}_{Target}$ is the target fill level (i.e., drum size minus outage target), $\text{Fill}_{NN}$ is the current coke level calculated by controller 202 (e.g., the neural network), $\text{Time}_{Target}$ is the target duration of the drum cycle, $\text{Time}_{Drum}$ is the amount of time elapsed since the beginning of the drum cycle, and Goal is the calculated coke rate goal. Alternatively, the numerator of equation 1704 can be replaced with "$\text{Outage}_{NN}$–$\text{Outage}_{target}$" where $\text{Outage}_{NN}$ is the current drum outage calculated by controller 202 and $\text{Outage}_{target}$ is the target drum outage. Either formulation of equation 1704 results in the numerator indicating the amount of remaining space to be filled in the drum. In some embodiments, the $\text{Fill}_{Target}$–$\text{Fill}_{NN}$ portion of the equation is in units of meters (m) and the $\text{Time}_{Target}$–$\text{Time}_{Drum}$ portion of the equation is in units of minutes (min), yielding a coke rate in meters/minutes (m/min).

Figure 17:
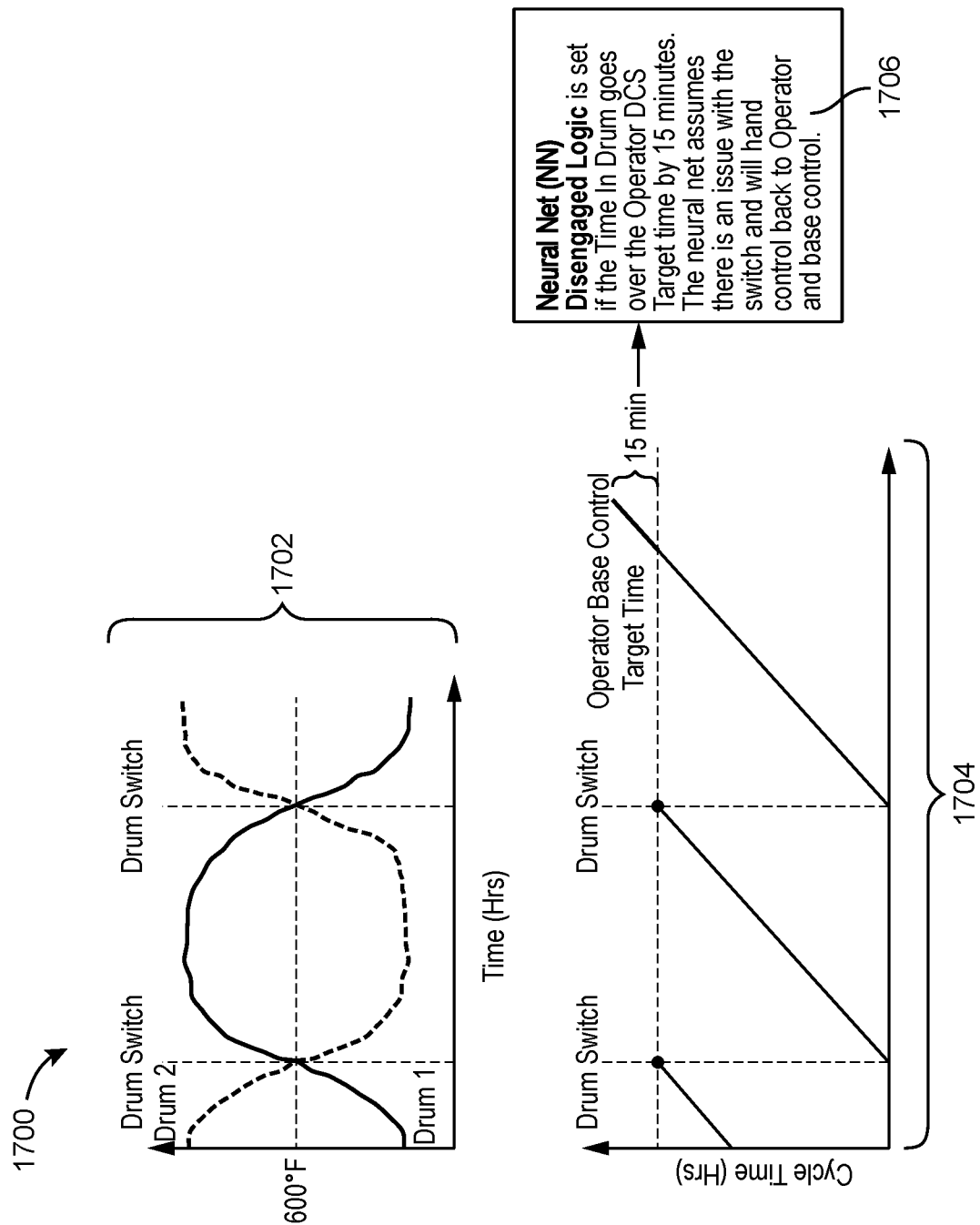
FIG. 17 is a diagram of determining the time in a drum for a drum cycle, which can be performed by the predictor of FIG. 12, according to some embodiments.

Referring now to FIG. 17, a diagram 1700 for determining the time in drum is shown, according to exemplary embodiments. The various processes disclosed with reference to FIG. 17 may be performed by drum outage predictor 222 as shown in FIG. 12, coke rate adjuster 220 as shown in FIG. 10, or neural network trainer 212 as shown in FIG. 9. In some embodiments, the "time in drum" is the amount of time that the current drum cycle has been operating since the last drum switch. Diagram 1700 includes graphs 1702, 1704 and text box 1706.

Graph 1700 discloses the drum switch times at various temperatures. Graph 1702 shows two lines, one for drum 1 (e.g., drum 116) and one for drum 2 (e.g., drum 118). Graph shows the temperature increase of drum 1 to 600° C. and the temperature decrease of drum 2 to 600° F. until they converge at 600° F. Once this occurs, a drum switch is implemented such that the temperature of drum 1 continues to increase and the temperature of drum 2 continues to decrease. Eventually the temperatures converge to 600° F. at another drum switch, and the process repeats itself. In various embodiments, the temperature at which the drum switch is implemented may be 700° F. or various other temperatures.

Graph 1704 shows the cycle time over a time period of at least two drum switches. A drum switch occurs when the target time is reached. Text box 1706 shows that a control action is performed if the time in drum goes over the target time by 15 minutes. Specifically, text box 1706 states, "The neural network DISENGAGED LOGIC is set if the Time In Drum goes over the operator base control target time by 15 minutes. The neural network assumes there is an issue with the switch and will hand control back to operator and base control." The threshold of 15 minutes for going over the target time is shown to be exemplary and can be any amount of time. Text box 1806 indicates that in the event that the time has gone over the target time by 15 minutes, base control takes over control and performs, controls, and monitors controller 202 or various components therein.

Figure 18:
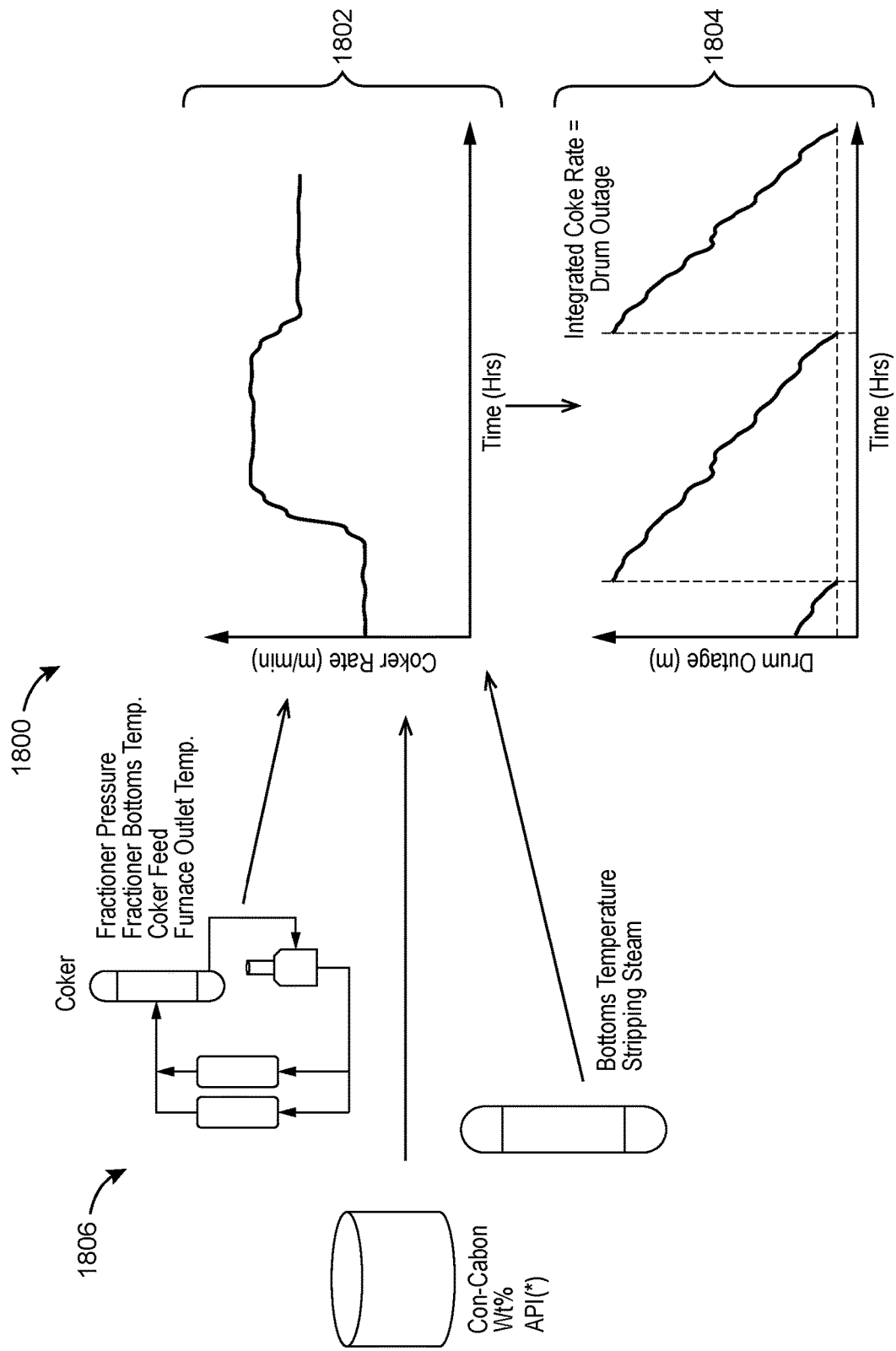
FIG. 18 is a diagram for determining a predicted coke rate, which can be performed by the controller of FIG. 2, according to some embodiments.

Referring now to FIG. 18, a diagram 1800 for determining a coke rate inferential is shown, according to exemplary embodiments. As described herein, coke rate interferential can be the amount of coke potentially present in the coker feed at any given moment. Coke rate inferential may be identical or substantially similar to the predicted coke rate as determined by neural network model 216 as shown in FIG. 7. Diagram 1800 is shown to include system 1806 including a crude oil feed, coker subsystem and a vacuum tower. Diagram 1800 further shows graph 1802 of coke rate vs. time and graph 1804 of drum outage vs. time.

System 1806 may be configured to determine a target coke rate via neural network model 216. For example, using variables from the crude oil feed, vacuum tower, and the coker subsystem (e.g., fractionator pressure, fractionator bottoms temperature, coker feed, furnace outlet temperature, etc.), a non-linear neural network coke rate inferential was developed. In some embodiments, the neural network is trained to control the coke rate with the coker feed rate. Graph 1802 represents this, where the coke rate inferential (e.g., target coke rate) is shown to vary over a period of time. Graph 1804 shows a respective drum outage vs. time graph of the coke rate inferential of graph 1802. As the drum outage reaches a minimum (e.g., 1 m., 2 m., etc.) the drum switch occurs and the drum outage begins at a maximum. In some embodiments, the drum outage is determined by integrating the coke rate over the time interval.

Coke Rate Bias Diagrams

Figure 19:
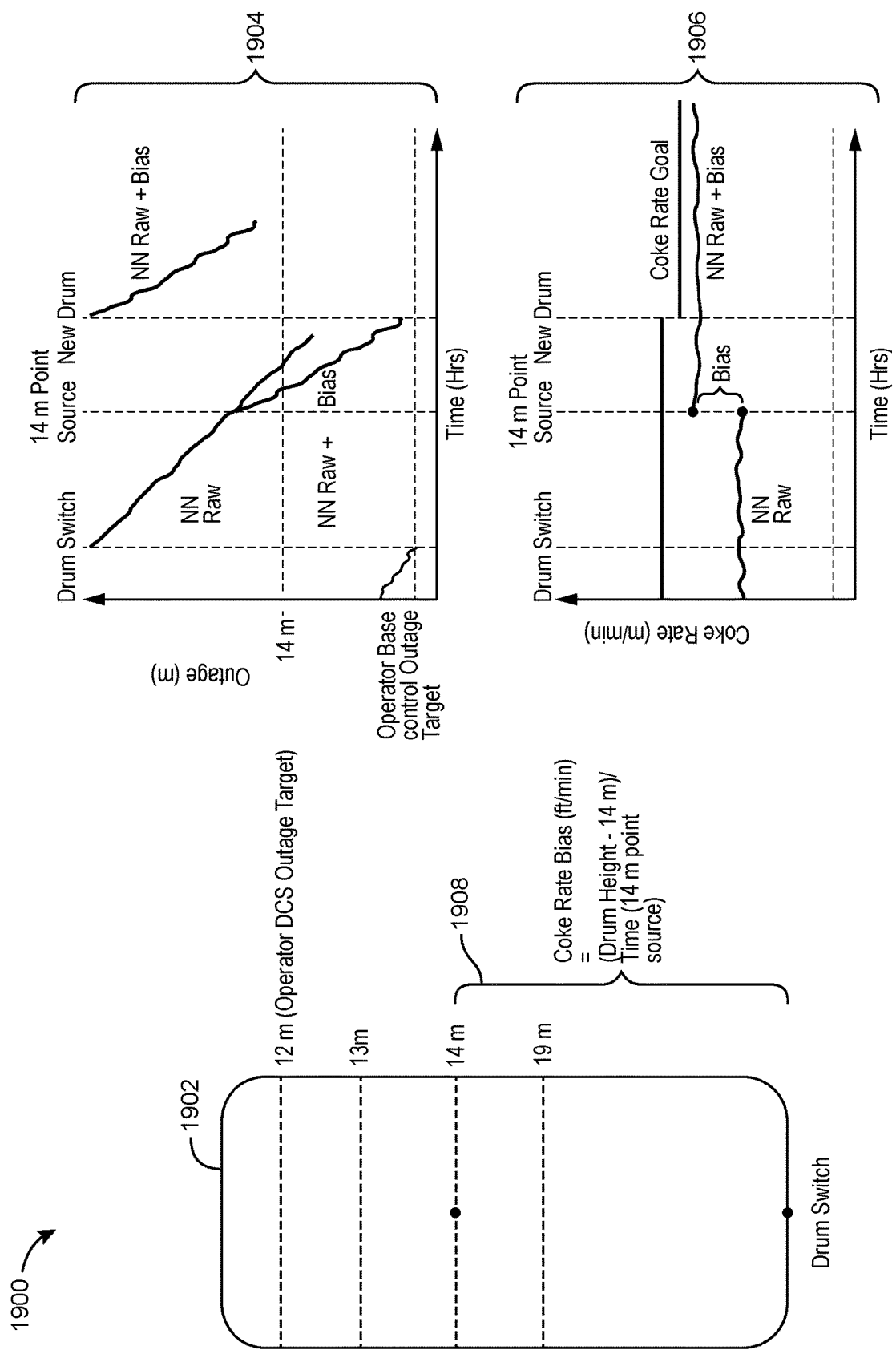
FIG. 19 is a diagram for determining a coke rate bias, which can be performed by the adjuster of FIG. 10, according to some embodiments.

Referring now to FIG. 19, a diagram 1900 for determining coke rate bias is shown, according to exemplary embodiments. The processes described in diagram 1900 may be performed by various components within controller 202, such as coke rate adjuster 220. As discussed above at two different types of biases may be considered within controller 202: drum outage bias and coke rate bias. In a general embodiment, the predicted coke rate is combined with an "actual" coke rate determined via a point source (e.g., 14 m point source as shown by drum diagram 2102). Diagram 1900 is shown to include drum diagram 1902, graphs 1904, 1906, and coke rate bias 1908.

Drum diagram 1902 shows an exemplary drum with outage levels and various point sources 234. Diagram 1902 shows the operator base control outage target at 12 m, with a point source at 14 m. In some embodiments, the coke rate is shown to be calculated by the equation provided below:

$$\text{Coke Rate}\left(\frac{m}{\min}\right) = \frac{h_{drum} - 14 \text{ m}}{\text{time}_{14m}}$$

where $h_{drum}$ is the height of the drum and $\text{time}_{14\,m}$ is the time at the 14 m point source. For example, at a drum height of 20 m and a time at the 14 m point source of 7.5 hours (450 min.), the coke rate bias would be:

$$\frac{20 \text{ m} - 14 \text{ m}}{450 \text{ min.}} = 0.013 \left(\frac{m}{\min}\right)$$

In some embodiments, the coke bias would then be calculated by calculating the difference between the predicted coke rate and the actual coke rate, as described with reference in FIGS. 10-11.

In some embodiments, the coke rate inferential is trained from the bottom of the drum to the 4.6 m point source. Therefore, any foam detection logic (e.g., an indication that foam is occurring), the coke rate bias will be applied. In some embodiments, the coke rate bias is carried into the next drum, unlike the fill bias (e.g., drum outage bias) that may get reset after every drum switch. Advantageously, this allows the neural network (e.g., neural network model 216, neural network trainer 212) to learn from every drum cycle.

Figure 21:
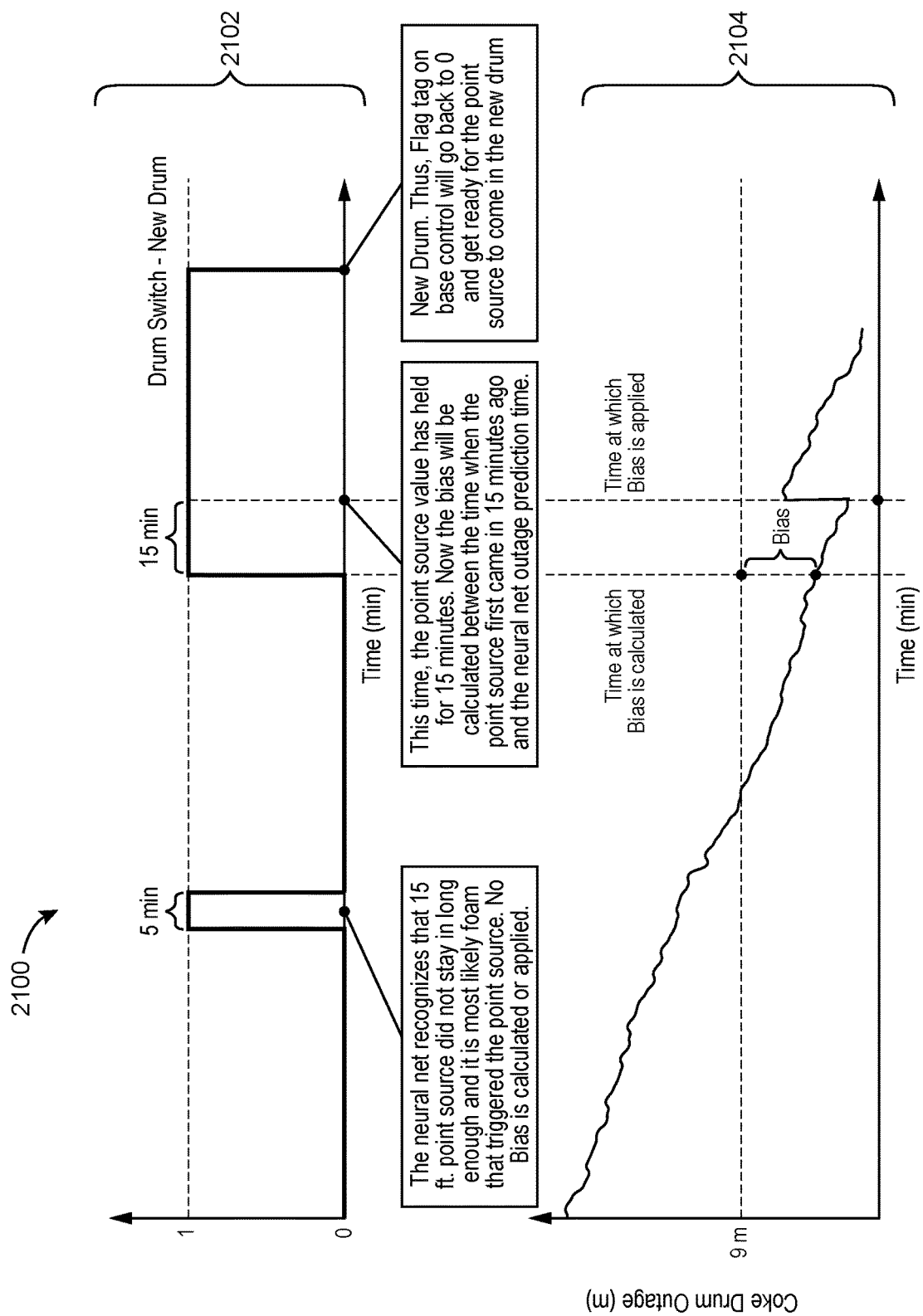
FIG. 21 is a diagram for implementing drum outage bias in a coke drum, which can be performed by the predictor of FIG. 12, according to some embodiments.

Still referring to FIG. 21, graph 1904 shows the drum outage in feet over a period of at least two drum switches in hours. Graph 1904 begins with the drum outage reaching a minimum, indicating the drum cycle has completed. After the drum switch occurs, the outage level reverts back to a maximum and begins to decrease. During this period, no bias has been induced and the outage level remains unadjusted. Once the outage level reaches the 14 m point source, the coke rate bias is induced, lowering the adjusted drum outage level from the original level.

Graph 1904 represents a similar timeline for coke rate bias. Graph 1904 shows the coke rate in m/min over a period of at least two drum switches in hours. The coke rate goal (e.g., target coke rate) is established. The actual coke rate operates normally until reaching the 14 m point source. At this point, a bias may be applied based on a difference between the predicted coke rate determined from neural network model 216 and the actual coke rate determined from the point source data. Graph 1904 shows the coke rate bias added to the predicted coke rate to create an adjusted coke rate.

Drum Outage Bias Diagrams

Referring now to FIG. 20, a diagram 2000 for implementing drum outage bias is shown, according to exemplary embodiments. The processes described with reference to diagram 2002 may be performed by various components of controller 202, such as drum outage predictor 222. In some embodiments, drum outage bias is calculated using foam-detection bias rules (e.g., control logic performed in outage bias calculator 1212) to bias the neural network predicted drum outage. This may be done by taking the difference between the neural network predicted drum outage and the drum outage determined by various point source data. In a general embodiment, any point throughout the drum cycle may be the point source indicator where biasing will occur, but 8 m and 16 m point sources may be preferred. Diagram 2300 is shown to include drum diagram 2302 and graph 2304.

Drum diagram 2002 shows various point sources at 12 m, 13 m, 14 m, 16 m and maximum height. Graph 2004 shows the drum outage from maximum to 12 m throughout a drum cycle. At the top-left of graph 2004, a drum switch occurs and the drum outage begins at the maximum amount. The drum outage steadily decreases until a 14 m point source is hit. Once the drum outage level hits 14 m via the 14 m point source a delay period occurs to determine whether the indication that coke has been generated up to 14 m of drum outage (i.e., the 14 m point source was reached) is true, or if it was a false positive. In some embodiments, a false positive may include reaching a point source with foam, rather than coke. As the coke drum begins to fill up with solid coke, the liquid level and the foaming head are pushed up. If left unchecked, the foam can reach near the top of the coke drum and potentially exit the drum, or "foam-over".

In the case of a foam-over, hydrocarbons can be carried overhead and foul transfer lines from the coke drum to the fractionation drum (e.g., fractionator 114), and the suction screens of the bottom of fractionator 114 can become plugged. The finer particles of coke that pass through the suction screens can deposit in the furnace heater tubes and result in severe fouling. In some embodiments, the foam-over event can also lead to excess silica downstream, potentially poisoning various hydrodesulphurization (HDS) catalysts. Therefore, proper application of the antifoam can be critical in coke production. In most coke production systems and applications, various anti-foaming chemicals are supplied to limit foam-overs.

In the present embodiment, the delay period may be sufficient to allow a time period for which the foam can subside. In the event that excess foam set off the trigger (e.g., a flag of the 14 m point source) for the 14 m point source, the delay period will follow. During the delay period (e.g., 10 min., 15 min., 20 min., etc.), the raw (i.e., unbiased) drum outage will still be considered for processing in the neural network. Once the delay period ends, and the foam has subsided, the 14 m point source should no longer be triggered. As such, a bias will be added to the drum outage level. As shown in graph 2004, the drum outage bias is applied after the delay period after hitting the 14 m point source. In this case, the neural network prediction (i.e., raw drum outage) was greater than that 14 m point source prediction. As such, the bias added to the raw drum outage lowered the value to increase accuracy. This process is shown to reoccur at the 13 m point source. In this case, the raw drum outage was less than the 13 m point source prediction. As such, the bias added to the raw drum outage raised the value to increase accuracy.

In some embodiments, another set of drum outage logic (e.g., the neural network disengaged logic) is set if the drum outage bias is greater than the largest acceptable error (e.g., 0.91 m, etc.). In some embodiments, this bias should be reviewed before engaging the neural network again. In some embodiments, the notification for engaging the neural network disengaged logic will show on a neural network application (e.g., web application, phone application, etc.).

Referring now to FIG. 21, a diagram 2100 for determining foam detection logic is shown, according to exemplary embodiments. In some embodiments, controller 202 contains control logic for incorporating the logic within the point source tags in addition to a time validation (e.g., a time delay, etc.) to ensure that the point sources are met. The neural network recognizes that the 9 m point source did maintain a signal indicating that coke has reached the 9 m point source for an acceptable amount of time. As such, no bias is applied. After a subsequent period of time, the 9 m point source is engaged for a much longer period of time (i.e., greater than 15 min.). As the exemplary embodiment has implemented a threshold at 15 min. for coke reaching the 9 m point source, the second time the 9 m point source is reached, it surpasses this threshold. Accordingly, the bias is applied, as shown in graph 2404. The processes disclosed with reference to FIG. 24 may be performed by various components within controller 202, such as drum outage predictor 222. Diagram 2400 is shown to include graph 2102 and graph 2104.

Graph 2102 shows a logic diagram for engaging a flag for a 4.6 m point source. In a general embodiment, a flag is a value that acts as a signal for a function or process, where the value of the flag is used to determine the next step of a program. Generally, flags are often binary flags, which contain a Boolean value (true or false). Graph 2402 shows two distinct logical jumps, one near the beginning of graph 2102 that lasts for a total of 5 minutes, and one later in graph 2404 that lasts for a period greater than 15 minutes. In some embodiments, the first time period of the first logical jump from 0 to 1 is time t0, the jump 5 minutes later from 1 to 0 is time t1, the logical jump from 0 to 1 of the second logical jump is time t2, and the jump a time greater than 15 minutes back down to 0 is t3. With regards to the first logic jump (t1) at the 5 min. mark for the 4.6 m point source of graph 2402, the neural network recognizes that the 4.6 m point source did not stay in long enough and it can most likely be inferred that foam that triggered the point source. Accordingly, no bias is calculated or applied. However, once a time period of 15 min. occurs (t3-t4) for the 4.6 m point source flag (e.g., the second logic jump), the point source value has held for 15 minutes. Once it has been determined that the 4.6 m point source flag is not a false positive (because the point source flag has remained true for a given amount of time), the bias is calculated based on the value of the predicted drum outage at the time t3 at which the 4.6 m point source flag was first triggered. For example, the predicted drum outage is shown as having a value of 3.96 m at time t3, which is 0.61 m less than the drum outage indicated by the 4.6 m point source at that time. Accordingly, a drum outage bias of −0.61 m is calculated and applied. Because the drum outage bias is not applied until it has been confirmed that the 4.6 m point source flag is not a false positive, the drum outage bias is not applied until time t4. In the present embodiment, once a drum switch occurs, the flag will go back to 0 and get ready for the point source to come in the new drum.

Graph 2104 shows a respective coke drum outage vs. time relationship over the same period of time as shown in graph 2102. In graph 2104, the coke drum outage steadily decreases as the coke drum fills up. Once the bias is calculated at the 15 min. mark of the 4.6 m point source (first dashed line), the coke drum outage continues to steadily decrease without an applied bias. Once the time delay is complete, the bias is applied. The coke drum outage increases in value as the bias was positive, indicating that the neural network-predicted drum outage was lower than the drum outage predicted by the 4.6 m point source. Accordingly, the coke drum outage steadily decreases after increasing in value from a jump where the bias is applied.

In some embodiments, the point source flags are for the neural network, base control, or both. In some embodiments, the tags will identify which drum is online and wait for the point source to be over a predetermined percentage (e.g., 30%, 40%, etc.) before activating the neural network flag. In some embodiments, the flags are designed for 16 m, 9 m, 8 m, and 4 m outage levels.

Neural Network Processes

Figure 22:
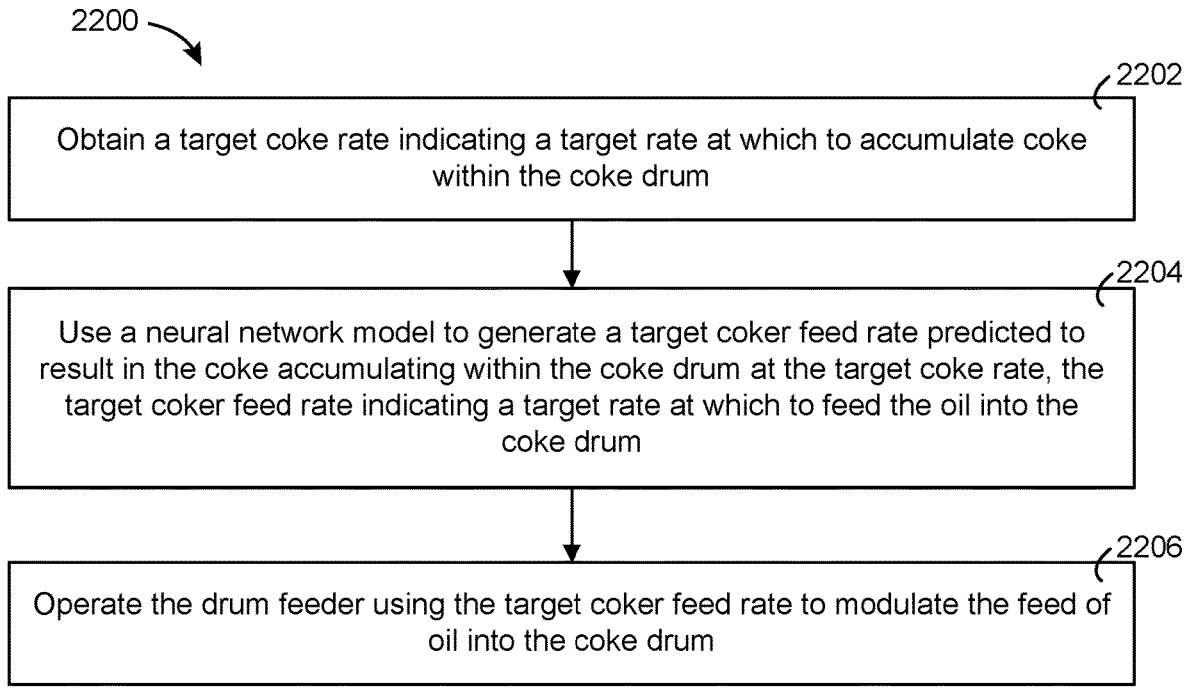
FIG. 22 is a flow diagram of a process for determining and implementing a target coker feed rate to satisfy a target coke rate, which can be performed by the controller of FIG. 2, according to some embodiments.

Referring now to FIG. 22, a process 2200 for operating a drum feeder based on a predicted coke rate is shown, according to exemplary embodiments. Process 2200 may be performed by any components within controller 202 described herein. In some embodiments, process 2200 acts a general process for implementing a neural network within an oil refinery control system.

Process 2200 is shown to include obtaining a target coke rate indicating a target rate at which to accumulate coke within the coke drum (step 2202). In some embodiments, neural network model 216 receives a target coke rate from target coke rate calculator 214. Neural network model 216 may use the target coke rate combined with learned weights received from neural network trainer 212 to determine either a target coker feed rate and/or a predicted coke rate.

Process 2200 is shown to include using a neural network model to generate a target coker feed rate predicted to result in the coke accumulating within the coke drum at the target coke rate, the target coker feed rate indicating a target rate at which to feed the oil into the coke drum (step 2204). In some embodiments, neural network model 216 generates a target coker feed rate that will satisfy the target coke rate. This can be based on additional factors than just the feed capacity. User constraints, temperature constraints, drum size, crude oil attributes, and various other features can affect the accuracy of the target coker feed rate.

Process 2200 is shown to include operating the drum feeder using the target coker feed rate to modulate the feed of oil into the coke drum (step 2206). Controller 202 may operate drum feeder 1412 in accordance with the target coker feed rate generated by neural network model 216. In some embodiments, other factors need to be taken into account prior to operating drum feeder 1412. Particularly, other factors, such as stage in the drum cycle, various constraints and whether they have been met, base control constraints, and base control feed rates may impact the control signals provided to drum feeder 1412.

Figure 23:
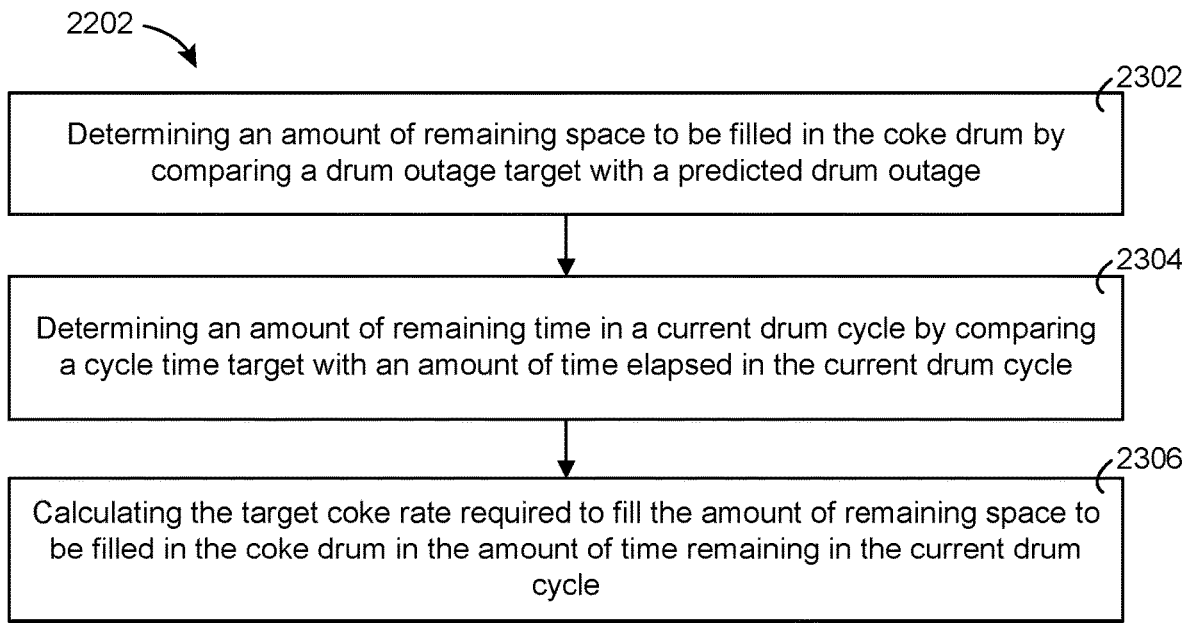
FIG. 23 is a flow diagram of a process for obtaining a target coke rate, which can be performed by the calculator of FIG. 3, according to some embodiments.

Referring now to FIG. 23, a detailed flow diagram of step 2202 is shown, according to some embodiments. FIG. 23 may disclose the method for obtaining a target coke rate. Step 2202 is shown to include determining an amount of remaining space to be filled in the coke drum by comparing a drum outage target with a predicted drum outage (step 2302). In some embodiments, drum outage predictor 222 generates a predicted drum outage and user device 238 provides an outage target to target coke rate calculator 214. Remaining space calculator 302 combines the predicted drum outage and outage target to determine the remaining space in the drum.

Step 2202 is shown to include determining an amount of remaining time in a current drum cycle by comparing a cycle time target with an amount of time elapsed in the current drum cycle (step 2304). In some embodiments, user device 238 provides the cycle time target and drum switch detector 312 provides the time since the last drum switch to remaining time calculator 304 to generate the remaining time in the drum cycle.

Step 2202 is shown to include calculating the target coke rate required to fill the amount of remaining space to be filled in the coke drum in the amount of time remaining in the current drum cycle (step 2306). In some embodiments, rate calculator 306 calculates the target coke rate by processing the remaining space in the drum and the remaining time in the cycle to determine the target coke rate.

Figure 24:
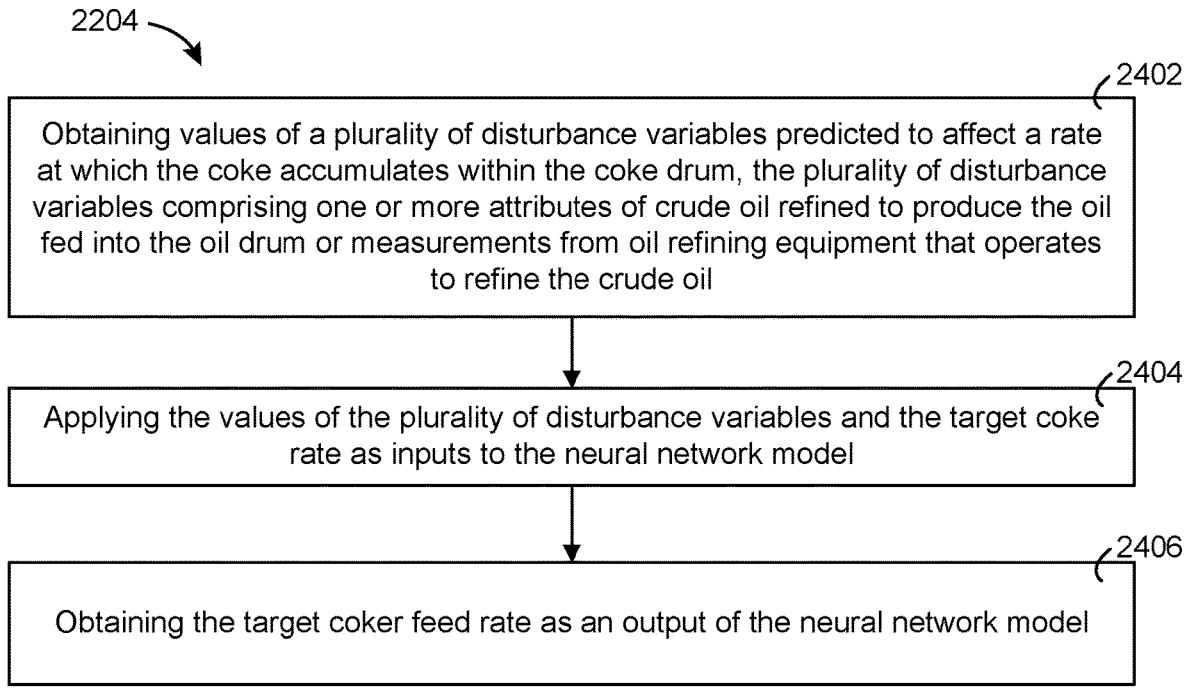
FIG. 24 is a flow diagram of a process for generating a target coker feed rate, which can be performed by the neural network model of FIG. 2, according to some embodiments.

Referring now to FIG. 24, a detailed flow diagram of step 2204 is shown, according to some embodiments. Step 2204 is shown to include obtaining values of a plurality of disturbance variables predicted to affect a rate at which the coke accumulates within the coke drum, the plurality of disturbance variables comprising one or more attributes of crude oil refined to produce the oil fed into the oil drum or measurements from oil refining equipment that operates to refine the crude oil (step 2402). As discussed above, disturbance variable may any variable this is received as an input and used as a factor in controlling the manipulated variables (e.g., furnace feed rate). These disturbance variables (e.g., furnace average coil outlet temperature, vacuum tower stripping steam flow rate, etc.) can affect the coke production inside of the coke drum. As such various DV's are received and processed prior to determining a target coker feed rate.

Step 2204 is shown to include applying the values of the plurality of disturbance variables and the target coke rate as inputs to the neural network model (step 2404). Neural network model 216 can receive the values of the various disturbance variables and use them to determine the target coke rate. In some embodiments, the received DV values are compared with training data from neural network trainer 212 to improve the accuracy of the target coke rate.

Step 2204 is shown to include obtaining the target coker feed rate as an output of the neural network model (step 2406). Neural network model 216 can provide the generated target coker feed rate to coker feed rate controller 218 to adjust the feed rate. In some embodiments, neural network model 216 generates a predicted coke rate based on the target coke rate and measurements/crude attributes received at neural network model 216. Target coker feed rate may be implemented by controlling drum feeder 1412.

Figure 25:
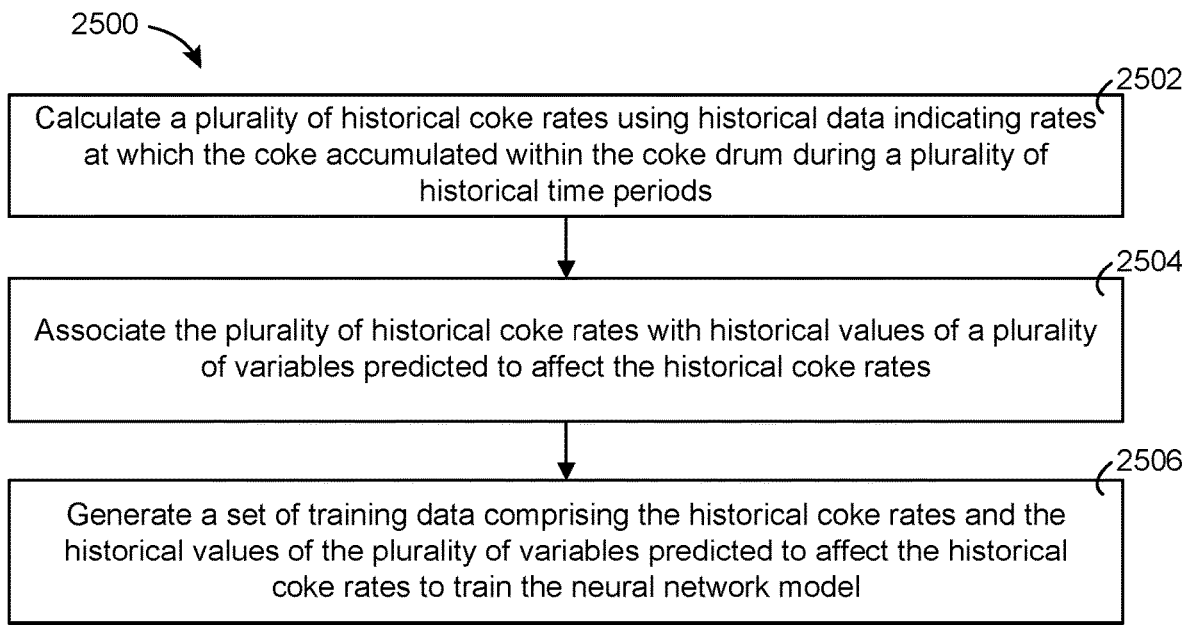
FIG. 25 is a flow diagram of a process for generating training data which can be used by the neural network trainer of FIG. 2, according to some embodiments.

Referring now to FIG. 25, a process 2500 for generating training data for a neural network model is shown, according to some embodiments. In some embodiments, process 2500 is performed by neural network trainer 212. Process 2500 is shown to include calculating a plurality of historical coke rates using historical data indicating rates at which the coke accumulated within the coke drum during a plurality of historical time periods (step 3002). Neural network trainer 212 can receive historical data from database 240. Database 240 may include data relating to or include control variables (e.g., MV's).

Process 2500 is shown to include associating the plurality of historical coke rates with historical values of a plurality of variables predicted to affect the historical coke rates (step 3004). Once the plurality of coke rates have been generated, neural network trainer 212 may associate the rates with historical values (e.g., MV's) such that neural network model 216 can learn previous historical values of MV's and associated historical coke rates.

Process 2500 is shown to include generating a set of training data comprising the historical coke rates and the historical values of the plurality of variables predicted to affect the historical coke rates to train the neural network model (step 2506). In some embodiments, neural network trainer 212 generates a set of training data with the historical coke rates and associated MV values. This data is provided to neural network model 216 for training. Specifically, neural network trainer 212 can adjust the weighting given for the input and black-box layers such that neural network model 216 begins to more accurately predict coke rates. An example of neural network trainer 212 training neural network model 216 is described above with reference to FIG. 2.

As disclosed herein, various systems and methods may be incorporated partially or entirely in to other systems disclosed herein. For example, system 500 as shown in FIG. 5 can be entirely incorporated into system 200 for controlling/monitoring system 100. In another example, process 1100 for adjusting the coke rate of a received predicted coke rate may be implanted entirely by system 200 as shown in FIG. 2. Additionally, various components may be referred to with different references but can perform identically or substantially similarly. For example, drum outage predictor 222 may be identical or substantially similar to drum outage predictor 222.

In some embodiments, drum outage target levels may vary in small or large amounts in relation to outage levels described herein. For example, FIGS. 16, 19, and 20 disclose coke rate information for drums with operator base control outage targets of 12 m Drum outage targets in other embodiments may be less aggressive, and may be as high as 5 m or even higher. The various drum outages disclosed above are shown as exemplary embodiments and should not be limiting to the aforementioned 12 m operator base control outage target levels for coke drums 116, 118. Additionally, various outage levels prior to the outage target (e.g., 12 m 13 m, 14, etc.) at which point source data may be used, are also shown as exemplary and makers/points at other outage levels may be considered.

Control Systems and Processes

Referring now to FIGS. 26-41, several examples of control systems and processes which can be used to monitor, control, and/or optimize a refinery coker system or any other petroleum refining system are shown, according to various exemplary embodiments. Controller 202 can be configured to use any or all of control systems or processes described with reference to FIGS. 26-41 in addition to or in place of any of the control systems and processes described with reference to FIGS. 1-25 to monitor or control system 100, system 200, or any of the other systems or devices described herein. In some embodiments, controller 202 can be configured to switch between the control systems and processes described with reference to FIGS. 1-25 and the additional or alternative control systems and processes described with reference to FIGS. 26-41. For example, controller 202 can include a control module (e.g., a module of memory 210) configured to execute each of the additional control processes described with reference to FIGS. 26-41 and can select one or more of the control processes to execute for monitoring and controlling the equipment of system 100 or system 200. In some embodiments, a user can select which control process to execute or which control methodology to use (e.g., by providing user input via a user interface) and controller 202 can switch to the selected control process or methodology responsive to the user selection.

The embodiments described with reference to FIGS. 26-41 refer to plant controller 2602 and plant controller 3802. However, it should be understood that plant controller 2602 and plant controller 3802 may be embodiments of controller 202 as described with reference to FIGS. 1-25, or may be implemented as separate controllers configured to execute the processes described with reference to FIGS. 26-41. Accordingly, the different reference numbers used to refer to plant controller 2602 and plant controller 3802 do not necessarily imply that plant controller 2602 and/or and plant controller 3802 are separate from controller 202, although a separate implementation is contemplated and within the scope of the present disclosure. As described above, system 100 and system 200 may include many or all of the same components, and therefore any references to system 100 or system 200 in the discussion of the following control systems and processes should be understood as referring to system 100, system 200, or both.

Model Predictive Control

Figure 26:
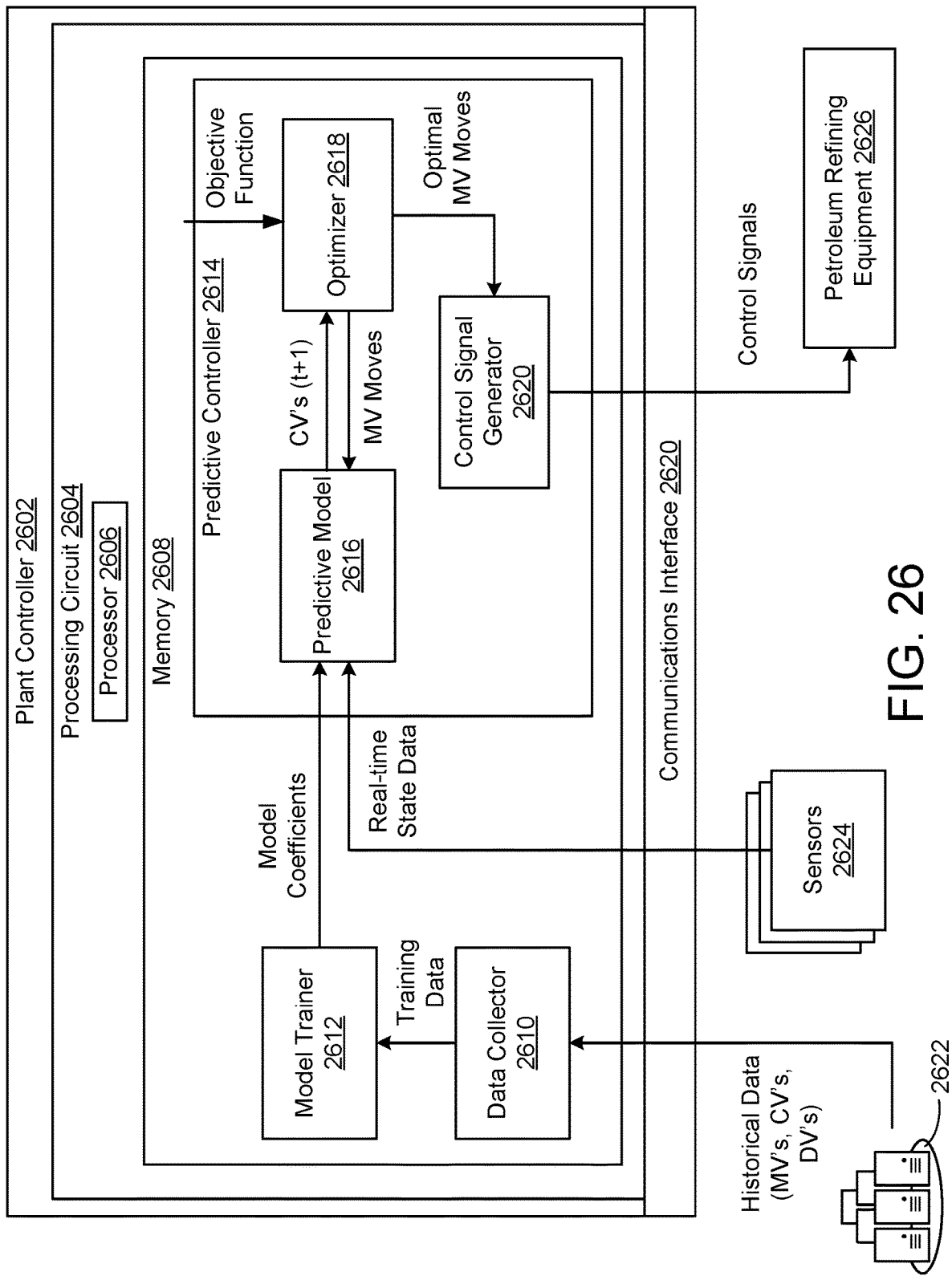
FIG. 26 is a block diagram of a plant controller with model predictive control functionality, which can be implemented in the petroleum refinery system of FIG. 1, according to some embodiments.

Referring now to FIG. 26, a detailed block diagram of a plant controller 2602 for performing control of system 100 and/or system 200 using predictive control (e.g., Model Predictive Control (MPC), etc.) is shown, according to some embodiments. Plant controller 2602 is shown interacting with database 2622, sensors 2624, and petroleum refining equipment 2626. Database 2622 and sensors 2624 may be embodiments of historical database 240 and sensors 230, respectively, as described with reference to FIGS. 1-25. Similarly, petroleum refining equipment 2626 may include any or all of the controllable equipment, systems, or devices of system 100 and/or system 200 as described with reference to FIGS. 1-25.

In some embodiments, plant controller 2602 is configured to generate and provide control signals to the components of system 100 to control the operation thereof. The control signals can include values or setpoints for any of the controllable variables, operating parameters, settings, or any other adjustable variable or parameter that can be used to adjust the operation of system 100. For example, plant controller 2602 may provide control signals to petroleum refining equipment 2626 (e.g., atmospheric distillation unit 110, vacuum distillation unit 112, fractionator 114, coke drums 116-118, valve 120, pump 122, and/or furnace 124) to control the operation of system 100.

In some embodiments, plant controller 2602 uses predictive modeling to make control decisions, as shown in FIG. 26. In other embodiments, plant controller 2602 uses one or more neural networks (e.g., a predictor neural network, a controller neural network, etc.) to make control decisions for some or all parts of system 100 and/or system 200, which is described in greater detail with reference to FIGS. 28-37. As shown in FIG. 26, plant controller 2602 receives historical data from database 2622 and input data from sensors 2624 and uses model predictive control to generate control signals for petroleum refining equipment 2626. Plant controller 2602 may be configured to control an oil refinery process as a whole (e.g., control system 100) or a portion or subsystem of system 100, such as system 200.

In some embodiments, the control process performed by plant controller 2602 may seek to improve and/or optimize the most valuable total yield of system 100 (e.g., solid coke), optimize the total volume gain of system 100 (e.g., the most amount of product being products regardless of the value of each respective fraction, etc.), or a combination thereof, using a model-based feedback control technique such as MPC or other types of feedback control techniques (e.g., proportional control, proportional-integral (PI) control, proportional-integral-derivative (PID) control, etc.). For example, plant controller 2602 may generate the most valuable amount of total product yield output by system 100, by operating atmospheric distillation unit 110, vacuum distillation unit 112, fractionator 114, coke drums 116-118, valve 120, pump 122, and/or furnace 124 to optimize the total yield of solid coke. In some embodiments, the crude oil feed into atmospheric distillation unit 110, the residual oil feed rate into coke drums 116-118 (i.e., the coker feed rate), and/or the feed rates of other inputs to the devices of system 100 can be controlled to adjust the total yield. In some embodiments, plant controller 2602 is configured to improve and/or optimize a combination of the most valuable total yield of system 100 and the most valuable total product quality of system 100. In some embodiments, any and all combinations of adjusting pressures or temperatures within the devices of system 100 and/or input feed rate into the devices of system 100 can be used as manipulated variables to control total product yield, most valuable product yield, and product quality.

Plant controller 2602 is shown to include a communications interface 2620 and a processing circuit 2604 including a processor 2606 and a memory 2608. For implementations in which plant controller 2602 is an embodiment of controller 202, communications interface 2620 may be an embodiment of communications interface 206, processing circuit 2604 may be an embodiment of processing circuit 204, processor 2606 may be an embodiment of processor 208, and memory 2608 may be an embodiment of memory 210, as described with reference to FIG. 2. Processing circuit 2604 can be communicably connected to communications interface 2620 such that processing circuit 2604 and the various components thereof can send and receive data via communications interface 2620. Processor 2606 can be implemented as a general purpose processor, an application specific integrated circuit (ASIC), one or more field programmable gate arrays (FPGAs), a group of processing components, or other suitable electronic processing components.

Communications interface 2620 can be or include wired or wireless communications interfaces (e.g., jacks, antennas, transmitters, receivers, transceivers, wire terminals, etc.) for conducting data communications. In various embodiments, communications via communications interface 2620 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 2620 can include a Wi-Fi transceiver for communicating via a wireless communications network. In another example, communications interface 2620 can include cellular or mobile phone communications transceivers.

Memory 2608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 2608 can be or include volatile memory or non-volatile memory. Memory 2608 can include database components, object code components, script components, or any other type of information structure for supporting the various activities and information structures described in the present disclosure. According to an example embodiment, memory 2608 is communicably connected to processor 2606 via processing circuit 2604 and includes computer code for executing (e.g., by processing circuit 2604 and/or processor 2606) one or more processes described herein.

In some embodiments, plant controller 2602 is implemented within a single computer (e.g., one server, one housing, etc.). In various other embodiments plant controller 2602 can be distributed across multiple servers or computers (e.g., that can exist in distributed locations). Further, while FIG. 26 shows database 2622 outside of plant controller 2602, in some embodiments database 2622 can be hosted within plant controller 2602 (e.g., within memory 2608). Memory 2608 is shown to include data collector 2610, model trainer 2612, and predictive controller 2614.

Data collector 2610 may be configured to collect or receive one or more data sets for controlling some or all components of systems 100-600. Data collector 2610 may receive manipulated variables (MV's), controlled variables (CV's), and disturbance variables (DV's). MV's may be variables that can be adjusted to keep CV's at their intended set points. MV's may include control signals that are provided as inputs to equipment, setpoints that are provided as inputs to controllers, or other variables that can be directly manipulated (i.e., adjusted, set, modulated, etc.) by plant controller 2602. Examples of MV's for system 100 can include the temperatures or pressures within atmospheric distillation unit 110, vacuum distillation unit 112, fractionator 114, coke drums 116-118, and/or furnace 124, the position of valve 120, the feed rates of crude oil, residual oil, and/or coking vapor into the components of system 100, or any other controllable variable parameter that can be adjusted to control the operation of system 100, or any combination thereof.

CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), yield of one or more oil products produced by system 100, error of a measured or calculated variable relative to a setpoint or target value, or any other values that characterize the performance or state of a controllable system or process. Some CV's may be quantities that are not capable of being directly manipulated by plant controller 2602, but rather can be affected by manipulating corresponding MV's that affect the CV's. CVs may include the volumes, flow rates, mass, or other variables that quantify the amount of the various output oil products produced by system 100 and/or any metrics based on such variables (e.g., error relative to a setpoint or target).

DV's or "load variables" may represent disturbances that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance. Any of the variables described as MV's may be DV's in some embodiments in which the system cannot control those variables. Similarly, any of the variables described as DV's may be MV's in some embodiments in which the system can control those variables. Data collector 2610 is configured to provide the training data to model trainer 2612. Examples of DV's in an oil refinery system can include feed rate, feed composition, hydrogen flow rate, reactor pressure, catalyst age, separation and/or fractionation section temperatures and pressures, reactor temperature differentials, intermediate flow rates, upstream unit process operating conditions, or any combination thereof, to the extent that such variables are not directly controllable in some implementations.

Data collector 2610 may be configured to separate the collected data into one or more episodes. In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. In some embodiments, the samples of historical data are separated into "episodes" which include the historical data for a window of time. These episodes may be predetermined prior to being received at plant controller 2602 (e.g., the start times, end times, and/or duration of each episode may be predefined) or can be automatically determined within plant controller 2602 based on attributes of the historical data and/or an operating condition of system 100 at a time when the historical data were collected.

In some embodiments, data collector 2610 groups the time steps into "episodes" for modeling purposes. Each episode may encompass a period of time large enough to include multiple samples of the historical data (e.g., multiple time steps, etc.), but may encompass a period of time small enough such that the behavior of the system is substantially linear within a given episode. In other words, each episode may include a portion of the historical data that, when viewed in isolation, indicates substantially linear system behavior within the episode. In an exemplary embodiment, plant controller 2602 is used to provide control instructions to system 100, which operates in a non-linear environment as indicated by the received historical data, when modeled holistically. However, the relationship between the MV's and CV's and/or the DV's and CV's can be modeled as a set of localized linear relationships when broken up into multiple episodes.

In some embodiments, data collector 2610 is configured to generate representative values of the MV's, CV's, and DV's for each of the episodes of the historical data. In some embodiments, the representative values may be average, median, mean, or other type of aggregated values of the MV's, DV's, and CV's over the corresponding episode. For example, the representative value of a particular MV over the episode may be the average of all of the values of that particular MV indicated by the samples of the historical data within the episode.

In some embodiments, the historical data include not only multiple samples of the variables that affect the plant equipment (e.g., DV's, MV's, etc.) but also multiple samples of the variables that are affected by operating the plant equipment (e.g., CV's), which are the indicators of the final control product. As control systems for plants can be non-linear, the historical data is separated into episodes that allow the data to be modeled in a linear fashion. The relationships between the MV's and the CV's maintain a linear or generally linear relationship within each episode. In some embodiments, the samples within each episode are then averaged to create a single representative value of each of the variables for the episode, which are then used to train a neural network or other type of predictive model.

Model trainer 2612 may be configured to generate a model of the plant (e.g., system 100) based on the historical data. In some embodiments, the training data also includes data relating to moving MV's and/or step testing. Model trainer 2612 may be configured to determine one or more coefficients of a model that represents the dynamic and sometimes nonlinear behavior of the plant. For embodiments in which plant controller 2602 performs model predictive control, the coefficients of the model may include values of one or more matrices (e.g., elements of the matrices) that characterize the dynamic behavior of the plant. Model trainer 2612 may be configured to provide the model coefficients to predictive controller 2614, which is shown to include predictive model 2616, optimizer 2618, and control signal generator 2620.

Predictive model 2616 may receive the model coefficients from model trainer 2612, resulting in predictive model 2616 becoming a trained or identified model. Predictive model 2616 may be configured to predict values of the CV's at the next time step t+1 as a function of the real-time state data at time step t as well as a set of potential values for the MV's at time step t. Specifically, the predictive model can relate the reactor severity MV to the amounts of the various output products CVs. The set of values for the MV's may be treated as decision variables and adjusted by optimizer 2618 while performing an optimization process, described in greater detail below. During operation, predictive controller 2614 may provide real-time state data as an input to predictive model 2616 and use predictive model 2616 to generate a trajectory of predicted values of the CV's over a time horizon that extends from time t to a future time step t+T (i.e., t, t+T).

Optimizer 2618 may be configured to perform an optimization process using predictive model 2616. In some embodiments, the optimization process includes optimizing an objective function or cost function to determine optimal values of the MV's or optimal MV moves. In some embodiments, the objective function may consider both an established price of each hydrocarbon product produced by system 100 during operation (e.g., solid coke and/or other products) and the flow rate or production rate of each hydrocarbon product, as well as the cost of feed and the flow rate of the feed. An exemplary objective function is shown below:

$$Obj.\ Function\left(\frac{flow}{time}\right) = [\text{unconverted product } (UCO) * UCO \text{ price} +$$
$$\text{coke rate} * \text{coke price} + \text{diesel flow} * \text{diesel price} +$$
$$\text{naphtha flow} * \text{naphtha price} + \text{kerosene flow} * \text{kerosene price} +$$
$$LPG \text{ flow} * LPG \text{ price}] - [\text{flow rate} * \text{feed price}]$$

where the coke rate is the rate at which coke is produced within coke drums 116-118 and the diesel flow, naphtha flow, kerosene flow, and other flows are the flow rates (e.g., volume flow rate, mass flow rate, etc.) of other hydrocarbon products which can be produced in system 100 in some embodiments.

The prices can be used within the objective function can be updated while the model is running closed-loop and controlling the process. Changes in prices can cause the model to manipulate the operating conditions of system 100 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products rather than optimizing the maximum value of the one or more hydrocarbon products. For example, the objective function could include:

$$Obj.\ Function\left(\frac{vol}{time}\right) =$$
$$[\text{unconverted product } (UCO) + \text{solid coke rate} + \text{diesel flow} +$$
$$\text{naphtha flow} + \text{kerosene flow} + LPG \text{ flow}] - [\text{feed flow rate}]$$

without including the pricing of the one or more hydrocarbon products. In various embodiments, the pricing of the one or more hydrocarbon products can be included in the objective function for some hydrocarbon products and not others. In some embodiments, the objective function could be or include the sum of the output flow rates divided by the input flow rate, such that the objective function can quantify the volume gain (e.g., the ratio of output volume to input volume).

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 2602 for processing. In some embodiments, system 100 includes measuring instruments capable of measuring the CN of the diesel stream (e.g., in real-time, at certain intervals, etc.) and providing the CN data back to plant controller 2602.

Using the above example, the objective function could include:

$$Obj.Function\left(\frac{flow}{time}\right)$$
$$= [[\{\text{diesel flow}\} * \{\text{diesel price}\} + \{\text{cetane upgrade value}\}$$
$$* \{\text{cetane number in diesel stream} - \text{base cetane number}\}]$$
$$+ \text{unconverted product } (UCO) * UCO \text{ price} + \text{coke rate} * \text{coke price}$$
$$+ \text{naphtha flow} * \text{naphtha price} + \text{kerosene flow} * \text{kerosene price}$$
$$+ LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the objective function can include any number of weights in the objective function such that the various hydrocarbon products are weighted differently when attempting to maximize the objective function. The prices in the first embodiment of the objective function shown above act as weights on the flow rate terms. However, it is contemplated that different weights can be applied to the flow rate terms other than their prices. For example, if maximizing the volume of naphtha produced by system 100 is desired, while maximizing the volume of jet fuel is less desired, then the variable representing naphtha volume may be weighted higher than the variable representing jet fuel volume, regardless of the prices of the naphtha and jet fuel. In some embodiments, multiple weights may be applied to each of the flow/production rate terms and may combine to form an overall weight for each flow/production rate term such that the overall weight applied to a flow/production rate term is a combination (e.g., a sum or product) of a price-based weight and a price-independent weight. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Several additional examples of objective functions or terms which can be included in the objective function are described in greater detail below with reference to FIGS. 38-41. Optimizer 2618 may be configured to iteratively adjust the values of the MV's and use predictive model 2616 to predict the resulting values of the CV's that will result from each set of MV's. Optimizer 2618 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves. The objective function in this embodiment and/or the other control embodiments described with reference to other figures may be the same as or similar to any of the objective functions described in the present disclosure or may include some or all of the terms from any of the objective functions described in the present disclosure.

The optimal MV moves generated by optimizing the objective function may be provided to control signal generator 2620, such that control signal generator 2620 can provide control signals to petroleum refining equipment 2626 to satisfy the optimal MV moves. In some embodiments, only the first step of the control strategy (e.g., the modeled predictions of CV's over the time horizon determined by predictive model 2616) is implemented. Then, process repeats itself, and the calculations are repeated starting from the new current state, yielding a new control scheme and new predicted state path for both the MV's and CV's.

Petroleum refining equipment 2626 may be configured to receive control signals from plant controller 2602 and affect the manipulated variables of the system 100. In some embodiments, petroleum refining equipment 2626 includes a valving system to affect the flow of feed into atmospheric distillation unit 110 and/or a valving system to affect the flow of residual oil into coke drums 116-118. In some embodiments, petroleum refining equipment 2626 includes equipment capable of adjusting the reactor severity, temperatures, and/or pressures within any of the components of system 100. Sensors 2624 may be configured to provide measurements of environmental data to plant controller 2602 as inputs for making control decisions. In some embodiments, the information from sensors 2624 acts as CV's, MV's, DV's, TVs or any combination thereof for historical data or real-time data of system 100.

Figure 27:
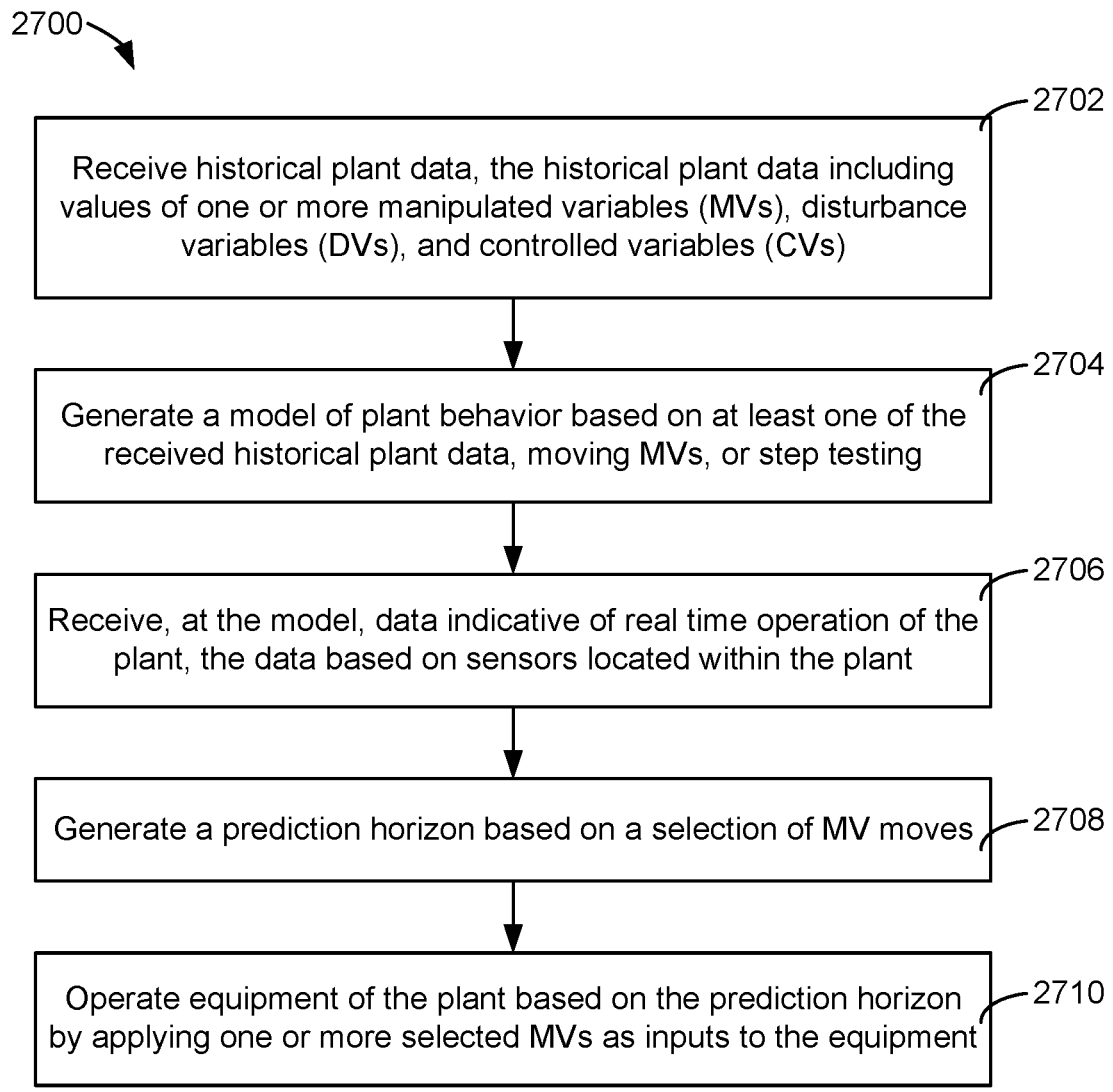
FIG. 27 is a flow diagram of a process for performing model predictive control of a plant, which can be performed by the controller of FIG. 26, according to some embodiments.

Referring now to FIG. 27 a flow diagram of a process 2700 for performing model predictive control is shown, according some embodiments. Process 2700 may be performed by any of the processing circuitry described herein, such as plant controller 2602. In some embodiments, process 2700 is at least partially performed by predictive controller 2614 as described above with reference to FIG. 26.

Process 2700 is shown to include receiving historical plant data, the historical plant data including values of one or more manipulated variables (MV's), disturbance variables (DV's), and controlled variables (CV's) (step 2702). Data collector 2610 may be configured to receive the historical plant data from database 2622. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate a specific feed rate at which residual oil is fed into coke drums 116-118 (MV), the crude attributes of the crude oil received as inputs to system 100 (DV), the temperature or pressure within any of atmospheric distillation unit 110, vacuum distillation unit 112, fractionator 114, coke drums 116-118, or furnace 124 (MV), and the intended or target coke accumulation rate within coke drums 116-118 (TV). The historical data may include the amount of each hydrocarbon product produced at each time step and/or the value of each hydrocarbon product produced at each time step (CV's). The CV's can be based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Other CV's, DV's, MV's, and TVs can also be considered. For example, the CV may also incorporate the price of the different lighter hydrocarbons being produced by system 100 as a factor of the optimization problem. In such embodiments, weights may be accorded to the different light hydrocarbon product yields such that those that have less monetary value are weighted lower than those with higher monetary value. In another example, the quality of the feed acts as a manipulated variable, and the plant has control over selectively mixing the different feed components to achieve a certain feed quality.

Process 2700 is shown to include generating a model of plant behavior based on at least one of the received historical plant data, moving MV's, or step testing. In some embodiments, the model is generated by model trainer 2612. The model can include a predictive model (e.g., a set of matrices used in MPC, a state-space model, a neural network model, etc.), multi-variable algorithms, cost functions, objective functions, optimization constraints, initial values of the model (e.g., initial values of states tracked by the model), and/or other criteria for determining a predictive model.

Process 2700 is shown to include receiving, at the model, data indicative of real-time operation of the plant, the data based on sensors located within the plant (step 2706) and generating a prediction horizon based on a selection of MV moves (step 2708). The model coefficients can be provided to predictive model 2616, wherein the predictive model is configured to generate CV predictions over a time horizon. The time horizon may be relatively short, as only the first move predicted throughout the time horizon may be implemented during model predictive control.

Process 2700 is shown to include operating equipment of the plant based on the prediction horizon by applying one or more selected MV's as inputs to the equipment (step 2710). Control signals may be provided to petroleum refining equipment 2626 to satisfy optimal MV setpoints that, based on the predictions made by predictive model 2616, will achieve the predicted CV's. In some embodiments of implementing process 2700 as described above, the chosen MV moves may typically be those for which horizon provides optimal performance in terms of an objective function (e.g., as described below with reference to process 3100, etc.).

Offline Trained Predictor Neural Network and Controller Neural Network

Figure 28:
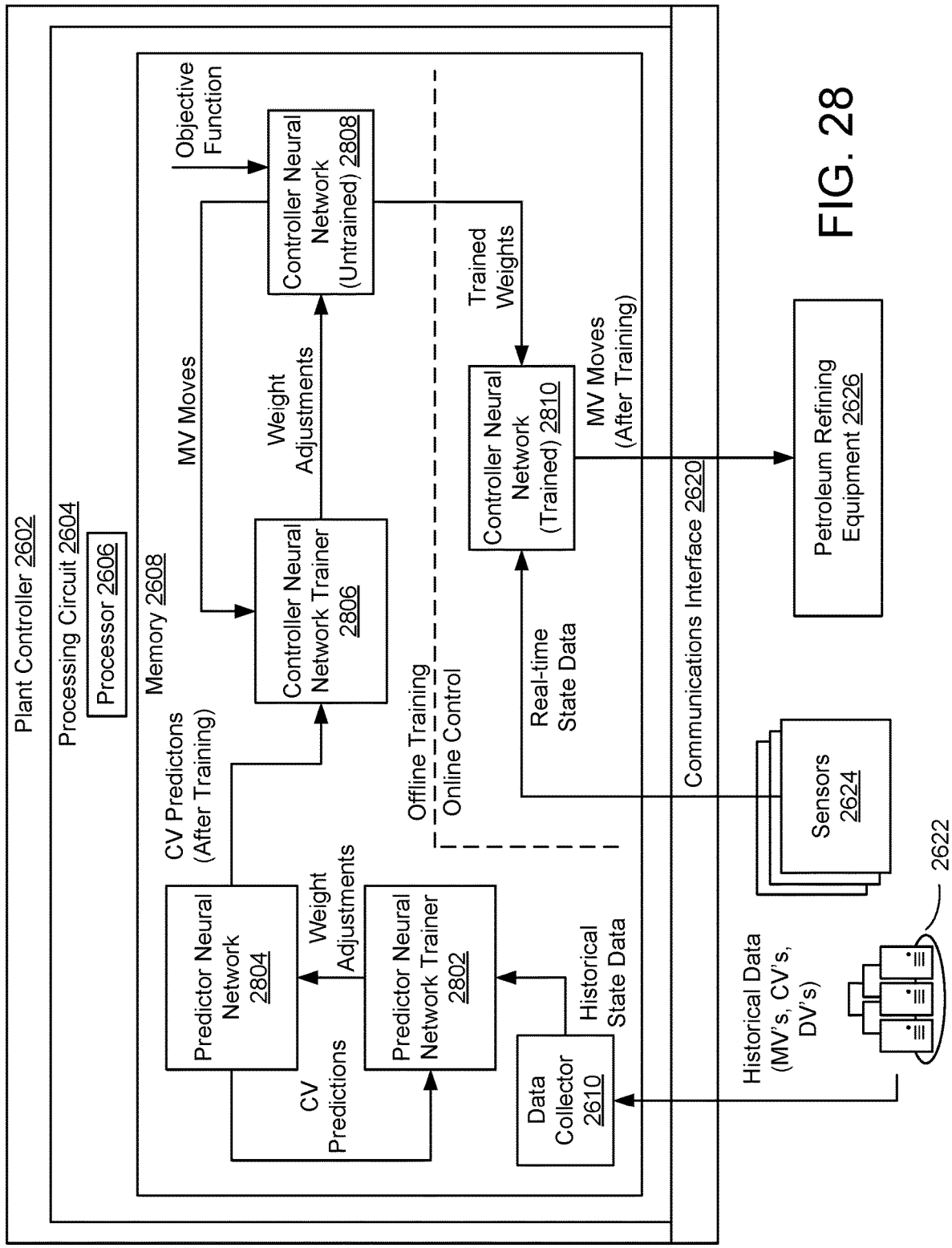
FIG. 28 is a block diagram of a plant controller using offline-trained neural networks to determine MV moves, which can be implemented in the petroleum refinery system of FIG. 1, according to some embodiments.

Referring now to FIG. 28, a block diagram of plant controller 2602 is shown, according to some embodiments. In some embodiments, plant controller 2602 as shown in FIG. 28 may be configured to perform control of the plant using one or more neural networks. In some embodiments, a first neural network (e.g., predictor neural network 2804) is trained offline to make CV predictions. These CV predictions can be provided to a second neural network (e.g., controller neural network 2808) for training. Once trained, the second neural network may provide MV moves that can be used to control petroleum refining equipment 2626. In the embodiment shown in FIG. 28, memory 2608 is shown to include data collector 2610, predictor neural network trainer 2802, predictor neural network 2804, controller neural network trainer 2806, controller neural network (untrained) 2808, and controller neural network (trained) 2810. Any components in FIG. 28 having the same reference numbers as components previously described (e.g., data collector 2610) may operate in the same or similar manner as the embodiment shown in FIG. 26.

Predictor neural network trainer 2802 may be configured to receive the historical data from data collector 2610 and train predictor neural network 2804 by adjusting the weights of predictor neural network 2804. Predictor neural network trainer 2802 may also be configured to receive the CV predictions of the predictor neural network 2804 to facilitate training and determine how the weights need to be adjusted. For example, predictor neural network trainer 2802 may adjust or tune the weights of predictor neural network 2804 such that the CV predictions generated by predictor neural network 2804 comply or align with the values of the CV's in the historical data. An example of a process which can be performed by predictor neural network trainer 2802 to train predictor neural network 2804 is described in greater detail with reference to FIG. 36.

Once trained, predictor neural network 2804 may be configured to provide CV predictions as a function of a given state of the plant (e.g., a set of values of the CV's, MV's, DV's, etc.) which may be provided as an input to predictor neural network 2804. In some embodiments, predictor neural network 2804 is configured to predict the CV's of historical time steps using the set of historical data as an input to predictor neural network 2804. In other embodiments, after training, the predictor neural network 2804 is configured to predict the CV's for future time periods (e.g., future states of the plant). The CV predictions generated by predictor neural network 2804 may be provided to controller neural network trainer 2806 and used to train controller neural network (untrained) 2808.

In some embodiments, predictor neural network trainer 2802 is configured to determine an error between the predicted values of the CV's at historical time step t and actual values of the CV's at historical time step t in the historical training data. This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 2804 may require a certain subset of CV predictions to be "accurate" prior to determining that the training of predictor neural network 2804 is complete. Other methods for determining the error may be considered, such as determining if the answer is within a predetermined range of values or allowing supervised learning from a technician/engineer.

In some embodiments, predictor neural network 2804 is instructed to process a certain number of states, generate a certain number of accurate predictions, or a combination thereof. If this threshold has not been met predictor neural network 2802 continues to train until efficient training inputs have been tested. Once this threshold is met, predictor neural network 2804 may be considered trained.

In the above example, determining the error may be performed in a manner similar to the training of predictor neural network 2804, but instead of adjusting the weights of predictor neural network 2804 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, predictor neural network 2804 is considered ready for operation. Otherwise, one or more parameters of predictor neural network 2804 may be adjusted, such as the weights between nodes of predictor neural network 2804, number of layers, the selected inputs to predictor neural network 2804 (e.g., specific controlled, manipulated and/or disturbance variables used), the size of the intermediary vectors h1, h2, h3, . . . hn and/or the duration T of the time period used to form the input vector x. The training of predictor neural network 2804 may then be repeated MV's.

Instead of the training based on each time point on its own, in some embodiments, the training of predictor neural network 2804 is performed on sequences of time points together. For each sequence of time points, t1, t2, . . . tn, the forming of the vectors and applying of predictor neural network 2804 in order to receive the values of the controlled variables, are performed for the first time point of the sequence t1. Then, instead of immediately adjusting the weights of predictor neural network 2804 according to a comparison to a desired output values vector y', an input vector for the second time point t2 is created using the outputs of the predictor instead of the stored values from database 2622, for the values of the controlled variables at time t1. This process is repeated until predicted values are calculated for time tn. Then, the predicted values for times t1, t2, . . . tn are compared to the stored values using a given metric and the neural network is adjusted accordingly.

In some embodiments, rather than predicting explicit values of CV's, predictor neural network 2804 is trained, using any suitable method known in the art, to produce a distribution over different possibilities. For example, predictor neural network 2804 may output at time point t the mean and covariance of a Gaussian distribution which reflects estimated posterior probabilities of controlled variable values in time point t+1. This allows modeling uncertainty in the behavior of the plant, to optionally be taken into account by plant controller 2602.

In some embodiments, an aggregate prediction error is determined during training of predictor neural network 2804, which can be an error determination that takes into account several predictions made by predictor neural network 2804. The aggregate prediction error could be an average of the errors resulting from each training input, an aggregate error, or any other metric. In some embodiments, the aggregate prediction error weights certain CV predictions over others based on user instruction. For example, it may be more important to accurately predict the most valuable volume gain for one or more hydrocarbon products (a CV in one embodiment) than the flow rate to into or out of any of the components of system 100 (another CV in the embodiment) during training of predictor neural network 2804. Other methods for comparing the aggregate prediction error to a threshold may be considered, such as determining if the error is within a predetermined range of value, determining if the error is off by a predetermined percentage or allowing supervised learning from a technician/engineer to make the decision.

Controller neural network (untrained) 2808 may be configured to determine the appropriate MV moves while also satisfying one or more constraints or objective functions. The objective function in this embodiment may be the same as or similar to any of the objective functions described with reference to FIG. 26 or elsewhere in the present disclosure. In some embodiments, the objective function(s) considered by controller neural network (untrained) 2808 include one or more of the predicted CV's and/or error terms based on the values of the CV's relative to corresponding target values. In some embodiments, the objective function(s) considered by controller neural network (untrained) 2808 can include representations of the value of each of the one or more hydrocarbon products such that maximizing the objective function maximizes the monetary value of the output oil products from system 100. In some embodiments, the objective function(s) considered by controller neural network (untrained) 2808 includes one or more penalties associated with the light hydrocarbon products attempting to be optimized. For example, diesel-like products generated via system 100 may be more valuable than naphtha-like products generated via system 100. As such, the objective function may include weights associated with the variables for each of the hydrocarbon products based on their value, such that increasing the product yield of diesel-like products has a more optimizing effect on the objective function than increasing the product yield of naphtha-like products. This can allow the objective function to not only maximize the total volume gain for one or more hydrocarbons individually and/or as a whole, but maximize the most valuable volume gain for one or more hydrocarbons individually and/or as a whole to produce the most valuable products given the incoming feed. While monetary value is used in the above example as the reason for differentiating objective function weights, other factors can be considered, such as current amount of products, product efficiency at a given reactor severity, customer demands, etc.

In some embodiments, controller neural network (untrained) 2808 is configured to output one or more MV's that will satisfy one or more predicted CV's and/or TVs from a training input. In some embodiments, this is performed by attempting to optimize an objective function (i.e., a function that calculates the error between actual and desired CV values). The objective function(s) may also consider the monetary cost of operating the system in terms of energy consumption, material consumption, or other costs associated with operating the equipment. Objective functions can be augmented with various terms to consider other optimization objectives as well such as penalties for certain types of actions (e.g., switching equipment on/off too rapidly, changing the control signal too rapidly, etc.), penalties for variables exceeding certain limits. These types of penalties can be incorporated into the objective function if they are permitted, or implemented as hard constraints if they are unacceptable and absolutely need to be avoided. Generally, controller neural network (untrained) 2808 may act as a training mechanism for receiving the state information from predictor neural network 2804 and outputting MV moves (e.g., trajectories, etc.) designated to meet the pre-specified constrains and objectives.

Controller neural network trainer 2806 may be configured to adjust the weights of controller neural network (untrained) 2808 such that the values of the MV's or MV moves output by controller neural network (untrained) 2808 optimize the objective function. In some embodiments, controller neural network trainer 2806 uses predictor neural network 2804 to predict the values of the CV's that will result from a given set of MV's output by controller neural network (untrained) 2808 and uses the predicted values of the CV's to evaluate the objective function. Controller neural network trainer 2806 may continue adjusting the weights of controller neural network (untrained) 2808 until the MV's output by controller neural network (untrained) 2808 result in values of the CV's that optimize the objective function over a given time period. This training may resemble the training described above with reference to predictor neural network 2804, with the exception that controller neural network (untrained) 2808 is trained to output MV moves that optimize the objective function, whereas the predictor neural network 2804 is trained to predict CV's that align with historical data. Once trained, controller neural network (untrained) 2808 may become controller neural network (trained) 2810 or the weights from controller neural network (untrained) 2808 may be provided to controller neural network (trained) 2810 for use in online control.

Controller neural network 2810 (trained) is shown receiving real-time state data from sensors 2624 and outputting MV moves as a function of the real-time state data. It should be appreciated that the real-time state data need not come from sensors 2624 in some embodiments, but may be supplied from any type of data source (e.g., databases, controllers, a combination of sensors 2624 and other data sources, etc.). During online control, the current state of the plant may be provided as an input to controller neural network (trained) 2810. The MV moves output by controller neural network (trained) 2810 may be provided to petroleum refining equipment 2626 and/or used to generate control signals that are provided to petroleum refining equipment 2626.

Figure 29:
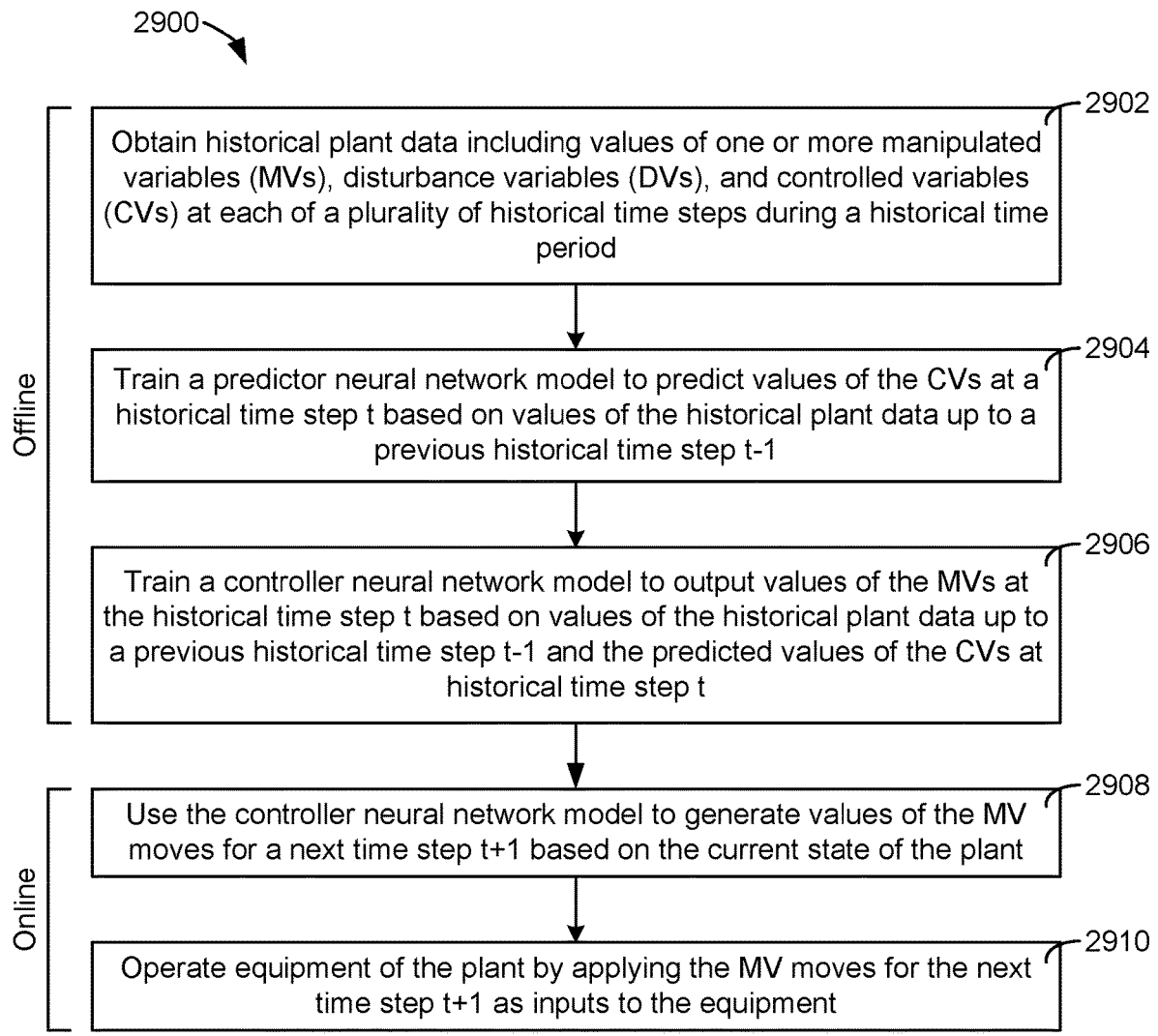
FIG. 29 is a flow diagram of a process for using offline-trained neural networks to determine MV moves, which can be performed by the controller of FIG. 28, according to some embodiments.

Referring now to FIG. 29, a flow diagram of a process 2900 for performing control of the plant using an offline trained predictor neural network and an offline trained controller neural network is shown, according to some embodiments. Process 2900 may be performed by any of the processing circuitry described herein, such as plant controller 2602. In some embodiments, process 2900 is at least partially performed by plant controller 2602, as described with reference to FIG. 28.

Process 2900 is shown to include obtaining historical plant data, the historical plant data including values of one or more manipulated variables (MV's), disturbance variables (DV's), and controlled variables (CV's) (step 2902). Data collector 2610 may be configured to receive the historical plant data from database 2622. In some embodiments, the data includes MV's, DV's, and/or CV's for one or more historical time periods (e.g., historical states) of the plant (e.g., operation of system 100).

Process 2900 is shown to include training a predictor neural network model to predict values of the CV's at a historical time step t based on values of the historical plant data up to a previous historical time step t−1 (step 2904). Predictor neural network trainer 2802 may receive the historical state data from data collector 2610 and begin training predictor neural network 2804. The weights of predictor neural network 2804 may be updated based on the predicted CV predictions received by predictor neural network trainer 2802. Once trained, predictor neural network 2804 can provide CV predictions to controller neural network trainer 2806 for use in training controller neural network (untrained) 2808.

In some embodiments, predictor neural network 2804 is trained with the historical plant data. Predictor neural network 2804 may receive data over any number of time periods (days, weeks, years, etc.) such that predictor neural network 2804 is capable of predicting the CV's of the data set. Plant controller 2602 may compare the error to a threshold and determine that further training is required. The weights of predictor neural network 2804 may be updated accordingly and the training is repeated until the predictions are within an acceptable error percentage or range. The data input may include a vector of values for each of the MV's, DV's, and CV's (i.e., a time series of each variable including one or more time series values up to time step t−1), which could be provided in the form of a matrix or otherwise. The training period may be based on a certain amount of predictions being made, a certain number of historical data sets/states/episodes being analyzed, data for a certain number of future time steps being predicted, or any combination thereof.

In some embodiments, the weights of predictor neural network 2804 and/or bias vectors of predictor neural network 2804 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 2804 is applied to the input vector x and the resultant output vector y is compared to the desired output values vector y'. Based on a difference between the output vector y and the desired output values vector y', the weights of predictor neural network 2804 are adjusted in a direction which reduces the difference. The magnitude of the difference is calculated using any suitable difference measure (e.g., absolute value, sum of squares, etc.). The forming of the vectors, applying predictor neural network 2804, and adjusting the weights is repeated for many time points, such that predictor neural network 2804 reliably models the operation of the system.

Process 2900 is shown to include training a controller neural network model to output values of the MV's at the historical time step t based on values of the historical plant data up to a previous historical time step t−1, and the predicted values of the CV's at the historical time step (step 2906). Controller neural network trainer 2806 may train controller neural network (untrained) 2808 to output values of the MV's at the historical time step t as a function of the current state of the plant at time step t−1. As described above, the process of training the controller neural network model may include adjusting weights of controller neural network (untrained) 2808 until the MV moves are adequate (e.g., based on supervised learning), or until they substantially optimize an objective function. For example, the MV moves output by the controller neural network may be provided as an input to the predictor neural network to predict the values of the CV's that will result from the MV moves. The values of the CV's can then be used to evaluate the objective function as described above. This process of adjusting the weights, generating MV moves, predicting CV values, and evaluating the objective function may be repeated until the performance of the controller neural network is acceptable (e.g., the objective function is sufficiently optimized).

Overall, this allows for a neural network system that can accurately predict appropriate CV's (e.g., most valuable volume gains for one or more hydrocarbon products) based on how the oil refinery has been operating, and then accurately generate moves for how the MV's (e.g., reactor severity, etc.) should be adjusted to accurately reach the predicted CV's. Advantageously, this provides a heighted level of optimization with reduced processing, as the neural networks can be trained offline prior to being implemented.

Process 2900 is shown to include using the controller neural network model to generate values of the MV moves for a next time step t+1 based on the current state of the plant (step 2908). Now that the controller neural network has been trained, controller neural network (trained) 2810 can receive real-time state data indication operation of the plant in real time and determine MV moves based on the received real-time state data.

Offline Trained Predictor Neural Network with Model Predictive Control

Figure 30:
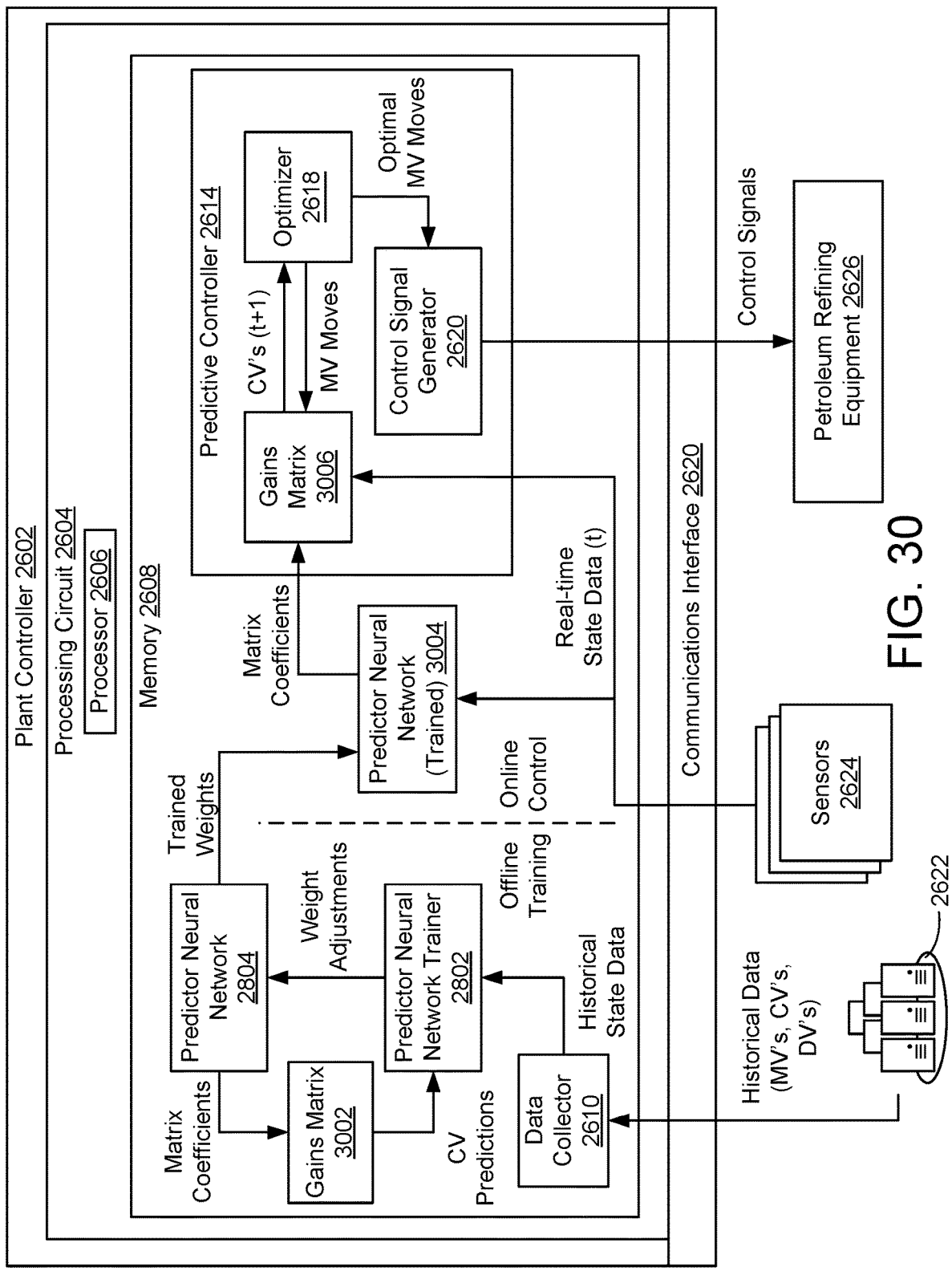
FIG. 30 is a block diagram of a plant controller using an offline-trained neural network to predict CV's for a model predictive controller, which can be implemented in the petroleum refinery system of FIG. 1, according to some embodiments.

Referring now to FIG. 30, a block diagram of plant controller 2602 for performing model predictive control of a plant using offline trained neural networks is shown, according to some embodiments. In some embodiments, plant controller 2602 as shown in FIG. 30 is configured to train a predictor neural network to generate a gains matrix. The gains matrix may be a matrix including a number of coefficients that provides a linearized representation of plant behavior for a given time period. The gains matrix may be generated based on the historical data for a certain time period, wherein the gains matrix represents the behavior of the plant or parts of the plant at that given time period. The gains matrix can then be used as the model of the plant for model predictive control (e.g., control as described above with reference to FIG. 26, performed by predictive controller 2614, etc.). Memory 2608 is shown to include data collector 2610, predictor neural network trainer 2802, predictor neural network 2804, controller neural network trainer 2806, controller neural network (untrained) 2808, and controller neural network (trained) 2810. Any components in FIG. 30 having the same reference numbers as components previously described may operate in the same or similar manner as the embodiment shown in FIG. 26 or FIG. 28, unless different operation is described below.

Predictor neural network trainer 2802 may be configured to train predictor neural network 2804 to generate matrix coefficients for gains matrix 3002 based on one or more historical data sets. The matrix coefficients may be used to create gains matrix 3002, which can include a linear representation (e.g., model) of the plant for that historical time period (e.g., the time period or episode during which the historical state data was collected). Predictor neural network trainer 2802 may be configured to adjust the weights of predictor neural network 2804 and evaluate gains matrix 3002 produced by predictor neural network 2804 to determine whether gains matrix 3002 is accurate. For example, predictor neural network 2802 may apply historical plant data for time step t−1 as an input to an instance of gains matrix 3002 created by predictor neural network 2804 to predict the values of the CV's at time step t. Predictor neural network trainer 2802 may compare the output of gains matrix 3002 to the actual values of the CV's at time step t in the historical data to determine whether gains matrix 3002 is sufficiently accurate. Once the gains matrix 3002 is being adequately generated (e.g., predictor neural network 2804 produces a gains matrix 3002 that results in sufficiently accurate predictions of the CV's based on the historical state data, etc.), predictor neural network 2804 may become predictor neural network (trained) 110.

One example of a gains matrix is shown in the following equation:

$$A(\theta)\Delta V_k = \Delta CV_{k+1}$$

where $A(\theta)$ is the gains matrix, $\Delta V_k$ is a vector of steps or changes in the MV's, CV's and DV's between time step k−1 and time step k, and $\Delta CV_{k+1}$ is a vector of predicted steps or changes in the CV's between time step k and time step k+1. In this example, the gains matrix $A(\theta)$ is multiplied with the vector $\Delta V_k$ of steps or changes in the MV's, CV's and DV's between time step k−1 and time step k (known from the historical data) to calculate the vector $\Delta CV_{k+1}$ of predicted steps or changes in the CV's between time step k and time step k+1.

In some embodiments, $A(\theta)$, $\Delta V_k$, and $\Delta CV_{k+1}$ have the following form:

$$A(\theta) = \begin{bmatrix} \theta_{1,1} & \cdots & \theta_{1,t} \\ \vdots & \ddots & \vdots \\ \theta_{m,1} & \cdots & \theta_{m,t} \end{bmatrix}, \quad \Delta V_k = \begin{bmatrix} \Delta MV_{1,k} \\ \vdots \\ \Delta MV_{l,k} \\ \Delta CV_{1,k} \\ \vdots \\ \Delta CV_{m,k} \\ \Delta DV_{1,k} \\ \vdots \\ \Delta DV_{n,k} \end{bmatrix}, \quad \Delta CV_{k+1} = \begin{bmatrix} \Delta CV_{1,k+1} \\ \vdots \\ \Delta CV_{m,k+1} \end{bmatrix}$$

where $A(\theta)$ is a m×t matrix having coefficients $\theta$, m is the total number of CV's, t is the total number of MV's, CV's and DV's, $\Delta MV_{1,k} \ldots \Delta MV_{l,k}$ are the actual steps or changes in the MV's (l being the total number of MV's) that occurred between time step k−1 and time step k, $\Delta CV_{1,k} \ldots \Delta CV_{m,k}$ are the actual steps or changes in the CV's that occurred between time step k−1 and time step k, $\Delta DV_{1,k} \ldots \Delta DV_{l,k}$ are the actual steps or changes in the DV's (n being the total number of DV's) that occurred between time step k−1 and time step k, and $\Delta CV_{1,k+1} \ldots \Delta CV_{k+1}$ are the predicted steps or changes in the CV's between time step k and time step k+1.

Once predictor neural network (trained) 3004 has been generated (e.g., by importing the trained weights from predictor neural network 2804), predictor neural network (trained) 3004 can be used for online control. Predictor neural network (trained) 3004 is shown receiving real-time state data from sensors 2624 and producing coefficients of a gains matrix 3006 as a function of the real-time state data. Gains matrix 3006 may provide a linearized representation of the dynamic behavior of the plant in real time, localized to the current state of the plant. This can include a live representation (e.g., a single time step), or can include multiple time steps to generate the representation. Gains matrix 3006 can then be used by predictive controller 2614 to predict the values of the CV's at the next time step t+1 as a function of the real-time state data at time step t. For example, predictive controller 2614 may use gains matrix 3006 as a predictive model (e.g., as predictive model 2616), as described with reference to FIG. 26.

Optimizer 2618 may operate in the same or similar manner as described with reference to FIG. 26. For example, optimizer 2618 may perform an optimization process to determine the optimal MV moves based on the predicted CV's from the gains matrix 3006. Optimizer 2618 may use gains matrix 3006 to generate predicted values of the CV's that will result from a given set of MV moves and iteratively adjust the MV moves until optimal values of the CV's are obtained. Control signal generator 2620 may receive the optimal MV moves and generate control signals for petroleum refining equipment 2626 to satisfy the setpoints for the optimal MV moves.

Optimizer 2618 may be configured to perform an optimization process using predictive model 2616. In some embodiments, the optimization process includes optimizing an objective function or cost function to determine optimal values of the MV's or optimal MV moves. The objective function used in the embodiment shown in FIG. 30 may be the same as or similar to any of the objective functions described with reference to FIG. 26, FIG. 28, or elsewhere in the present disclosure. In some embodiments, the objective function may consider both an established price of each hydrocarbon product and the flow rate of each hydrocarbon product, as well as the flow rate of the feed and the price of the feed. In some embodiments, the objective function can include any number of weights in the objective function such that the various hydrocarbon products are weighted differently when attempting to maximize the objective function. For example, if maximizing the volume of naphtha produced by system 100 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 2618 may be configured to iteratively adjust the values of the MV's and use predictive model 2616 to predict the resulting values of the CV's that will result from each set of MV's. Optimizer 2618 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves.

Control signal generator 2620 can be configured to receive MV/CV trajectories and provide control signals to petroleum refining equipment 2626. In some embodiments, control signal generator 2620 generates control signals for petroleum refining equipment 2626 based on the values of the MV's output by optimizer 2618. For example, if the MV value is a temperature of the residual oil feed into coke drums 116-118, the control signal can be a signal for furnace 124 to increase or decrease heating to achieve the target temperature value. This can be advantageous for embodiments in which the MV's are essentially setpoints and a local controller is needed to convert the setpoints into control signals for equipment that operate to achieve the setpoints.

Figure 31:
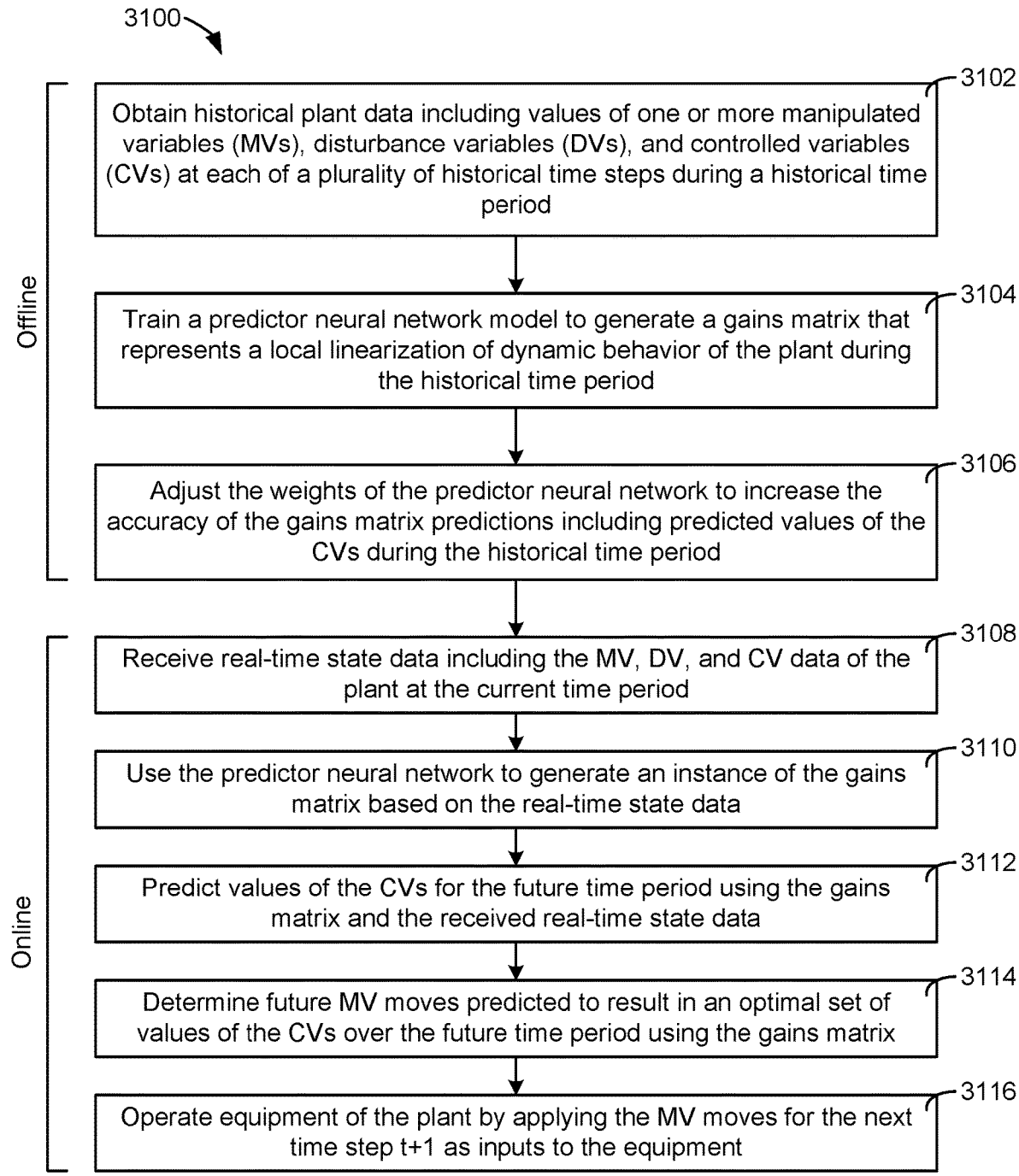
FIG. 31 is a flow diagram of a process for using an offline-trained neural network to predict CV's for a model predictive controller, which can be performed by the controller of FIG. 30, according to some embodiments.

Referring now to FIG. 31, a flow diagram of a process 3100 for performing control of the plant using an offline predictor neural network that generates a gains matrix is shown, according to some embodiments. Process 3100 may be performed by any of the processing circuitry described herein, such as plant controller 2602. In some embodiments, process 3100 is at least partially performed by plant controller 2602 as described above with reference to FIG. 30.

Process 3100 is shown to include obtaining historical plant data including values of one or more manipulated variables (MV's), disturbance variables (DV's), and controlled variables (CV's) (step 3102). Data collector 2610 may be configured to receive the historical plant data from database 2622. In some embodiments, the data includes MV's, DV's, and/or CV's for one or more historical time periods (e.g., historical states) of the plant (e.g., operation of system 100).

Plant controller 2602 may obtain one or more "states" of the plant operation. As discussed above, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. As such, predictor neural network 2804 may use the state data to predict future CV's and provide the predicted CV's to controller neural network 2808 for prediction of future MV's.

Process 3100 is shown to include training a predictor neural network model to generate a gains matrix that represents a local linearization of dynamic behavior of the plant during the historical time period (step 3104) and adjusting the weights of the predictor neural network to increase the accuracy of the gains matrix predictions including predicted values of the CV's during the historical time period (step 3106). Predictor neural network trainer 2802 may be configured to adjust the weights of predictor neural network 2804 to ensure that the gains matrix 3002 generated by predictor neural network 2804 accurately predicts values of the CV's in the historical data set.

Process 3100 is shown to include receiving real-time state data including the MV, DV, and CV data of the plant at the current time period (step 3108), using the predictor neural network to generate an instance of the gains matrix based on the real-time state data (step 3110), and predicting values of the CV's for the future time period using the gains matrix and the received real-time state data (step 3112). Once predictor neural network (trained) 3004 is trained, predictor neural network (trained) 3004 can receive real-time state data (e.g., data relating to the operation of the plant) via sensors 2624 and generate a gains matrix 3006 based on that data. The gains matrix 3006 (i.e., the linearized representation of the current state) can then be used to predict future CV's (e.g., CV's for t+1, etc.), which can be provided to optimizer 2618 during the optimization process.

Process 3100 is shown to include determining future MV moves that result in an optimal set of values of the CV's over the future time period using the gains matrix (step 3114). In some embodiments, the predictive controller 2614 can input the real-time state data into the gains matrix to determine one or more CV values in a future time step, as discussed above. Then, predictive controller 2614 may determine the MV adjustments required to reach the predicted CV value. The MV adjustments can be based on the model presented in the gains matrix, an attempt to satisfy an objective function received by predictive controller 2614, or a combination thereof.

Process 3100 is shown to include operating equipment of the plant by applying the MV moves for the next time step t+1 as inputs to the equipment (step 3116). In some embodiments, petroleum refining equipment 2626 can operate a reactor severity control device using the target severity to modulate the MV (e.g., the temperature affecting the volume of one or more hydrocarbon products within system 100, etc.).

In some embodiments, one or more reactor severity control mechanisms (e.g., modules, components, etc.) are located proximate to one or more components of system 100 or upstream/downstream of one or more components of system 100 to adjust the reactor severity within such components. For example, one reactor severity control mechanism that can adjust the reactor severity within atmospheric distillation unit 110, vacuum distillation unit 112, fractionator 114, etc. at least in part can be a valving system that adjusts the flow of catalyst into one or more of these components. In some embodiments, another reactor severity control mechanism can include a valving system controlling the amount of feed entering such components. In some embodiments, another reactor severity control mechanism is a heat source such as furnace 124 that pre-heats the incoming feed. The reactor severity control mechanisms may be part of petroleum refining equipment 2626 described below, and may be configured to receive control signals from plant controller 2602 to adjust one or more MV's of the plant.

Figure 32:
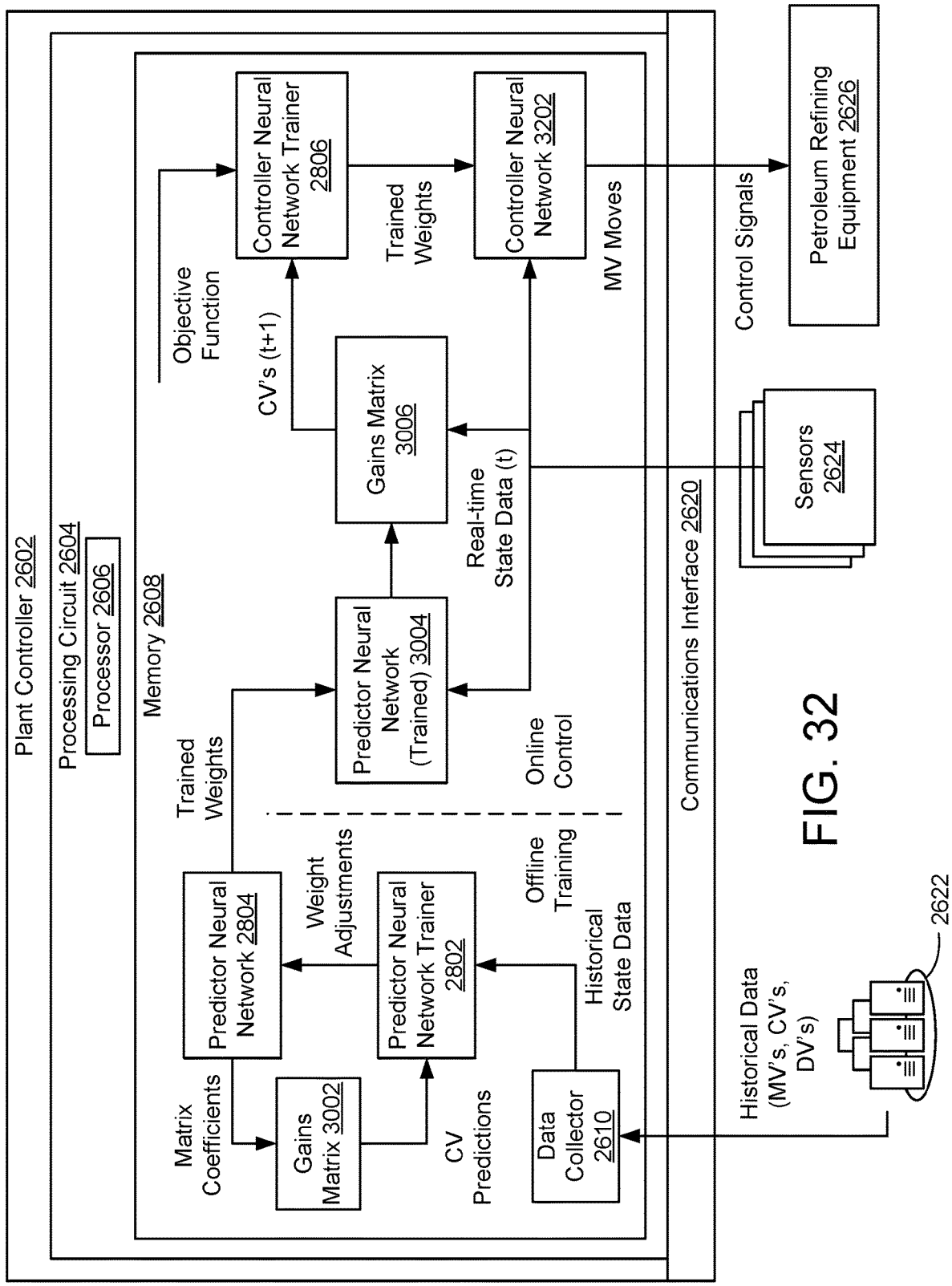
FIG. 32 is a block diagram of a plant controller using a predictor neural network to generate a gains matrix to train a controller neural network to determine MV moves, which can be implemented in the petroleum refinery system of FIG. 1, according to some embodiments.

Offline Trained Predictor Neural Network with Online Controller Neural Network Training Referring now to FIG. 32, a block diagram of another embodiment of plant controller 2602 is shown. In the embodiment shown in FIG. 32, plant controller 2602 may use predictor neural network 2804 to generate gains matrix 3006 as previously described. However, instead of using gains matrix 3006 to perform model predictive control, gains matrix 3006 may be used to train a controller neural network 3202 for use in online control. Any components in FIG. 32 having the same reference numbers as components previously described may operate in the same or similar manner as the embodiment shown in FIG. 26, unless different operation is described below. For example, data collector 2610 is shown providing historical data to predictor neural network trainer 2802, which operates to train predictor neural network 2804 to produce gains matrix 3002. These steps may be performed offline as previously described until predictor neural network 2804 is trained sufficiently for online control. Once sufficiently trained, predictor neural network 2804 may become predictor neural network (trained) 3004 or may provide the trained weights as an input to predictor neural network (trained) 3004.

During online control, predictor neural network (trained) 3004 may be used to generate gains matrix 3006 as a function of real-time state data. As described above, gains matrix 3006 may be configured to predict the values of the CV's at time step t+1 as a function of the MV's and/or real-time state data at time step t. Gains matrix 3006 may be used by controller neural network trainer 2806 to train controller neural network 3202.

Controller neural network trainer 2806 may be configured to train controller neural network 3202 by performing a training process similar to the training process described with reference to FIG. 28. For example, controller neural network trainer 2806 may be configured to adjust the weights of controller neural network 3202 such that the values of the MV's or MV moves output by controller neural network 3202 optimize an objective function.

For example, controller neural network trainer 2806 may be configured to perform an optimization process. In some embodiments, the optimization process includes optimizing an objective function or cost function to determine optimal values of the MV's or optimal MV moves. The objective function used in the embodiment shown in FIG. 30 may be the same as or similar to any of the objective functions described with reference to FIG. 26, FIG. 28, FIG. 30, or elsewhere in the present disclosure. The objective function may consider both an established price of each hydrocarbon product and the flow rate of each hydrocarbon product, as well as the cost of feed and the price of the feed. In some embodiments, the objective function can include any number of weights in the objective function such that the various hydrocarbon products are weighted differently when attempting to maximize the objective function. In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed.

In some embodiments, controller neural network trainer 2806 uses gains matrix 3006 to predict the values of the CV's that will result from a given set of MV's output by controller neural network 3202 and uses the predicted values of the CV's to evaluate the objective function. Controller neural network trainer 2806 may continue adjusting the weights of controller neural network 3202 until the MV's output by controller neural network 3202 result in values of the CV's that optimize the objective function over a given time period. Once trained, controller neural network 3202 can then be used to generate MV moves for time step t+1 as a function of the real-time state data at time step t.

Figure 33:
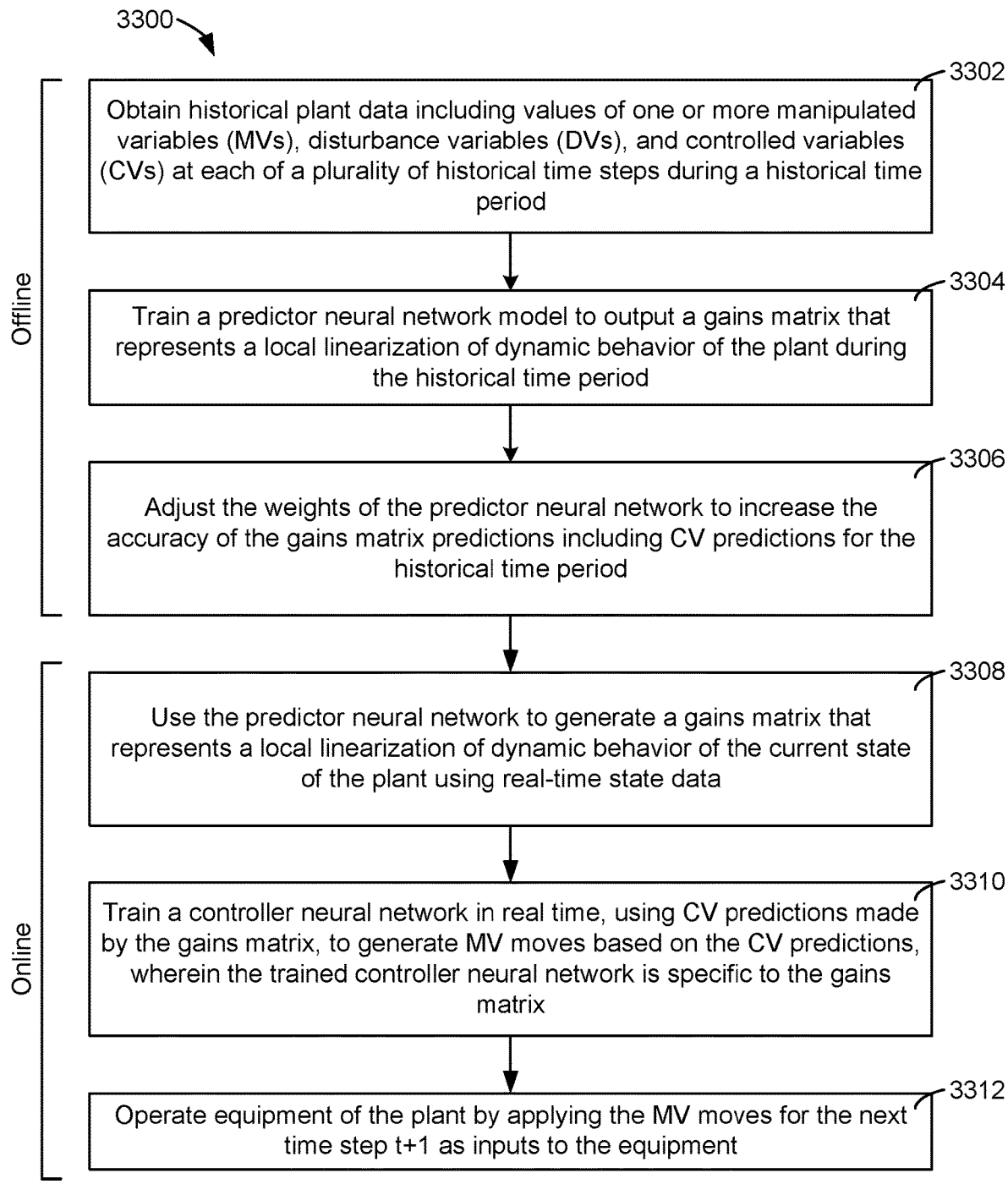
FIG. 33 is a flow diagram of a process for using a predictor neural network to generate a gains matrix to train a controller neural network to determine MV moves, which can be performed by the plant controller of FIG. 32, according to some embodiments.

Referring now to FIG. 33, a flow diagram of a process 3300 for training a controller neural network using a single gains matrix and using the controller neural network to operate equipment is shown, according to some embodiments. Process 3300 may be performed by any of the processing circuitry described herein, such as plant controller 2602. In some embodiments, process 3100 is at least partially performed by plant controller 2602 as described above with reference to FIG. 32.

Process 3300 is shown to include obtaining historical plant data including values of one or more manipulated variables (MV's), disturbance variables (DV's), and controlled variables (CV's) (step 3302). Data collector 2610 may be configured to receive the historical plant data from database 2622. In some embodiments, the data includes MV's, DV's, and/or CV's for one or more historical time periods (e.g., historical states) of the plant (e.g., operation of system 100).

In some embodiments, the MV's may include temperature severity of one or more components of system 100. Temperature severity can include the temperature inside any component of system 100, the temperature of the feed entering any component of system 100, the temperature of the feed during the chemical reaction, the temperature of the feed after pre-heating, the temperature of the feed prior to pre-heating, or a combination thereof. In some embodiments, the MV's may include a feed rate of oil into coke drums 116-118. In some embodiments, the CV acting as the most valuable volume gain of one or more hydrocarbon products produced by system 100 could include individual volume values for each of the outputs of system 100 and individual prices for each of the outputs of system 100 which could be used to calculate the most valuable volume gain of one or more hydrocarbon products.

Process 3300 is shown to include training a predictor neural network model to output a gains matrix that represents a local linearization of dynamic behavior of the plant during the historical time period (step 3304) and adjusting the weights of the predictor neural network to increase the accuracy of the gains matrix predictions including CV predictions for the historical time period (step 3306). Predictor neural network trainer 2802 may be configured to adjust the weights of predictor neural network 2804 to ensure the gains matrix 3002 generated by predictor neural network 2804 accurately predicts values of the CV's in the historical data set.

Process 3300 is shown to include using the predictor neural network to generate a gains matrix that represents a local linearization of dynamic behavior of the current state of the plant using real-time state data (step 3308). Once predictor neural network (trained) 3004 is trained, predictor neural network (trained) 3004 can receive real-time state data (e.g., data relating to the operation of the plant) via sensors 2624 and generate a gains matrix 3006 based on that data. The linearized representation of the current state can be used to predict future CV's (e.g., CV's for t+1, etc.), which can be provided to optimizer 2618.

Process 3300 is shown to include training a controller neural network in real-time, using CV predictions made by the gains matrix, to generate MV moves based on the CV predictions, wherein the trained controller neural network is specific to the gains matrix (step 3310). For example, step 3310 may include adjusting the weights of controller neural network 3202 such that the values of the MV's or MV moves output by controller neural network 3202 optimize an objective function. In some embodiments, controller neural network trainer 2806 uses gains matrix 3006 to predict the values of the CV's that will result from a given set of MV's output by controller neural network 3202 and uses the predicted values of the CV's to evaluate the objective function. Controller neural network trainer 2806 may continue adjusting the weights of controller neural 3202 until the MV's output by controller neural network 3202 result in values of the CV's that optimize the objective function over a given time period. Once trained, controller neural network 3202 can then be used to generate MV moves for time step t+1 as a function of the real-time state date at time step t.

Process 3300 is shown to include operating equipment of the plant by applying the MV moves for the next time step t+1 as inputs to the equipment (step 3312). Step 3312 may include using the values of the MV's at time step t+1 as inputs to the equipment or using the values of the MV's at time step t+1 to generate control signals for the equipment.

Offline Controller Neural Network Training Based on Multiple Gains Matrices

Figure 34:
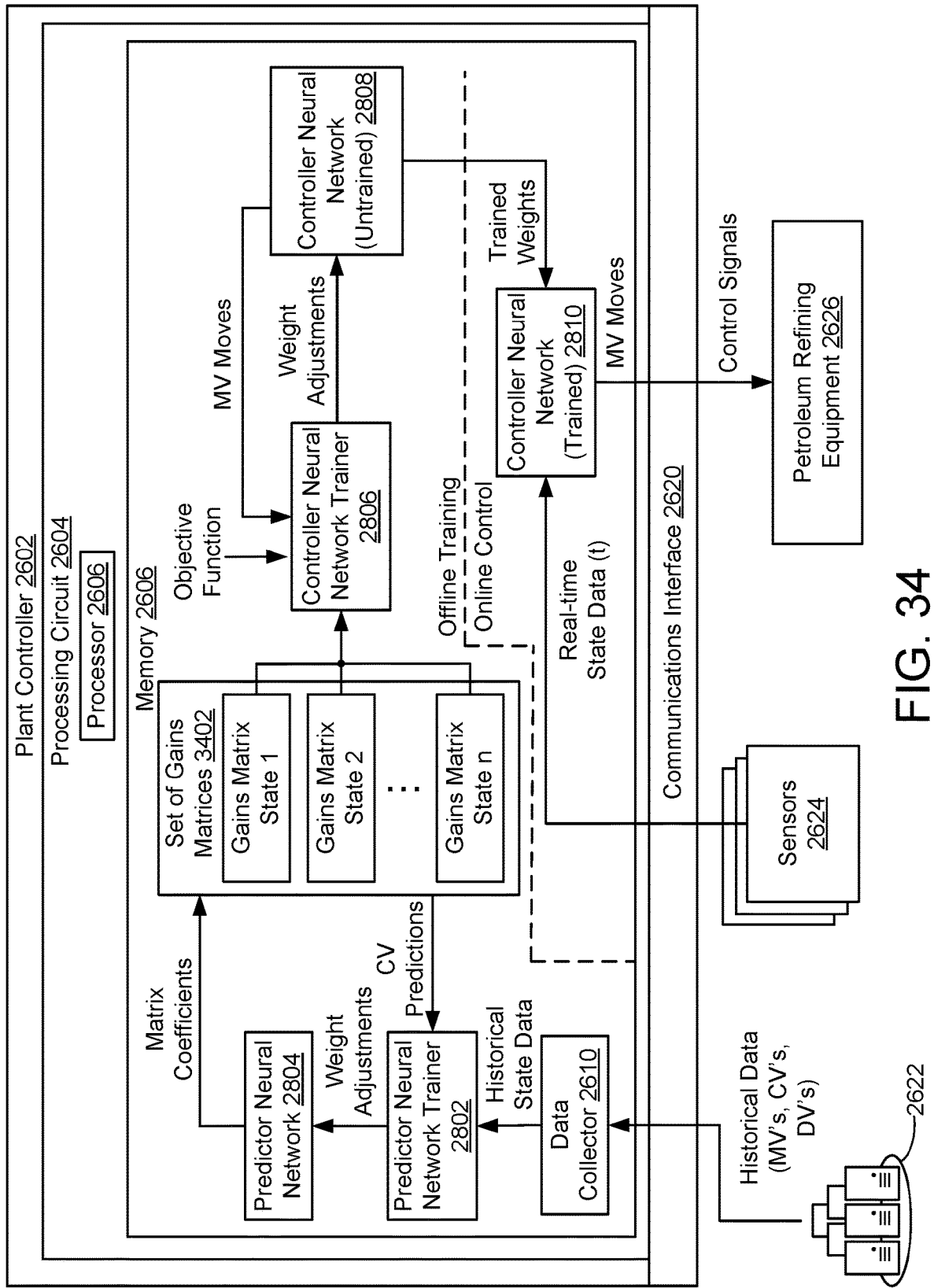
FIG. 34 is a block diagram of a plant controller using multiple gains matrices to train a controller neural network to determine MV moves, which can be implemented in the petroleum refinery system of FIG. 1, according to some embodiments.

Referring now to FIG. 34, a block diagram of a process for performing online control based on multiple gain matrices is shown, according to some embodiments. Memory 2608 is shown to include data collector 2610, predictor neural network trainer 2802, predictor neural network 2804, set of gains matrices 3402, controller neural network trainer 2806, controller neural network (untrained) 2808, controller neural network (trained) 2810. Any components in FIG. 34 having the same reference numbers as components previously described may operate in the same or similar manner as the embodiment shown in FIG. 26, unless different operation is described below.

The embodiment illustrated in FIG. 34 may be similar to the embodiment illustrated in FIG. 32, with the exception that controller neural network 2808, 2810 is trained using multiple different gains matrices instead of a single gains matrix. The steps performed by predictor neural network trainer 2802 to train predictor neural network 2804 may be the same as previously described. Once trained, predictor neural network 2804 can be used to generate a set of gains matrices 3402. Each of the gains matrices 3402 may represent a different linearization of dynamic behavior of the plant (e.g., localized to a particular episode of the historical data) and may be generated using the same or similar process used to generate gains matrix 3006 as previously described. The steps performed to generate the gains matrices 3402 can be repeated multiple times for different sets of historical data to generate a gains matrix for each set of the historical data (e.g., for multiple different episodes of the historical data).

Controller neural network trainer 2806 can then use the set of gains matrices 3402 to train controller neural network (untrained) 2808. The steps performed to train controller neural network (untrained) 2808 may be similar to the embodiment described with reference to FIG. 32. However, instead of using a single gains matrix to predict the values of the CV's or CV moves that will result from each set of MV's or MV moves generated by controller neural network (untrained 2808). Each set of MV's or MV moves generated by controller neural network (untrained) 2808 may be associated with a particular episode of the training data, specifically the episode of training data used by controller neural network (untrained) 2808 to generate that set of MV's or MV moves. The gains matrix generated for that same episode may then be used to predict the values of the CV's or CV moves that will result from the MV's or MV moves associated with that same episode. The entire set of predicted values of the CV's or CV moves (i.e., across all of the episodes) may then be used to evaluate the objective function to determine how well the various sets of MV's or MV moves optimize the objective function across all of the episodes.

In some embodiments, controller neural network trainer 2806 receives an objective function to determine optimal values of the MV's or optimal MV moves. The objective function used in the embodiment shown in FIG. 32 may be the same as or similar to any of the objective functions described with reference to FIG. 26, FIG. 28, FIG. 30, FIG. 32, or elsewhere in the present disclosure. In some embodiments, the objective function may consider both an established price of each hydrocarbon product and the flow rate of each hydrocarbon product, as well as the cost of feed and the price of the feed. In some embodiments, the objective function can include any number of weights in the objective function such that the various hydrocarbon products are weighted differently when attempting to maximize the objective function. In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed.

Advantageously, using all of the gains matrices 3402 to train controller neural network 2808, 2810 may result in a controller neural network 2808, 2810 that is not specific to a single gains matrix or linear behavior of the plant, but rather can generate appropriate values of the MV's for any real-time state data or any linear behavior of the plant. In other words, controller neural network 2808, 2810 can be trained to output values of the MV's or MV moves for any value of the real-time state data corresponding to any of the divergent linear behaviors of the plant, not only values of the real-time state data that correspond to the same linear behavior of the plant as the episode of historical data used to generate a particular gains matrix. Accordingly, this allows a single controller neural network (untrained) 2808 to be trained offline and then used as controller neural network (trained) 2810 during online control rather than needing to generate a different instance of controller neural network (trained) 2810 for each gains matrix and/or each episode of the historical data. In some embodiments, controller neural network (trained) 2810 can receive one or more real time gains matrices generated by predictor neural network 2804 based on the real time state data. The real-time gains matrix may inform controller neural network (trained) 2810 of the current (e.g., real-time, etc.) linearized dynamics. Under this scheme, the real-time gains matrix may also be and input to controller neural network (untrained) 2808 during training.

Figure 35:
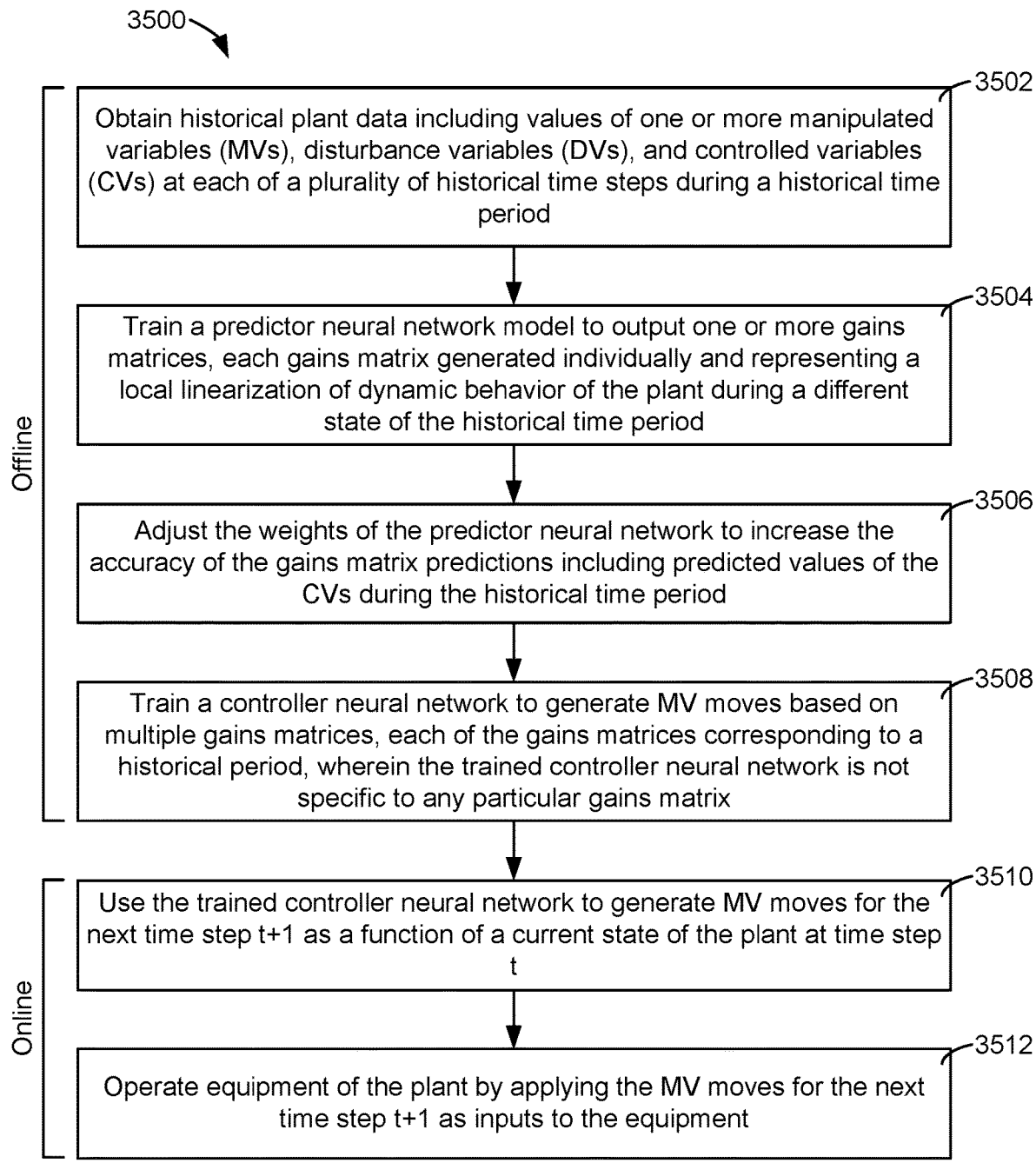
FIG. 35 is a flow diagram of a process for using multiple gains matrices to train a controller neural network to determine MV moves, which can be performed by the plant controller of FIG. 34, according to some embodiments.

Referring now to FIG. 35, a flow diagram of a process 3500 for performing online control based on multiple gain matrices is shown, according to some embodiments. Process 3500 may be performed by any of the processing circuitry described herein, such as plant controller 2602. In some embodiments, process 3100 is at least partially performed by plant controller 2602 as described above with reference to FIG. 34.

Process 3500 is shown to include obtaining historical plant data including values of one or more manipulated variables (MV's), disturbance variables (DV's), and controlled variables (CV's) (step 3502). Data collector 2610 may be configured to receive the historical plant data from database 2622. In some embodiments, the data includes MV's, DV's, and/or CV's for one or more historical time periods (e.g., historical states) of the plant (e.g., operation of system 100). Data collector 2610 may be configured to receive the historical plant data from database 2622.

Process 3500 is shown to include training a predictor neural network model to output one or more gains matrices, each gains matrix generated individually and representing a local linearization of dynamic behavior of the plant during a different state or episode of the historical time period (step 3504). Process 3500 may include adjusting the weights of the predictor neural network to increase the accuracy of the gains matrix predictions including predicted values of the CVs during the historical time period (step 3506). In some embodiments, predictor neural network 2804 is configured to generate a gains matrix for one or more sets of historical data. For example, each set of historical data may correspond to a particular episode of the historical data during within which the dynamic behavior of the plant is substantially linear. Each set of historical data may be used to generate a gains matrix that represents the localized linear behavior of the plant during the corresponding time period or episode. The set of gains matrices (e.g., set of gains matrices 3402) may represent a variety of different linear behaviors of the plant, giving the controller neural network (untrained) 2808 more training data from a more diverse range of plant behaviors.

Process 3500 is shown to include training a controller neural network to generate MV moves based on multiple gains matrices, each of the gains matrices corresponding to a historical period, wherein the trained controller neural network is not specific to any particular gains matrix (step 3508). In some embodiments, the controller neural network (trained) 2810 is trained using some or all of the gains matrices in the set of gains matrices 3402. This may allow controller neural network (trained) 2810 to learn multiple types of dynamic behavior that the plant experiences. In other words, controller neural network (trained) 2810 is trained using a diverse set of gains matrices, resulting in a controller neural network (trained) 2810 that can be used for any state of the plant rather than only states that fall within a particular type of linear behavior.

Process 3500 is shown to include using the trained controller neural network to generate MV moves for the next time step t+1 as a function of a current state of the plant at time step t (step 3510). In some embodiments, controller neural network (trained) 2810 can input the real-time state data in the model generated by the neural network of controller neural network (untrained) 2808 to determine the MV adjustments required to reach one or more predicted CV values.

Process 3500 is shown to include operate equipment of the plant by applying the MV moves for the next time step t+1 as inputs to the equipment (step 3512). In some embodiments, petroleum refining equipment 2626 can include a mechanism (e.g., an actuator/valve assembly, a pump device, etc.) that, when the control signals are received, adjust the flow of catalyst into any of the devices or reactors of system 100, thus adjusting the reactor severity in system 100 (e.g., when reactor severity is an MV, etc.). In some embodiments, one or more reactor severity control mechanisms (e.g., modules, components, etc.) are located proximate to one or more components of system 100 or upstream/downstream of one or more components of system 100 to adjust the reactor severity within such components. For example, one reactor severity control mechanism that can adjust the reactor severity within atmospheric distillation unit 110, vacuum distillation unit 112, fractionator 114, etc. at least in part can be a valving system that adjusts the flow of catalyst into one or more of these components. In some embodiments, another reactor severity control mechanism can include a valving system controlling the amount of feed entering such components. In some embodiments, another reactor severity control mechanism is a heat source such as furnace 124 that pre-heats the incoming feed. The reactor severity control mechanisms may be part of petroleum refining equipment 2626 described below, and may be configured to receive control signals from plant controller 2602 to adjust one or more MV's of the plant.

In other embodiments, the control signals may be sent to furnace 124 to preheat the residual oil upstream of coke drums 116-118. In some embodiments, the reactor severity is the MV adjusted to reach the predicted CV, and the reactor severity is based at least in part on the incoming feed. In other embodiments, the control signals can be sent to any number of equipment configured to affect the reactor severity, such as the mechanisms described in the example above, a control system for mixing parts of the catalyst (e.g., to affect the quality of the catalyst, thereby affecting the reactor severity, etc.), or a combination thereof.

Predictor Neural Network Training

Figure 36:
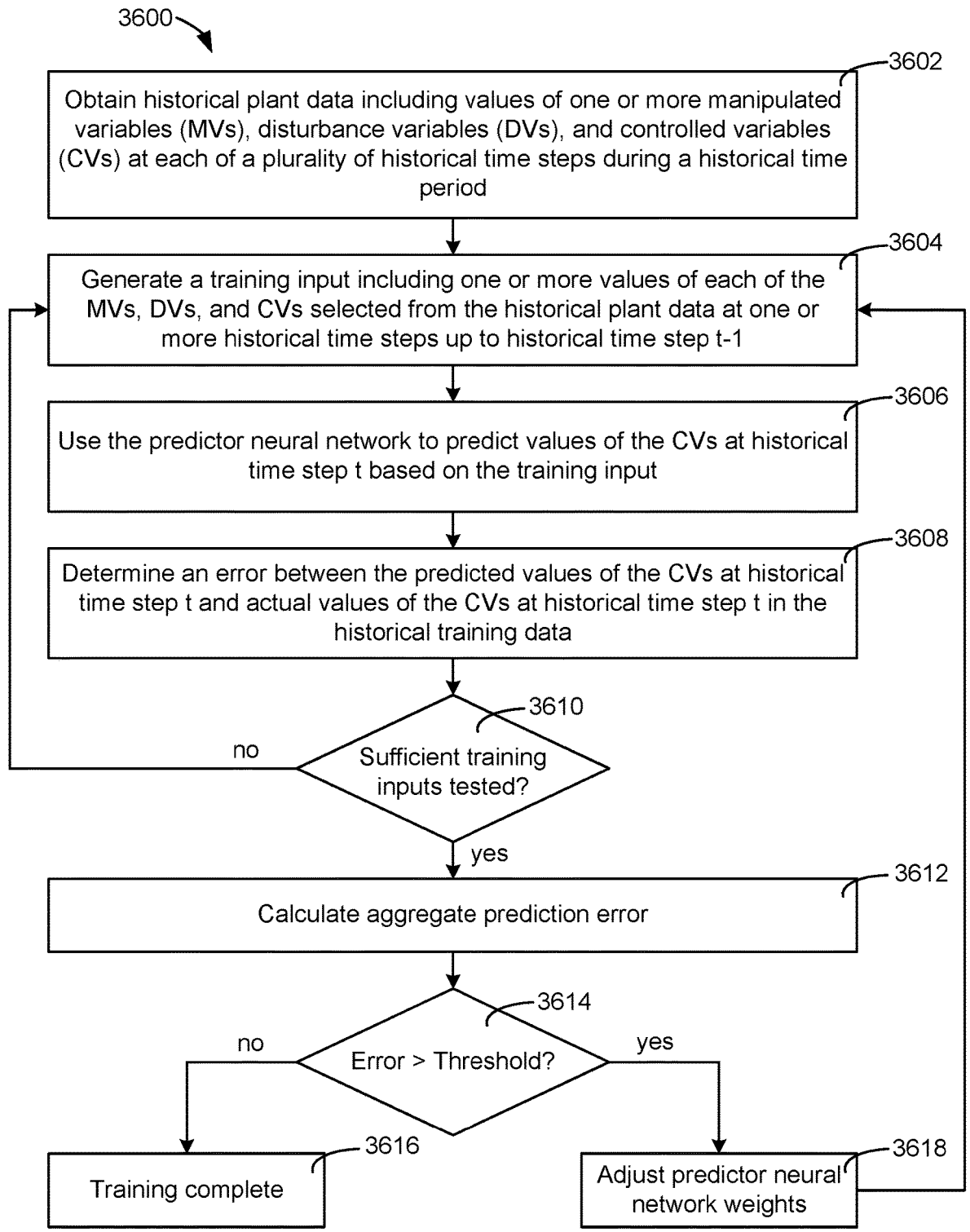
FIG. 36 is a flow diagram of a process for training a predictor neural network, which can be performed by the controllers of FIGS. 28-35, according to some embodiments.

Referring now to FIG. 36, a process 3600 for training a predictor neural network is shown, according to some embodiments. In some embodiments, process 3600 can be performed in place of or in addition to the processes described above to train the various predictor neural networks in FIGS. 28-35. Process 3600 may be performed by plant controller 2602, or any of the other processing circuitry disclosed herein. Process 3600 is shown to include obtaining historical plant data including values of one or more manipulated variables (MV's), disturbance variables (DV's), and controlled variables (CV's) at each of a plurality of historical time steps during a historical time period (step 3602).

Process 3600 is shown to include generating a training input including one or more values of each of the MV's, DV's, and CV's selected from the historical plant data at one or more historical time steps up to historical time step t−1 (step 3604). The training input may include a vector of values for each of the MV's, DV's, and CV's (i.e., a time series of each variable including one or more time series values up to time step t−1), which could be provided in the form of a matrix or otherwise.

For example, the weights of predictor neural network 2804 and/or bias vectors of predictor neural network 2804 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 2804 is applied to the input vector x and the resultant output vector y is compared to the desired output values vector y'. Based on a difference between the output vector y and the desired output values vector y', the weights of predictor neural network 2804 are adjusted in a direction which reduces the difference. The magnitude of the difference is calculated using any suitable difference measure (e.g., absolute value, sum of squares, etc.). The forming of the vectors, applying predictor neural network 2804, and adjusting the weights is repeated for many time points, such that predictor neural network 2804 reliably models the operation of the system.

Process 3600 is shown to include using the predictor neural network to predict values of the CV's at historical time step t based on the training input (step 3606). In some embodiments, the predictor neural network is substantially similar or identical to predictor neural network 2804. Predictor neural network 2804 may generate a linear predictor which can include the predicted CV's of the current time step. In some embodiments, offline neural network can analyze the CV's, MV's, and DV's all for a current time step and predict the CV's for a future time step.

Process 3600 is shown to include determining an error between the predicted values of the CV's at historical time step t and actual values of the CV's at historical time step t in the historical training data (step 3608). This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 2804 may require a certain subset of CV predictions to be "accurate" prior to determining that the training of predictor neural network 2804 is complete. Other methods for determining the error may be considered, such as determining if the answer is within a predetermined range of values or allowing supervised learning from a technician/engineer.

Process 3600 is further shown to include determining if a sufficient number of training inputs have been tested (step 3610) In some embodiments, predictor neural network 2804 is instructed to process a certain number of states, generate a certain number of accurate predictions, or a combination thereof. If this threshold has not been met, process 3600 repeats steps 3604-3608 until efficient training inputs have been tested. Once this threshold is met, process 3600 proceeds to step 3612 discussed below.

In the above example, determining the error may be performed in a manner similar to the training of predictor neural network 2804, but instead of adjusting the weights of predictor neural network 2804 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, the predictor is considered ready for operation. Otherwise, one or more parameters of the neural network may be adjusted, such as the number of layers, the specific controlled, manipulated and/or disturbance variables used, the size of the intermediary vectors h1, h2, h3, . . . hn and/or the duration T of the time period used to form the input vector x. The training of predictor neural network 2804 may then be repeated. In some embodiments predictor neural network 2804 processes to values up to time t in order to estimate values of the CV's at time t+1. In other embodiments, predictor neural network 2804 is applied to a vector including values of MV's at time t+1 in predicting the CV's at time t+1, so as to take into account the most recent values of the MV's.

Instead of the training based on each time point on its own, in some embodiments, the training of predictor neural network 2804 is performed on sequences of time points together. For each sequence of time points, t1, t2, . . . tn, the forming of the vectors and applying of predictor neural network 2804 in order to receive the values of the controlled variables, are performed for the first time point of the sequence t1. Then, instead of immediately adjusting the weights of predictor neural network 2804 according to a comparison to a desired output values vector y', an input vector for the second time point t2 is created using the outputs of the predictor instead of the stored values from database 2622, for the values of the controlled variables at time t1. This process is repeated until predicted values are calculated for time tn. Then, the predicted values for times t1, t2, tn are compared to the stored values using a given metric and the neural network is adjusted accordingly.

In some embodiments, rather than predicting explicit values of CV's, predictor neural network 2804 is trained, using any suitable method known in the art, to produce a distribution over different possibilities. For example, predictor neural network 2804 may output at time point t the mean and covariance of a Gaussian distribution which reflects estimated posterior probabilities of controlled variable values in time point t+1. This allows modelling uncertainty in the behavior of the plant, to optionally be taken into account by plant controller 2602.

Process 3600 is shown to include calculating aggregate prediction error (step 3612) and comparing it to a threshold (step 3614). In some embodiments, the aggregate prediction error is an error determination that takes into account several predictions made by predictor neural network 2804. The aggregate prediction error could be an average of the errors resulting from each training input, an aggregate error, or any other metric. In some embodiments, the aggregate prediction error weights certain CV predictions over others based on user instruction. For example, it may be more important to accurately predict the most valuable volume gain of one or more hydrocarbon products (a CV in one embodiment) than the flow rate to reactor 208 (another CV in the embodiment) during training of predictor neural network 2804.

Other methods for comparing the aggregate prediction error to a threshold may be considered, such as determining if the error is within a predetermined range of value, determining if the error is off by a predetermined percentage or allowing supervised learning from a technician/engineer to make the decision. If the aggregate prediction error is outside of the acceptable threshold, the weights of predictor neural network 2804 are adjusted (3618) and steps 3604-3614 are repeated. If the aggregate prediction error is within the acceptable threshold, the training of predictor neural network 2804 is completed (3616).

Controller Neural Network Training

Figure 37:
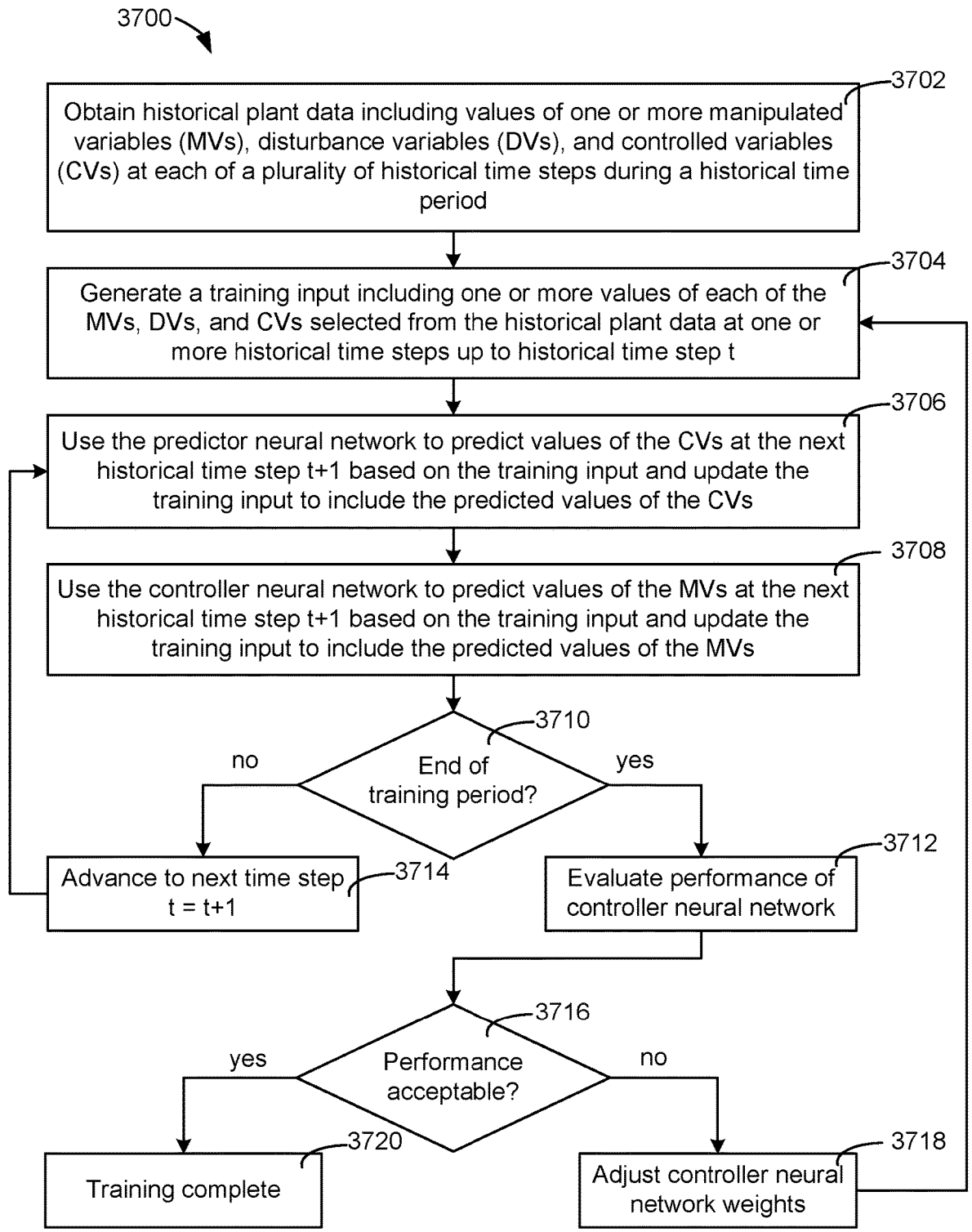
FIG. 37 is a flow diagram of a process for training a controller neural network, which can be performed by the controllers of FIGS. 28-35, according to some embodiments.

Referring now to FIG. 37, a process 3700 for training a controller neural network to generate MV's for given CV's is shown, according to some embodiments. In some embodiments, process 3600 can be performed in place of or in addition to the processes described above to train the various predictor neural networks in FIGS. 28-35. Process 3700 may be performed by plant controller 2602, or any of the other processing circuitry disclosed herein. Process 3700 is shown to include obtaining historical plant data including values of one or more manipulated variables (MV's), disturbance variables (DV's), and controlled variables (CV's) at each of a plurality of historical time steps during a historical time period (step 3702).

Process 3700 is shown to include generating a training input including one or more values of each of the MV's, DV's, and CV's selected from the historical plant data at one or more historical time steps up to historical time step t (step 3704). In some embodiments, the training input may be similar to the historical states that can be used to train predictor neural network 2804. The training input may also include target values for the CV's (i.e., setpoints or setpoint ranges).

Process 3700 is shown to include using the predictor neural network to predict values of the CV's at the next historical time step t+1 based on the training input and update the training input to include the predicted values of the CV's (step 3706). Predictor neural network 2804 may predict the CV's for the next historical time step t+1 based on the training input, and include the predicted CV's for the future time step in the training input, which can subsequently be provided to controller neural network 3202.

Process 3700 is shown to include using the controller neural network to generate values of the MV's at the next historical time step t+1 based on the training input and update the training input to include the predicted values of the MV's (step 3708). Once controller neural network 3202 receives the training input, controller neural network 3202 can make MV predictions based on the predicted CV prediction made by predictor neural network 2804. These predicted MV's (and any other relevant data (e.g., TVs)) can be added to the training input, such that all of the predictions for time step t+1 are included within the training input.

Process 3700 is shown to include determining if the training period has ended (step 3710). The training period may be based on a certain amount of predictions being made, a certain number of historical data sets/states/episodes being analyzed, data for a certain number of future time steps being predicted, or any combination thereof. If training has not been completed, process 3700 advances to the next time step t+1 (step 3714) and steps 3706-3708 are repeated until training is complete.

Once training has been completed, the performance of controller neural network 3202 is evaluated (step 3712) to determine whether the performance of controller neural network 3202 is acceptable (step 3716). In some embodiments, this step includes comparing the predicted CV's to the target values of the CV's for the corresponding time steps to calculate an average or aggregate error, or putting the predicted values of the CV's into an objective function and calculating the value of the objective function. In some embodiments, the evaluation also considers values of the MV's and/or includes penalties for the MV's deviating from predetermined ranges. If the performance of controller neural network 3202 is evaluated and considered not acceptable, process 3700 repeats steps 3704-3712 until the performance is acceptable. When the performance of controller neural network 3202 is considered acceptable, the training is complete (step 3720).

Optimization Control System with Neural Network Predictor

Figure 38:
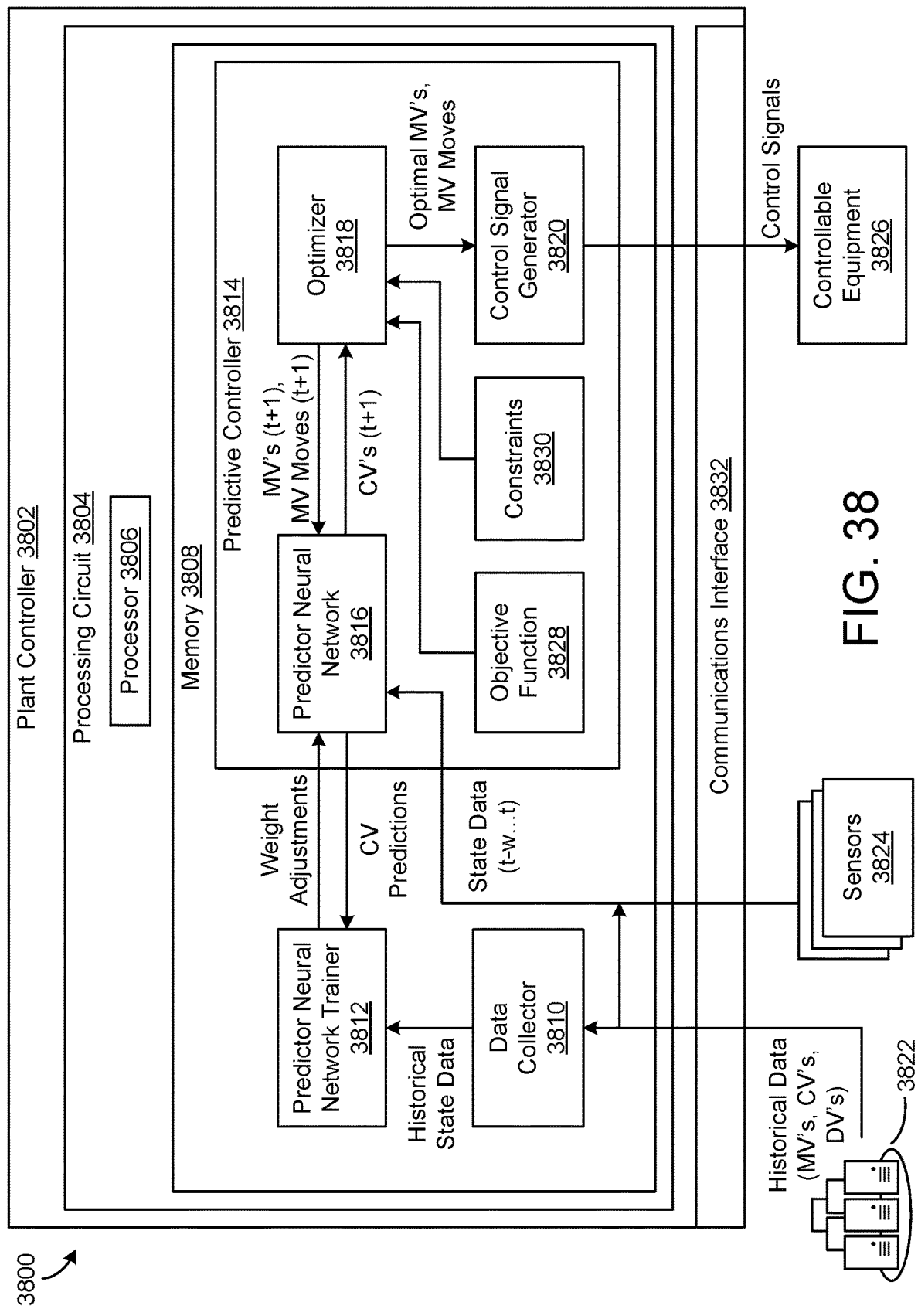
FIG. 38 is a block diagram of an optimization control system with a neural network predictor, according to some embodiments.

Referring now to FIG. 38, a block diagram of an optimization control system 3800 is shown, according to an exemplary embodiment. Control system 3800 is shown to include a plant controller 3802, a database 3822, sensors 3824, and controllable equipment 3826. Control system 3800 can be used to monitor and/or control any type of controllable equipment 3826 including, but not limited to, the equipment of system 100 (e.g., atmospheric distillation unit 110, vacuum distillation unit 112, fractionator 114, pump 122, furnace 124, valve 120, coke drums 116-118, etc.), the equipment of system 200 (e.g., drum feeder 236, etc.), petroleum refining equipment 2626, and/or any other type of controllable equipment 3826 in any type of controllable system or process, whether related to petroleum refining or otherwise. Control system 3800 can be used in combination with any of the systems or equipment described in Ser. No. 17/831,227 filed Jun. 2, 2022, U.S. patent application Ser. No. 17/384,660 filed Jul. 23, 2021, U.S. patent application Ser. No. 17/308,474 filed May 5, 2021, U.S. patent application Ser. No. 16/950,643 filed Nov. 17, 4020, U.S. patent application Ser. No. 16/888,128 filed May 29, 4020, and/or U.S. patent application Ser. No. 15/883,114 filed Jan. 30, 4018, each of which is incorporated by reference herein in its entirety. It is contemplated that control system 3800 can be used in a wide variety of settings and is not limited to the particular examples of controllable systems described herein. The specific types of equipment that can be included in controllable equipment 3826 may depend on the particular implementation of control system 3800.

Database 3822 may be the same as or similar to database 2622 as previously described. For example, database 3822 may be configured to store historical values of manipulated variables (MV's), controlled variables (CV's), disturbance variables (DV's), or any other type of variable or parameter that can be monitored and/or controlled in control system 3800. The specific MV's, CV's, and DV's stored in database 3822 may depend on the type of system or process monitored and controlled by control system 3800 and may vary across different implementations of control system 3800. In some embodiments, the variables or parameters stored in database 3822 include one or more variables measured by sensors 3824 (e.g., temperatures, pressures, flow rates, etc.), values of control signals generated by plant controller 3802 (e.g., equipment setpoints, MV moves, etc.), values of performance variables received as feedback from sensors 3824 or controllable equipment 3826, calculated variables, and/or any other type of MV, CV, or DV that can be monitored, controlled, or otherwise used to carry out the functions of control system 3800. The historical values of the MV's, CV's, and DV's can be stored in database 3822 in tabular format, time series format, in the form of data objects having one or more attributes, or any other data storage format. In some embodiments, each of the historical data stored in database 3822 may include a value attribute and a timestamp. The value attribute may indicate the value of the corresponding MV, CV, or DV, whereas the timestamp may indicate the particular time at which that value occurred. Plant controller 3802 can use the values and timestamps of the historical data to organize the historical data into episodes as previously described.

Sensors 3824 may include any type of measurement device capable of monitoring and reporting real-time values of MV's, CV's, DV's, or any other variable in control system 3800. Sensors 3824 may provide plant controller 3802 with state data, which may be the same as or similar to the real-time state data previously described with reference to FIGS. 26-37. For example, sensors 3824 may include temperature sensors, flow rate sensors, pressure sensors, lighting sensors, or any other type of sensor configured to monitor a variable state or condition of the plant, of external factors (e.g., weather data, external price data, one or more DV's, etc.), or any other states or conditions that can be used in control system 3800. In various embodiments, sensors 3824 may be standalone devices or embedded into other devices such as controllable equipment 3826. In some embodiments, sensors 3824 are configured to report calculated values and/or values of internal parameters or states of controllable equipment 3826 (e.g., values of state variables stored in memory of controllable equipment 3826). Accordingly, the real-time state data reported by sensors 3824 may include any type of measured value, calculated value, or other type of value that represents the current state of control system 3800.

Plant controller 3802 is shown to include communications interface 3832 and a processing circuit 3804. Communications interface 3832 can be or include wired or wireless communications interfaces (e.g., jacks, antennas, transmitters, receivers, transceivers, wire terminals, etc.) for conducting data communications. In various embodiments, communications via communications interface 3832 can be direct (e.g., local wired or wireless communications) or via a communications network (e.g., a WAN, the Internet, a cellular network, etc.). For example, communications interface 3832 can include an Ethernet card and port for sending and receiving data via an Ethernet-based communications link or network. In another example, communications interface 3832 can include a Wi-Fi transceiver for communicating via a wireless communications network. In another example, communications interface 3832 can include cellular or mobile phone communications transceivers. Communications interface 3832 can be communicably connected to processing circuit 3804 such that processing circuit 3804 and the various components thereof can send and receive data via communications interface 3832.

Processing circuit 3804 is shown to include a processor 3806 and memory 3808. Processor 3806 can be implemented as a general purpose processor, an application specific integrated circuit (ASIC), one or more field programmable gate arrays (FPGAs), a group of processing components, or other suitable electronic processing components. Memory 3808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 3808 can be or include volatile memory or non-volatile memory. Memory 3808 can include database components, object code components, script components, or any other type of information structure for supporting the various activities and information structures described in the present disclosure. Memory 3808 may be communicably connected to processor 3806 via processing circuit 3804 and may include computer code for executing (e.g., by processing circuit 3804 and/or processor 3806) one or more processes described herein.

Memory 3808 is shown to include several components (e.g., software components, database components, executable code, data/information structures, etc.) that provide plant controller 3802 with the information, data, functionality, or other inputs/resources to execute the various control processes described herein. These components are shown to include a data collector 3810, a predictor neural network trainer 3812, and a predictive controller 3814. Data collector 3810 may be the same as or similar to data collector 2610, as described with reference to FIGS. 26-37. For example, data collector 3810 may be configured to collect or receive one or more data sets for controlling some or all components of control system 3800. Data collector 3810 is shown receiving historical data including MV's, CV's, and DV's. MV's may be variables that can be adjusted to keep the CV's at their intended set points or otherwise affect the values of the CV's (e.g., drive the CV's toward values that optimize an objective function). MV's may include control signals that are provided as inputs to controllable equipment 3826, setpoints that are provided as inputs to controllers, or other variables that can be directly manipulated (e.g., adjusted, set, modulated, etc.) by plant controller 3802. The specific types of MV's may depend on the implementation of control system 3800 (e.g., the specific type of system or process controlled by control system 3800).

CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), or any other values that characterize the performance or state of a controllable system or process. Some CV's may be quantities that are not capable of being directly manipulated by plant controller 3802 (e.g., highest value volume gain, etc.), but rather can be affected by manipulating corresponding MV's that affect the CV's (e.g., increasing reactor severity, increasing oil feed rate, etc.). Examples of CV's in the context of system 100 include coke production rates, organic sulfur and/or nitrogen concentrations in the reactor effluent (e.g., feed being processed, etc.), naphtha product distillation boiling points, naphtha product sulfur concentration, naphtha product flash point, diesel product cloud point, diesel product distillation boiling points, diesel product flash point, diesel product sulfur concentration, UCO distillation boiling points, product stream flows, conversion ratios, conversion levels, hydraulic constraints, any product stream or intermediate flow, or any combination thereof. CV's may include the volumes, flow rates, mass, or other variables that quantify the amount of the various output oil products produced by system 100. However, it should be understood that the specific types of CV's are dependent upon the specific type of system or process. Like the MV's, the specific types of CV's may depend on the implementation of control system 3800 (e.g., the specific type of system or process controlled by control system 3800).

DV's may represent disturbances or other factors that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance. Any of the variables described as MV's may be DV's in some embodiments in which the system cannot control those variables. Similarly, any of the variables described as DV's may be MV's in some embodiments in which the system can control those variables. Examples of DV's in the context of system 100 can include feed rate, feed composition, hydrogen flow rate, reactor pressure, catalyst age, separation and/or fractionation section temperatures and pressures, reactor temperature differentials, intermediate flow rates, upstream unit process operating conditions, or any combination thereof. However, it should be understood that the specific types of DV's are dependent upon the specific type of system or process. Like the MV's and the CV's, the specific types of DV's may depend on the implementation of control system 3800 (e.g., the specific type of system or process controlled by control system 3800).

Data collector 3810 may be configured to separate the collected data into one or more episodes (e.g., based on the timestamps of the historical data). In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a timestamp indicating a time at which the sample was collected and a value that defines a corresponding "state" of the system at the time the sample was collected. In some embodiments, the samples of historical data are separated into "episodes" which include the historical data for a window of time. These episodes may be predetermined prior to being received at plant controller 3802 (e.g., the start times, end times, and/or duration of each episode may be predefined) or can be automatically determined within plant controller 3802 based on attributes of the historical data and/or an operating condition of system 3800 at a time when the historical data were collected. In some embodiments, the historical data are separated into episodes as part of the neural network training process performed by predictor neural network trainer 3812, described in greater detail below.

In some embodiments, the episodes generated by data collector 3810 encompass a period of time large enough to include multiple samples of the historical data (e.g., multiple time steps, etc.), but small enough such that the behavior of the plant (i.e., the controlled system or process) is substantially linear within a given episode. In other words, each episode may include a portion of the historical data that, when viewed in isolation, indicates substantially linear system behavior within the episode. In other embodiments, the episodes generated by data collector 3810 may encompass a period of time long enough to capture non-linear behavior of the plant. In some embodiments, the historical data include not only multiple samples of the variables that affect the performance of controllable equipment 3826 (e.g., DV's, MV's, etc.), but also multiple samples of the variables that are affected by operating controllable equipment 3826 (e.g., CV's).

Predictor neural network trainer 3812 may be the same as or similar to predictor neural network trainer 2802, as described with reference to FIGS. 28-37. For example, predictor neural network trainer 3812 may be configured to receive the historical data from data collector 3810 and train predictor neural network 3816 by adjusting the weights of predictor neural network 3816. Predictor neural network trainer 3812 may also be configured to receive the CV predictions of predictor neural network 3816 to facilitate training and determine how the weights need to be adjusted. For example, predictor neural network trainer 3812 may adjust or tune the weights of predictor neural network 3816 such that the CV predictions generated by predictor neural network 3816 comply or align with the values of the CV's in the historical data. An example of a process which can be performed by predictor neural network trainer 3812 to train predictor neural network 3816 is described in greater detail with reference to FIG. 36.

Figure 41:
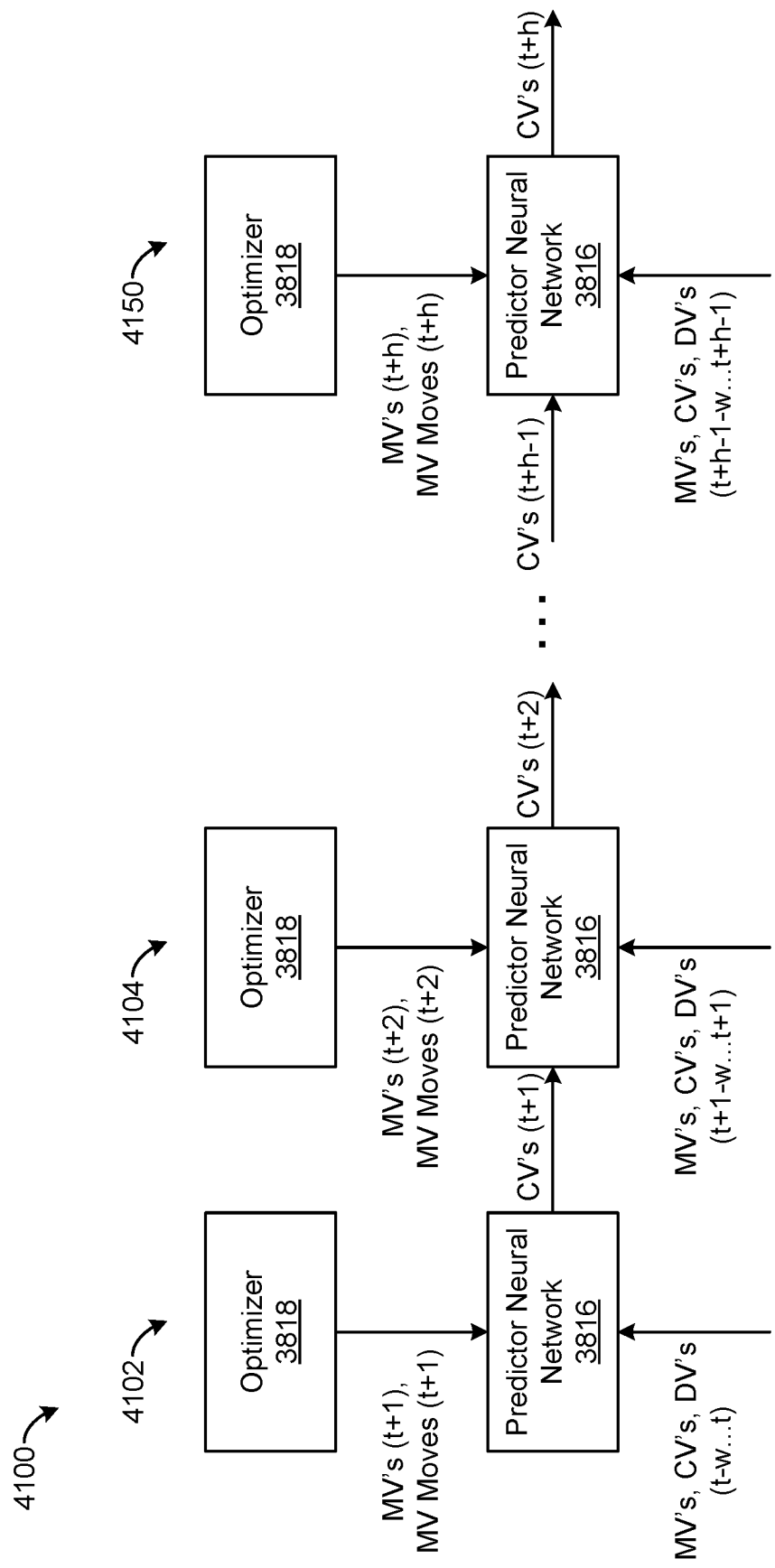
FIG. 41 is a block diagram illustrating a process for using a predictor neural network to predict values of controlled variables as a function of a given set of manipulated variables and a history of state data of the plant, according to some embodiments.

Predictor neural network 3816 may be the same as or similar to predictor neural network 2804 as described with reference to FIGS. 28-37. For example, predictor neural network 3816 can be any type of neural network model configured to predict a set of CV's for a given time step based on a set of MV's for the given time step and a set of MV's, DV's, and/or CV's for a period of time leading up to the given time step. The CV predictions may be outputs of predictor neural network 3816, whereas the MV's, DV's, and CV's for the previous time period and the values of the MV's at the given time step may be provided as inputs to predictor neural network 3816. After the training process is completed, predictor neural network 3816 can be used to provide CV predictions for a future time step (e.g., time step t+1) as a function of the state of the plant leading up to the future time step (e.g., a set of values of the CV's, MV's, DV's, etc. for a time window beginning at time step t−w and ending at time step t, where w is the duration of the time window) and a set of planned or proposed values of the MV's for the future time step (e.g., time step t+1). This forward-looking prediction process is illustrated in FIG. 41. However, during the training process, predictor neural network trainer 3812 may use predictor neural network 3816 to predict the CV's of historical time steps using the MV's, DV's, and/or CV's in the set of historical data as an input to predictor neural network 3816.

In some embodiments, predictor neural network trainer 3812 is configured to determine an error between the predicted values of the CV's at historical time step t and actual values of the CV's at historical time step t in the historical training data. This may be performed by implementing an acceptable error threshold (e.g., 1%, 5% 20%, etc.) such that if the predicted CV is within that error threshold, the prediction is considered accurate, whereas if the predicted CV is outside of that error threshold, the prediction is considered inaccurate. Predictor neural network trainer 3812 may require the CV predictions to be accurate (e.g., within the acceptable error threshold) prior to determining that the training of predictor neural network 3816 is complete. Some or all of the techniques, steps, or processes used by predictor neural network trainer 2802 to train predictor neural network 2804, as described with reference to FIGS. 28-37, can be performed by predictor neural network trainer 3812 to train predictor neural network 3816.

In some embodiments, predictor neural network trainer 3812 is configured to train predictor neural network 3816 by performing multiple training episodes. Each training episode may include receiving predictor neural network 3816 with a given set of weights and repeatedly applying predictor neural network 3816 to historical plant data (e.g., a set of historical training data for a historical time period) including values of the MV's, CV's, and DV's up to a historical time step t−1 and values of the MV's for a historical time step t to predict values of the CV's at the historical time step t for each of a set of historical time steps t. The predictions for each time step t may be based on the values of the CV's predicted by predictor neural network 3816 for a preceding time step t−1 in combination with the historical plant data up to time step t. In some embodiments, the historical plant data used by predictor neural network 3816 to make the predictions for each time step t include values of the MV's for time step t and values of the DV's and CV's from time steps t−1 and before. For example, the predicted values of the CV's for a first historical time step t may be fed back into predictor neural network 3816 for the next historical time step t+1 and used in combination with historical values of the MV's at time step t+1 and historical values of the DV's and the MV's from time step t and one or more preceding time steps to predict the values of the CV's at time step t+1. This process may be repeated for each time step in the training episode to produce a trajectory of predicted CV values over the duration of the training episode. The trajectory of predicted CV values can then be compared with the actual values of the CV's over the duration of the training episode and the weights of predictor neural network 3816 can be adjusted to reduce the errors between the predicted and actual values of the CV's. These and other details of the episode-based training process are described in greater detail in U.S. Pat. No. 11,200,489 granted Dec. 14, 2021, the entire disclosure of which is incorporated by reference herein.

Predictive controller 3814 can be configured to use predictor neural network 3816 to perform an optimization process to generate control signals for controllable equipment 3826. In some embodiments, predictive controller 3814 is a model predictive controller that executes a model predictive control (MPC) process to generate the control signals. MPC is a type of predictive control that uses a predictive model to predict future states of the plant (i.e., the controlled system or process) based on the state of the plant up to a given time and the inputs provided to the plant over a time horizon beginning at the given time and ending at a later time. MPC can be performed over a selected time horizon which includes a plurality of time steps (e.g., from time step t to time step t+h, where h is the duration of the time horizon). The state of the plant up to time step t−1 and the inputs to the plant at time step t are used to predict the state of the plant at time step t (i.e., how the state of the plant will evolve between time steps t−1 and t). The predicted state of the plant at time step t is then used in combination with the state of the plant up to time step t−1 and the predicted or planned inputs to the plant at time step t+1 to predict the state of the plant at time step t+1. This process is repeated for each time step within the time horizon, using the actual or previously predicted state of the plant at one or more previous time steps and the planned or predicted inputs to the plant at that time step to predict the state of the plant at that time step. Accordingly, MPC can be used to predict how the state of the plant will evolve over time as a function of the predicted or planned inputs to the plant over a given time period.

In the context of control system 3800, predictive controller 3814 can be configured to predict the values of the CV's at each time step (e.g., time step t+1) within the time horizon based on the state of the plant at or leading up to the previous time step (e.g., the values of the CV's, MV's and DV's for the time window from time step t−w to time step t) and the inputs to the plant at time step t+1 (e.g., the values of the MV's at time step t+1). The values of the MV's at each time step can be controlled by predictive controller 3814 and together form the set of decision variables in the predictive optimization process. For example, if the time horizon includes ten time steps (i.e., t=1 . . . 10) and the set of MV's includes three decision variables (i.e., $MV_a$, $MV_b$, and $MV_c$), the set of decision variables used in the predictive optimization process may include thirty decision variables (i.e., $MV_{a,1}$, $MV_{a,2}$, . . . , $MV_{a,10}$, $MV_{b,1}$, $MV_{b,2}$, . . . , $MV_{b,10}$, $MV_{c,1}$, $MV_{c,2}$, . . . , $MV_{c,10}$). The values of the DV's at each time step may not be controllable by predictive controller 3814 and thus may be excluded from the set of decision variables, but can be forecasted for the duration of the time horizon and provided as inputs to the predictive optimization process. Each DV can be provided as a time series or vector of forecasted values (e.g., a value of each DV for each time step). The values of the CV's at each time step can be predicted by predictive controller 3814 (e.g., using predictor neural network 3816) based on the values of the MV's at that time step and the values of the MV's, CV's, and DV's at the previous time step and/or leading up to the previous time step. The trajectory of the CV's over time represents the predicted evolution of the state of the plant in response to a planned or forecasted trajectory of the MV's and the DV's over the duration of the time horizon.

Predictive controller 3814 is shown to include predictor neural network 3816, optimizer 3818, objective function 3828, constraints 3830, and control signal generator 3820. In brief overview, predictor neural network 3816 can be configured to predict the values of the CV's at time step t+1 based on a given (e.g., planned, proposed, hypothetical, etc.) set of MV moves or values of the MV's at time step t+1 provided by optimizer 3818 and the values of the state data from time step t−w to time step t (e.g., values of the CV's, MV's, and DV's from time steps t−w . . . t), which may be received from sensors 3824 and/or other data sources. Objective function 3828 may define the value of a control objective which may include one or more sub-objectives (e.g., volume/mass of products generated, price/value of products generated, error between predicted values of CV's and their target values, etc.) as a function of the MV's, CV's and/or DV's over the duration of the optimization time period (i.e., the duration of the time horizon h).

Optimizer 3818 may perform a predictive optimization process (e.g., a model predictive control process) to optimize objective function 3828 over the duration of the time horizon h subject to constraints 3830. The predictive optimization process may include optimizer 3818 providing predictor neural network 3816 with a proposed set of values for the decision variables (e.g., the MV moves or values of the MV's over the time horizon) and using predictor neural network 3816 to predict the values of the CV's that will result from the proposed set of values for the decision variables. Optimizer 3818 may use objective function 3828 to determine the value of the control objective as a function of the proposed MV's, predicted CV's, and DV's over the duration of the optimization period. Optimizer 3818 may iteratively adjust the proposed MV moves using an optimization algorithm (e.g., zero-order algorithms, first-order algorithms, second-order algorithms, etc.) with the goal of optimizing (e.g., minimizing or maximizing) the value of objective function 3828. The result of the predictive optimization process is a set of optimal MV moves or values of the MV's (i.e., values of the decision variables in the predictive optimization). Control signal generator 3820 may receive the optimal MV moves or optimal values of the MV's from optimizer 3818 and use the optimal MV moves or values of the MV's to generate control signals for controllable equipment 3826. These and other features of predictive controller 3814 are described in greater detail below.

Figure 39:
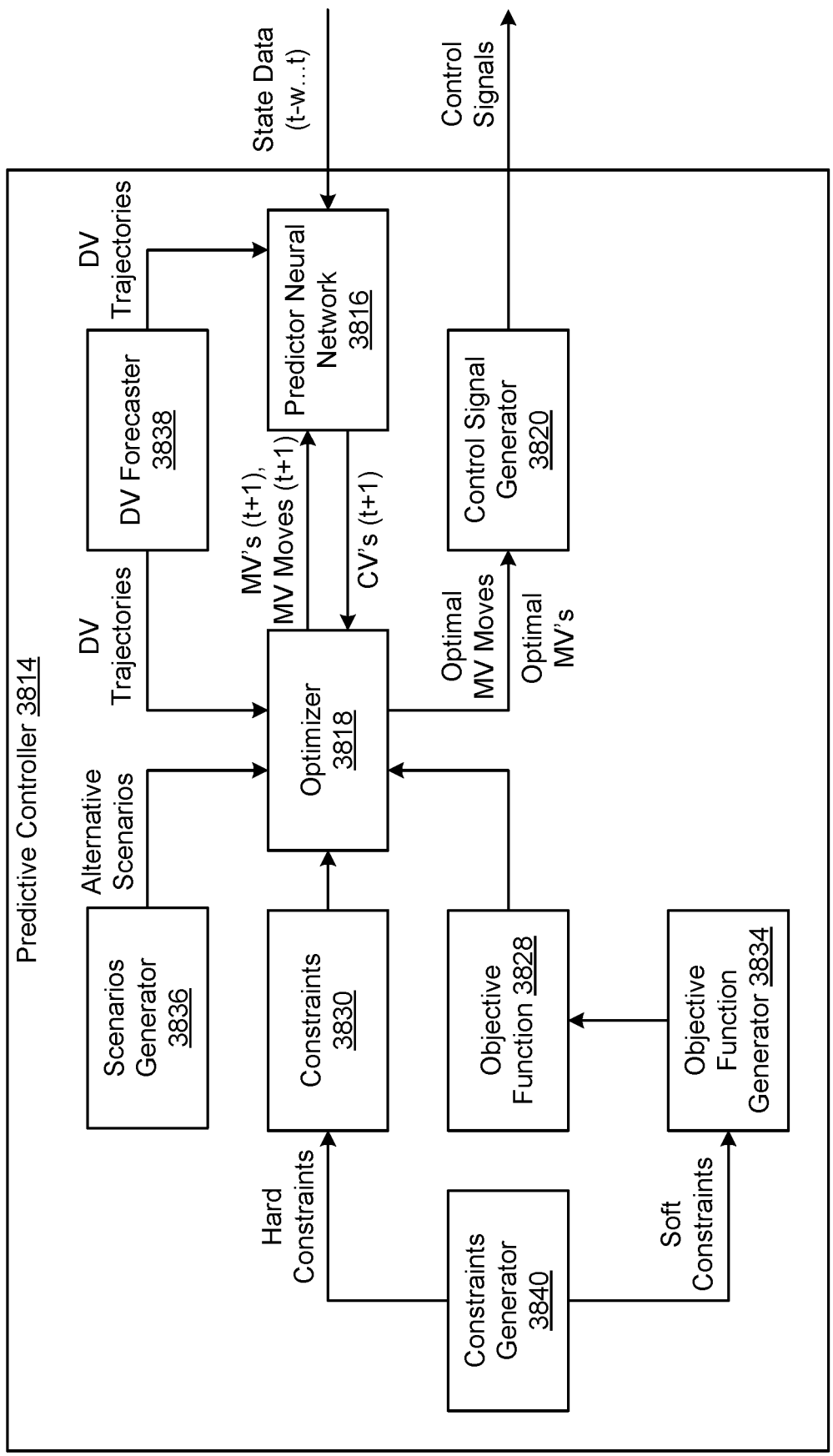
FIG. 39 is a block diagram illustrating the predictive controller of the control system of FIG. 38 in greater detail, according to some embodiments.

Referring now to FIG. 39, a block diagram illustrating predictive controller 3814 in greater detail is shown, according to an exemplary embodiment. In addition to the components shown in FIG. 38, predictive controller 3814 is shown to include a constraints generator 3840, an objective function generator 3834, a scenarios generator 3836, and a DV forecaster 3838.

Constraints generator 3840 may be configured to generate the set of constraints 3830 used by optimizer 3818 in the predictive optimization process. Constraints 3830 may define ranges of permissible values (e.g., upper bounds, lower bounds, allowed ranges, etc.), for any of the MV's, CV's, or other variables in the predictive optimization process (e.g., custom variables calculated based on the MV's, CV's and/or DV's). In some embodiments, constraints 3830 are based on operating limits of controllable equipment 3826. For example, constraints 3830 may limit the MV's to values within the minimum and maximum operating limits (e.g., maximum capacities, minimum capacities, etc.) of controllable equipment 3826 to ensure that the predictive optimization produces a feasible result that can realistically be achieved by controllable equipment 3826. In some embodiments, constraints 3830 impose limits on the rate of change of the MV's, CV's, or other variables in the predictive optimization process. For example, constraints 3830 may specify that the value of a given MV, CV, or other variable cannot change by an amount that exceeds a threshold rate of change (e.g., maximum increase or decrease between time steps). In some embodiments, constraints 3830 specify that the value of a given MV, CV, or other variable cannot change direction (e.g., change from increasing to decreasing or change from decreasing to increasing relative to the previous time step) if less than a threshold amount of time has elapsed since the last change in direction occurred.

In some embodiments, constraints 3830 impose a limit on the number of changes in direction of a given variable or require the change in the value of the variable between time steps to be substantially uniform (e.g., increase or decrease at a substantially uniform or linear rate), or impose any other limit on the geometry of the trajectory of the variable over time. For example, the trajectory of a given variable over time can be defined as a piecewise linear function that includes several linear segments connected at their endpoints. The linear segments may have different slopes that indicate different rates of change of the variable. Each linear segment may span a length of time (e.g., an amount of time that elapses between a range of time steps) over which the rate of change or slope of the given variable is consistent (e.g., a consistent slope of zero indicating no change, a consistent positive or negative slope indicating a positive or negative rate of change). Constraints 3830 may impose an upper limit on the number of linear segments within the trajectory of the given variable over time. Similarly, constraints 3830 may define a maximum number of times that the rate of change or slope of the given variable is permitted to change within the selected time horizon (e.g., a maximum number of "bend points" between segments of different slopes). Constraints 3830 such as these will cause optimizer 3818 to select values of the MV's that result in the permitted number (or fewer) of linear segments or slope changes if implemented as hard constraints, or encourage optimizer 3818 to select values of the MV's that result in fewer changes in slope of the given variable over time if implemented as soft constraints or penalties.

In some embodiments, constraints 3830 require the values of the MV's, CV's, or other variables to be equal to a corresponding target value, or above, below, or within a threshold range of the corresponding target value (e.g., +/−5%, +/−10%, +/−25%, etc.). For example, constraints generator 3840 may receive target values for one or more of the MV's and may generate constraints 3830 that require the MV's to be equal to or within a predetermined threshold of the corresponding target values. In some embodiments, constraints 3830 define relationships between two or more of the MV's, DV's, CV's or other variables (e.g., a given MV must be less than another MV, the product of two MV's must be greater than a threshold, the value of a MV must be equal to a given function of one or more of the other MV's and/or DV's, etc.). The relationships defined by constraints 3830 can represent the physical realities of the plant (e.g., constraints that reflect laws of physics, chemistry, etc.) or may represent operational requirements that are desired to be achieved but are not mandated by physical laws.

In some embodiments, the relationship between the inputs to predictor neural network 3816 and the outputs of predictor neural network 3816 are implemented as constraints 3830. For example, predictor neural network 3816 can be used to define or establish a constraint that requires the CV's at time step t+1 to be related to the values of the MV's or MV moves at time step t+1 and the values of the MV's, DV's, and CV's defined by the state data from time step t−w to time step t. In other words, constraints 3830 may require the values of the CV's at time step t+1 to be related to the values of the MV's at time step t+1 and the values of the MV's, DV's, and CV's at previous time steps, where the relationships between the MV's, DV's, and CV's required by constraints 3830 reflect the predictions made by predictor neural network 3816. In some embodiments, objective function 3828 is a function of the CV's at time t+1 as well as future time steps of the optimization period. Accordingly, the relationships or constraints provided by predictor neural network 3816 allow optimizer 3818 to determine the values of the MV's that optimize objective function 3828 by relating the values of the MV's proposed by optimizer 3818 for the duration of the optimization period to the predicted values of the CV's used in objective function 3828.

Constraints generator 3840 may be configured to impose the generated constraints as hard constraints and/or soft constraints. Hard constraints may be implemented as equality constraints or inequality constraints on the predictive optimization process. Hard constraints must be satisfied by any solution produced by optimizer 3818 and cannot be violated when performing the predictive optimization process. Conversely, soft constraints may be implemented as penalties on objective function 3828 (e.g., additional terms in objective function 3828) that impact the overall value of objective function 3828 when the constraint is violated. For example, a soft constraint may be defined as a penalty that is incurred when the value of a CV deviates from its corresponding target value by more than a given amount or otherwise violates a given condition based on the value of the CV. Soft constraints can be violated when performing the predictive optimization process, but optimizer 3818 is discouraged from selecting values of the MV's that result in soft constraint violations because any such violations will affect the value of objective function 3828. However, optimizer 3818 may generate a solution that violates the soft constraints, for example, when no feasible solution exists without violating the soft constraints or if the penalties resulting from the soft constraints do not outweigh the benefits (e.g., other terms of objective function 3828 outweigh the penalties).

Objective function generator 3834 can be configured to generate objective function 3828 for use in the predictive optimization process. Objective function 3828 may be a function J that defines the value of one or more control objectives as a function of the MV's, CV's, DV's, or other variables in the predictive optimization process. Several examples of objective functions that could be generated and used are described above with reference to FIGS. 26-37. Several additional examples are provided below. In some embodiments, objective function 3828 may depend on the values of the MV's, CV's and/or DV's for all of the time steps within the optimization period. For example, objective function 3828 may be the summation or mean of a set of terms calculated for every time step (i.e., a step-wise objective) based on the values of the MV's, CV's, and/or DV's for that time step.

In some embodiments, objective function 3828 is a minimization or maximization function based on the values of the CV's over the duration of the optimization period. One example of objective function 3828 is:

$$J = \sum_{t=1}^{h} CV_{1,t} + CV_{2,t} + CV_{3,t} + \ldots + CV_{n,t}$$

where $CV_{1,t}$, $CV_{2,t}$, $CV_{3,t}$ ... $CV_{n,t}$ are the values of the n CV's at time step t and the summation adds the values of the CV's at each time step t=1 ... h within the optimization period. In this example, each of the CV's may represent the volume, mass, or flow rate of a given product generated by the plant such that the summation represents the total volume, mass, or aggregate flow rate (respectively) over the duration of the optimization period.

Another example of objective function 3828 is:

$$J = \sum_{t=1}^{h} w_{1,t} CV_{1,t} + w_{2,t} CV_{2,t} + w_{3,t} CV_{3,t} + \ldots + w_{n,t} CV_{n,t}$$

where $CV_{1,t}$, $CV_{2,t}$, $CV_{3,t}$ ... $CV_{n,t}$ are the values of the n CV's at time step t, $w_{1,t}$, $w_{2,t}$, $w_{3,t}$ ... $w_{n,t}$ are weights (e.g., prices, relative importance of each CV, etc.) of then CV's at time step t, and the summation adds the weighted values of the CV's at each time step t=1 ... h within the optimization period. For an embodiment in which the weights are prices or costs, the summation represents the total price or value of the products generated by the plant over the duration of the optimization period.

In some embodiments, objective function 3828 includes one or more penalty terms that act as soft constraints. Objective function generator 3834 can be configured to modify the base objective function J to add penalties as illustrated in the following example:

$$J_a = J - \sum_{t=1}^{h} |CV_{1,t} - TV_{1,t}| + |CV_{2,t} - TV_{2,t}| + |CV_{3,t} - TV_{3,t}| + \ldots + |CV_{n,t} - TV_{n,t}|$$

where $CV_{1,t}, CV_{2,t}, CV_{3,t}, \ldots CV_{n,t}$ are the values of the n CV's at time step t, $TV_{1,t}, TV_{2,t}, TV_{3,t}, \ldots TV_{n,t}$ are the target values of the n CV's at time step t, J is the initial objective function without penalties (e.g., any of the objective functions described above), and $J_a$ is the augmented objective function 3828 after accounting for the penalties. In this example, the summation represents the total penalty incurred as a result of the CV's deviating from their corresponding target values over the duration of the optimization period, which subtracts from the overall value of the augmented objective function $J_a$ to be maximized. Thus, optimizer 3818 may be discouraged from incurring penalties in the interest of maximizing the value of $J_a$. If the optimization problem is alternatively formulated as a minimization problem, the penalties may add to the overall value of the augmented objective function $J_a$ (i.e., $J_a$=J+penalties) such that optimizer 3818 may be discouraged from incurring the penalties in the interest of minimizing the value of $J_a$. In some embodiments, square functions (e.g., $(CV_{1,t}-TV_{1,t})^2$) can be used instead of absolute value functions (e.g., $|CV_{1,t}-TV_{1,t}|$) for the penalties.

Another example of penalty terms that act as soft constraints is shown in the following equation:

$$J_a = J - \sum_{t=1}^{h} \delta_{1,t} + \delta_{2,t} + \delta_{3,t} + \ldots + \delta_{n,t}$$

where $\delta_{1,t}+\delta_{2,t}+\delta_{3,t}+\ldots+\delta_m$ are amounts by which the values of the corresponding CV's (i.e., $CV_{1,t}, CV_{2,t}, CV_{3,t}, \ldots CV_{n,t}$) deviate from a desired range. The desired range can be set by adding inequality constraints to the set of constraints 3830 as follows:

$\delta_{1,t} \geq CV_{1,t} - CV_{1,max}$ $\delta_{1,t} \geq CV_{1,min} - CV_{1,t}$ $\delta_{1,t} \geq 0$ where $CV_{1,max}$ is the maximum desired value of the first controlled variable $CV_1$, $CV_{1,min}$ is the minimum desired value of the first controlled variable $CV_1$, and the set of inequalities ensures that optimizer 3818 sets the value of $\delta_{1,t}$ to a non-negative value that represents either the amount by which $CV_{1,t}$ exceeds $CV_{1,max}$ or the amount by which $CV_{1,t}$ is less than $CV_{1,min}$. Similar constraints can be added for the other CV's.

While a few examples of augmented objective functions $J_a$ are provided to illustrate the concept of soft constraints or penalties, it should be appreciated that any type of soft constraint, penalty, or other term can be added to the objective function J to account for any of a variety of control objectives or constraints, as may be desirable based on the particular implementation of control system 3800. In general, objective function 3828 can include any number of smaller objectives (e.g., terms within objective function 3828) or sub-goals of various types. Sub-goals can be applied to any MV, CV, or custom variable calculated on the basis of the MV's, CV's, and/or DV's. Sub-goals can include soft constraints such as upper and lower bounds, target values, value maximization or minimization, or any other function that can be expressed in terms of the MV's, CV's, DV's, and/or any other information.

In some embodiments, objective function generator 3834 formulates objective function 3828 in the form of the optimization problem to be solved by optimizer 3818. In general, the predictive optimization problem may have the following form:

$$\max_{MV} J_a \text{ or } \min_{MV} J_a \text{ s.t. constraints}$$

which denotes that the goal of the predictive optimization is to either maximize or minimize the value of the objective function $J_a$ 3828 by adjusting the values of the manipulated variables (MV's) subject to a set of constraints. The MV's are the decision variables in the predictive optimization process and are adjusted by optimizer 3818 to drive objective function 3828 toward a maximum or minimum value. The predictive optimization is performed subject to the constraints generated by constraints generator 3840, which can be implemented as hard constraints or soft constraints as previously described.

DV forecaster 3838 can be configured to forecast a trajectory of each of the DV's for the duration of the optimization period. As noted above, DV's may not be directly controllable, but can be predicted or forecasted prior to performing the predictive optimization process and provided as an input to optimizer 3818 and/or predictor neural network 3816. DV forecaster 3838 can generate a trajectory or time series of each DV which includes a value of each DV at each time step of the optimization period. In some embodiments, DV forecaster 3838 provides the forecasted DV trajectories in vector or matrix form, as shown in the following equations:

$$DV_1 = [DV_{1,1}, DV_{1,2}, DV_{1,3}, \ldots DV_{1,h}]$$

$$DV_2 = [DV_{2,1}, DV_{2,2}, DV_{2,3}, \ldots DV_{2,h}]$$

$$\vdots$$

$$DV_m = [DV_{m,1}, DV_{m,2}, DV_{m,3}, \ldots DV_{m,h}]$$

where $DV_1$ is a vector containing a value for the first DV at each time step t=1 . . . h, $DV_2$ is a vector containing a value for the second DV at each time step t=1 . . . h, and $DV_m$ is a vector containing a value for the m'th DV at each time step t=1 . . . h, where m is the total number of DV's forecasted.

DV forecaster 3838 can use any of a variety of techniques to forecast the values of the DV's over the duration of the optimization period. In some embodiments, DV forecaster 3838 extrapolates the values of the DV's from a historical pattern (e.g., historical values of the DV's prior to the beginning of the optimization period) using linear extrapolation, polynomial extrapolation, conical extrapolation, geometric extrapolation, constant extrapolation (e.g., holding the values of the DV's at their most recent known values, setting the DV's to their average values over several past time steps), or any other extrapolation technique. In some embodiments, DV forecaster 3838 applies noise to the extrapolated or forecasted values of the DV's. For example, DV forecaster 3838 may add a noise signal (e.g., a random signal, a normally distributed or Gaussian noise signal, etc.) to the extrapolated or forecasted values of the DV's. In some embodiments, DV forecaster 3838 uses an auto-regressive model to predict the trajectory of the DV's based on their historical pattern. In some embodiments, the auto-regressive model is based on a neural network. The DV trajectories generated by DV forecaster 3838 can be provided as inputs to predictor neural network 3816 for use in predicting the CV's. The DV trajectories generated by DV forecaster 3838 can also be provided as inputs to optimizer 3818 for use in formulating the predictive optimization problem. For example, optimizer 3818 can use the DV trajectories to define the values of any DV's in objective function 3828 and/or constraints 3830.

Scenarios generator 3836 can be configured to generate multiple different alternative scenarios to be considered by optimizer 3818. Each of the alternative scenarios may include some or all of the information discussed above including, for example, a set of values for the DV trajectories, constraints 3830, target values of the CV's, or any other information needed to fully define the optimization problem. Each scenario may be a fully defined instance of the predictive optimization problem. However, each of the alternative scenarios may represent slightly different conditions and thus may include different values (relative to the other scenarios) for some or all of the DV trajectories, constraints 3830, target values of the CV's, or any other information needed to fully define the optimization problem. In some embodiments, scenarios generator 3836 generates the alternative scenarios by adding different noise signals to a base set of the DV trajectories, constraints 3830, or target values of the CV's (e.g., different random noise signals, different normally distributed or Gaussian noise signals, etc.), by applying dropout to the neurons of predictor neural network 3816 (e.g., noise in internal neurons), or otherwise generating multiple different and alternative sets of values for the various inputs to optimizer 3818. By generating alternative scenarios in this manner, scenarios generator 3836 can mimic the stochastic nature of the target environment and account for a variety of different scenarios that could potentially occur. This may result in a more robust control policy relative to any single scenario.

Optimizer 3818 may perform the predictive optimization process for each of the alternative scenarios independently to generate a scenario-specific set of values for the MV's or MV moves that are optimal for that particular scenario. Optimizer 3818 may then combine (e.g., average, sum, aggregate, etc.) the scenario-specific results of the predictive optimization process to generate the final values for the MV's or MV moves. In some embodiments, optimizer 3818 combines the scenario-specific results of the predictive optimization process using a weighted average that weighs each scenario by the likelihood of that scenario occurring. For example, optimizer 3818 can calculate an amount by which the inputs for each scenario (i.e., the DV trajectories, constraints 3830, target values of the CV's, etc.) deviate from an average or mean of the set of scenarios (e.g., as a standard deviation, variance, etc.). Optimizer 3818 can assign a greater weight to the scenarios that are closer to the average or mean, and a lower weight to the scenarios that are farther from the average or mean (e.g., using a normally distributed set of weights that follow a bell-shaped curve centered at that average or mean scenario). In some embodiments, optimizer 3818 can assign a greater weight to the scenarios that result in fewer changes in the values of the MV's or fewer piecewise linear segments in the trajectories of the MV's over time (as described above) and assign a lesser weight to the scenarios that result in more changes in values of the MV's or more piecewise linear segments in the trajectories of the MV's over time, relative to the other scenarios. In general, optimizer 3818 may assign each scenario a score or weight based on any of these or other factors and use the weights to combine the scenario-specific results of the predictive optimization process.

One example of an equation that can be used to combine the scenario-specific results of the predictive optimization process is:

$$MV_t = \sum_{i=1}^{p} w_i MV_{i,t}$$

where $MV_t$ is the final value of a given MV at time t, $MV_{1,t}$ is the scenario-specific value of that same MV for the ith scenario generated by performing the predictive optimization using the scenario-specific inputs for the ith scenario, $w_i$ is the weight assigned to the ith scenario, and p is the total number of scenarios. The set of weights $w_1 \ldots w_p$ may sum to one in some embodiments. This same equation can be applied to each of the MV's in the predictive optimization process to combine the results of the scenario-specific predictive optimization processes into a final result that accounts for all of the scenarios generated by scenarios generator 3836.

Although one equation that can be used by optimizer 3818 is provided as an example, it should be understood that this example is non-limiting and it is contemplated that optimizer 3818 may combine the scenario-specific results using any of a variety of combination strategies. Another combination strategy that could be used by optimizer 3818 includes removing outlier scenarios or outlier values of the MV's (e.g., by evaluating the scenarios or MV's using an outlier detection or clustering technique) and averaging the remaining scenarios or values of the MV's after outlier removal. In some embodiments, optimizer 3818 combines the scenario-specific results of the predictive optimization process using a neural network that is trained to produce a trajectory of the MV's or MV moves (referred to herein as an "input sequence") that achieves the best performance when applied to all scenarios. The input sequence that achieves the best performance can be determined by scoring the results of each input sequence in each scenario using the objective function 3828 and selecting the input sequence that results in the most optimal value of the objective function 3828 when averaged over the scenarios.

Alternatively, rather than running the predictive optimization process for each scenario individually to produce scenario-specific results and then combining the scenario-specific results, optimizer 3818 may perform a combined predictive optimization process that considers all of the scenarios together in a single optimization. For example, optimizer 3818 may combine (e.g., sum, average, etc.) all of the scenario-specific control objectives (e.g., each of the scenario-specific objective functions or terms within each of the scenario-specific objective functions) to generate a single objective function 3828 that encompasses all of the scenarios. In some embodiments, optimizer 3818 combines or considers all of the scenario-specific results or scenario-specific objective functions by selecting the scenario that has the minimum or maximum value of the corresponding scenario-specific objective function (i.e., the worst case scenario or best case scenario) so as to perform the subsequent steps using the worst case scenario or best case scenario. Optimizer 3818 may then execute the predictive optimization process using the combined objective function 3828 to generate an input sequence that optimizes the combined objective function 3828. This technique is a robust control method (e.g., stochastic control or stochastic optimal control) as it considers many different scenarios that could potentially occur and produces an input sequence that is optimal in view of the uncertainty in which scenario will actually occur over the duration of the time horizon.

Optimizer 3818 can be configured to execute the predictive optimization process using any of a variety of optimization techniques. Examples of optimization techniques that can be used by optimizer 3818 include zero-order, first-order, or second-order optimization algorithms. In some embodiments, optimizer 3818 performs the optimization process iteratively to converge on the optimal set of values for the MV's or MV moves as the iterations progress.

In some embodiments, the optimization problem solved by optimizer 3818 is non-convex. Traditional optimization-based control systems such as those conventionally used for model predictive control (MPC) typically apply convex optimization, which is the process of minimizing convex functions over convex sets. In a convex function, a straight line connecting any two points on a graph of the function does not lie below the graph of the function between the two points (i.e., all points on the line lie at or above the graph of the function, regardless of which two points on the graph of the function are selected as the end points). Similarly, in a convex set, a straight line connecting any two points within the convex set is contained entirely within the convex set (i.e., all points along the line are contained within the convex set). In convex optimization, the feasible solution set is a convex set and every stationary point is also a global minimum. Non-convex optimization is significantly more challenging than convex optimization due to the potential existence of stationary points that are not necessarily the global minimum and/or feasible solution sets that are non-convex sets. While convex optimization problems can be solved exactly (i.e., reaching a global minimum) using standard MPC algorithms, non-convex optimization problems typically cannot.

In some embodiments, optimizer 3818 performs the predictive optimization process using a non-convex optimization algorithm. For example, optimizer 3818 may adjust the values of the MV's to drive objective function 3828 toward its optimal value using a non-convex optimization algorithm. Examples of non-convex optimization algorithms that can be used by optimizer 3818 include zero-order optimization algorithms (i.e., any optimization algorithm that does not rely on first-order information such as first derivatives or gradients, second-order information such as the Hessian, or higher-order information about the optimized function) such as genetic algorithms, first-order optimization algorithms (i.e., any algorithm that uses at least one first-derivative or gradient of the optimized function and does not use second-order or higher-order information about the optimized function) such as gradient descent, and second-order optimization algorithms (i.e., any algorithm that uses at least one second-derivative, Hessian, or other second-order information and does not use higher-order information about the optimized function) such as Newton's method.

In some embodiments, optimizer 3818 is configured to determine the number of iterations to use and/or when to stop the iterative optimization process by monitoring results of the predictive optimization and evaluating whether the results are converging or have sufficiently converged. For example, optimizer 3818 may determine that the predictive optimization has sufficiently converged if the result of the most recent iteration deviates by less than a threshold (e.g., a percentage change, a change by less than a predetermined amount, etc.) relative to the previous iteration. In response to detecting such convergence, optimizer 3818 may stop the iterative process and use the most recent set of results as the final results. The ability to adaptively determine when to stop the predictive optimization process may ensure that optimizer 3818 performs a sufficient number of iterations to allow for convergence on the optimal values, but does not waste computational effort on unnecessary iterations once the results have sufficiently converged.

Upon completing the predictive optimization process, optimizer 3818 may provide the optimal values of the decision variables to control signal generator 3820. As discussed above, the decision variables may include values for each of the MV's at each of the time steps within the optimization period. For example, if the optimization period includes ten time steps (i.e., t=1 . . . 10) and the set of MV's includes three decision variables (i.e., $MV_a$, $MV_b$, and $MV_c$), the set of decision variables may include thirty decision variables (i.e., $MV_{a,1}$, $MV_{a,2}$, . . . , $MV_{a,10}$, $MV_{b,1}$, $MV_{b,2}$, . . . , $MV_{b,10}$, $MV_{c,1}$, $MV_{c,2}$, . . . , $MV_{c,10}$). In some embodiments, optimizer 3818 provides control signal generator 3820 with a set of MV moves in addition to or in place of the optimal values of the MVs. The MV moves may indicate an amount by which the MV's should be changed relative to their previous values. For example, if optimizer 3818 determines that the optimal value of a given MV at time step t−1 is $x_{t-1}$ and the optimal value of that same MV at time step t is $x_t$, optimizer 3818 may calculate the optimal MV move from time step t−1 to time step t as $x_t - x_{t-1}$. Control signal generator 3820 can use the optimal values of the MV's and/or the optimal MV moves to generate the control signals for controllable equipment 3826.

In some embodiments, optimizer 3818 repeats the predictive optimization process at each time step to generate a new trajectory of values for each of the MV's and/or MV moves. Each trajectory may include a value of each of the MV's and/or MV moves for each of the time steps within the optimization period. For example, at time step t=1, optimizer 3818 may perform the predictive optimization process to generate a set of MV trajectories and/or MV moves for each time step from time step t=1 to time step t=h, where h is the total number of time steps within the optimization period. The MV trajectories can be provided in vector or matrix form, as shown in the following equations:

$$MV_1 = [MV_{1,1}, \ MV_{1,2}, \ MV_{1,3}, \ \ldots \ MV_{1,h}]$$
$$MV_2 = [MV_{2,1}, \ MV_{2,2}, \ MV_{2,3}, \ \ldots \ MV_{2,h}]$$
$$\vdots$$
$$MV_n = [MV_{n,1}, \ MV_{n,2}, \ MV_{n,3}, \ \ldots \ MV_{n,h}]$$

where $MV_1$ is a vector containing a value for the first MV or MV move at each time step t=1 . . . h, $MV_2$ is a vector containing a value for the second MV or MV move at each time step t=1 . . . h, and $MV_n$ is a vector containing a value for the n'th MV or MV move at each time step t=1 . . . h, where n is the total number of MV's in the predictive optimization process. Control signal generator 3820 can use the optimal values of the MV's at time step t=1 and/or the optimal MV moves at time step t=1 to generate the control signals for controllable equipment 3826 at time step t=1. Control signal generator 3820 may ignore the optimal values of the MV's and/or MV moves for time steps t=2 . . . h or store the optimal values of the MV's and/or MV moves for time steps t=2 . . . h for later use.

At the next time step t=2, optimizer 3818 may shift the optimization period forward in time by one time step (i.e., beginning at time step t=2 and ending at time step h+1) and repeat the predictive optimization process to generate a set of MV trajectories and/or MV moves for each time step from time step t=2 to time step t=h+1, where h is the total number of time steps within the optimization period. The optimization period still has the same number of time steps, but is shifted forward in time relative to the previous optimization. The MV trajectories can be provided in vector or matrix form, as shown in the following equations:

$$MV_1 = [MV_{1,2}, \ MV_{1,3}, \ MV_{1,4}, \ \ldots \ MV_{1,h+1}]$$
$$MV_2 = [MV_{2,2}, \ MV_{2,3}, \ MV_{2,4}, \ \ldots \ MV_{2,h+1}]$$
$$\vdots$$
$$MV_n = [MV_{n,2}, \ MV_{n,3}, \ MV_{n,4}, \ \ldots \ MV_{n,h+1}]$$

where $MV_1$ is a vector containing a value for the first MV or MV move at each time step t=2 . . . h+1, $MV_2$ is a vector containing a value for the second MV or MV move at each time step t=2 . . . h+1, and $MV_n$ is a vector containing a value for the n'th MV or MV move at each time step t=2 . . . h+1, where n is the total number of MV's in the predictive optimization process. Control signal generator 3820 can use the optimal values of the MV's at time step t=2 and/or the optimal MV moves at time step t=2 to generate the control signals for controllable equipment 3826 at time step t=2. Control signal generator 3820 may ignore the optimal values of the MV's and/or MV moves for time steps t=3 . . . h+1 or store the optimal values of the MV's and/or MV moves for time steps t=3 . . . h+1 for later use.

Optimizer 3818 can repeat the process of shifting the optimization period forward in time and performing another run of the predictive optimization process to provide control signal generator 3820 with an updated trajectory of MV's and/or MV moves at the beginning of each time step. Each time an updated trajectory of MV's and/or MV moves is received, control signal generator 3820 can implement the control decisions for the first time step in the updated trajectory (i.e., use the values of the MV's and/or MV moves for the first time step to generate the control signals for controllable equipment 3826) and ignore the control decisions for the remaining time steps in the updated trajectory. When another updated trajectory is received at the beginning of the next time step, control signal generator 3820 can overwrite the previously received trajectories of the MV's and/or MV moves with the most recent trajectories received from optimizer 3818. In some embodiments, control signal generator 3820 can selectively ignore or modify the control decisions provided by optimizer 3818 for certain MV's (e.g., preventing certain MV's from being changed, overriding the values of certain MV's from optimizer 3818 with predetermined values, etc.) based on a set of rules stored by control signal generator 3820, while implementing the control decisions provided by optimizer 3818 for other MV's without modification. For example, one rule that could be used by control signal generator 3820 may define a threshold for a number of MV moves and/or a magnitude of MV moves for one or more of the MV's within a given time period and may cause control signal generator 3820 to ignore subsequent moves of the applicable MV's if the threshold has been exceeded until the time period has expired or the rule is no longer satisfied. As another example, control signal generator 3820 may receive input from a user (e.g., a plant operator) and selectively ignore the control decisions from optimizer 3818 for one or more of the MV's if the user has provided a manual override for the MV's or otherwise indicated that the automatic control decisions generated by optimizer 3818 should be ignored. Such user input can be received in real-time or ahead-of-time for some or all of the time steps in a future time period.

As an alternative to overwriting the previously received trajectories each time a new trajectory is received, control signal generator 3820 may store in memory the full trajectories of the MV's and/or MV moves received at each time step. Control signal generator 3820 may merge the updated trajectory with the previously received trajectory or trajectories such that the value of a MV or MV move for a given time step evolves as additional trajectories containing that time step are received. For example, control signal generator 3820 may calculate an average of all of the values of a given MV received for a given time step and use the average value to generate the control signals for controllable equipment 3826. In various embodiments, control signal generator 3820 can calculate the average value as simple average or a weighted average (e.g., an exponentially weighted average) which weighs more recently received trajectories more heavily. By the time a given time step (e.g., time step t=x) becomes the first time step within a newly received trajectory, control signal generator 3820 will have received h trajectories that include the given time step (i.e., an initial trajectory that includes time step t=x as the last time step, an updated trajectory that includes time step t=x as the penultimate time step, etc.), where h is the number of time steps within the optimization period and the hth trajectory includes time step t=x as the first time step. Each successive trajectory may be shifted forward in time by one time step such that the given time step moves from the end of the trajectory (i.e., a trajectory ending at time step t=x) to the beginning of the trajectory (i.e., a trajectory beginning at time step t=x). Control signal generator 3820 can merge or combine the h values of the MV or MV move for the given time step t=x to calculate the value of the MV or MV move that is used to generate the control signals for controllable equipment 3826.

Figure 40:
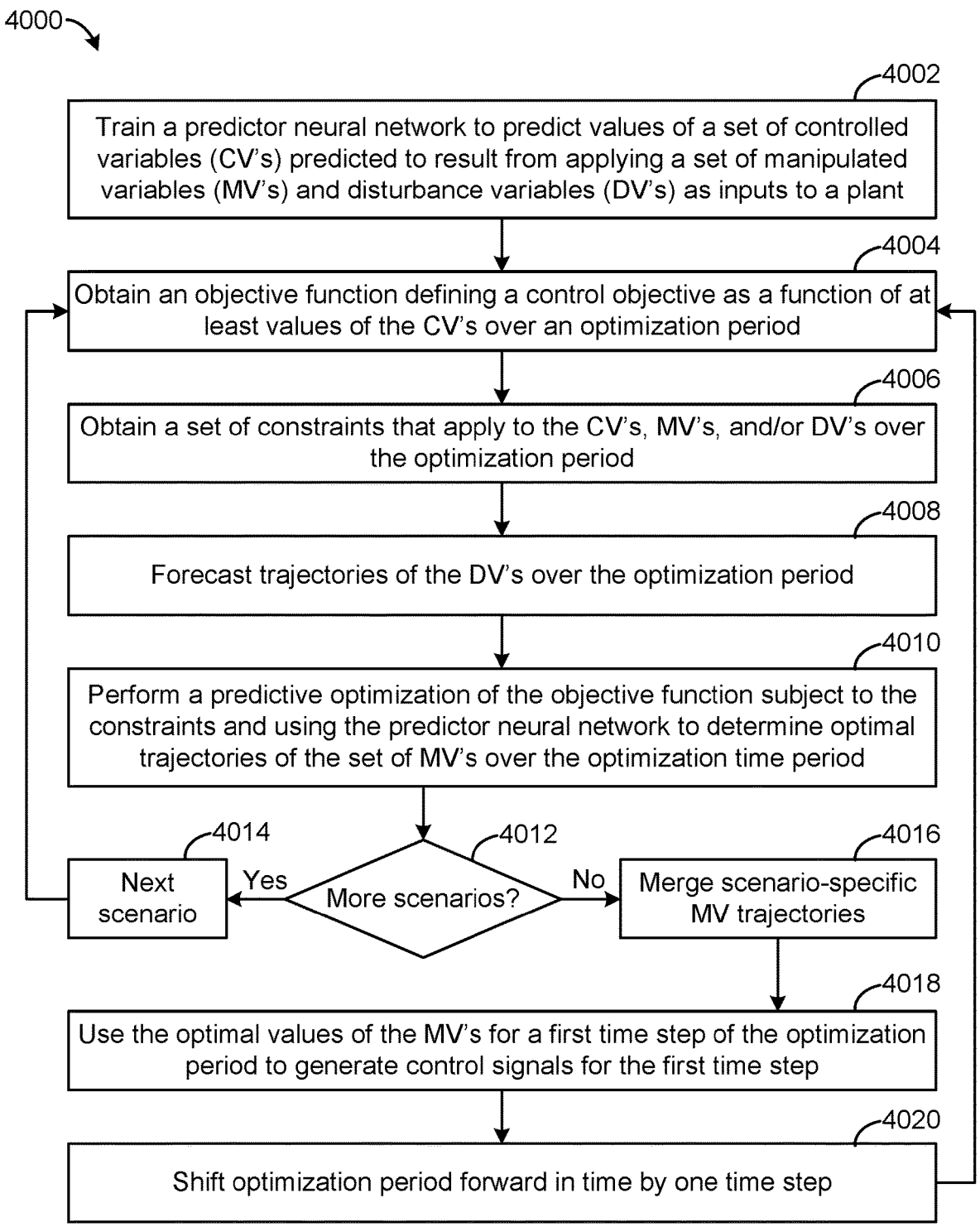
FIG. 40 is a flowchart of a process which can be performed by the optimization control system of FIGS. 38-39, according to some embodiments.

Referring now to FIG. 40, a flowchart of a process 4000 for monitoring and controlling a plant is shown, according to an exemplary embodiment. The plant can include any type of controllable system or process including, but not limited to, the equipment of system 100 (e.g., atmospheric distillation unit 110, vacuum distillation unit 112, fractionator 114, pump 122, furnace 124, valve 120, coke drums 116-118, etc.), the equipment of system 200 (e.g., drum feeder 236, etc.), petroleum refining equipment 2626, and/or any other type of controllable equipment 3826 in any type of controllable system or process, whether related to petroleum refining or otherwise. Process 4000 can be performed by any of the systems or devices described herein. In some embodiments, process 4000 is performed by plant controller 3802 or any components thereof (e.g., data collector 3810, predictor neural network trainer 3812, predictive controller 3814, etc.) as described with reference to FIGS. 38-39. In various embodiments, one or more steps of process 4000 can be omitted without departing from the teachings of the present disclosure.

Process 4000 is shown to include training a predictor neural network to predict values of a set of controlled variables (CV's) predicted to result from applying a set of manipulated variables (MV's) and disturbance variables (DV's) as inputs to a plant (step 4002). In some embodiments, step 4002 is performed by predictor neural network trainer 3812 as described with reference to FIG. 38. For example, step 4002 may include obtaining historical data from data collector 3810 and training predictor neural network 3816 by adjusting the weights of predictor neural network 3816. Step 4002 may include using the CV predictions of predictor neural network 3816 to make adjustments to the weights. For example, step 4002 may include adjusting or tuning the weights of predictor neural network 3816 such that the CV predictions generated by predictor neural network 3816 comply or align with the values of the CV's in the historical data. An example of a process which can be performed to accomplish step 4002 is described in greater detail with reference to FIG. 36.

Predictor neural network 3816 can be any type of neural network model configured to predict a set of CV's for a given time step based on a set of MV's for the given time step (i.e., a set of decision variables for the given time step) and a set of MV's, DV's, and/or CV's leading up to the given time step (i.e., past state data for the plant). The CV predictions may be outputs of predictor neural network 3816, whereas the MV's for the given time step and the MV's, DV's, and CV's leading up to the given time step may be provided as inputs to predictor neural network 3816. After the training process is completed, predictor neural network 3816 can be used to provide CV predictions for a future time step (e.g., time step t+1) as a function of a set of MV's for the future time step (e.g., time step t+1) and the state of the plant leading up to the future time step (e.g., a set of values of the CV's, MV's, DV's, etc. from time step t−w to time step t). However, the training process in step 4002 may use predictor neural network 3816 to predict the CV's of historical time steps using the MV's, DV's, and/or CV's in the set of historical data as an input to predictor neural network 3816.

In some embodiments, step 4002 includes determining an error between the predicted values of the CV's at historical time step t and actual values of the CV's at historical time step t in the historical training data. This may be performed by implementing an acceptable error threshold (e.g., 1%, 5% 20%, etc.) such that if the predicted CV is within that error threshold, the prediction is considered accurate, whereas if the predicted CV is outside of that error threshold, the prediction is considered inaccurate. Step 4002 may require the CV predictions to be accurate (e.g., within the acceptable error threshold) prior to determining that the training of predictor neural network 3816 is complete. Some or all of the techniques, steps, or processes described with reference to FIGS. 38-39, can be performed to train predictor neural network 3816 in step 4002.

Process 4000 is shown to include obtaining an objective function defining a control objective as a function of values of the CV's over an optimization period (step 4004). In some embodiments, step 4004 is performed by objective function generator 3834 to generate or obtain objective function 3828, as described with reference to FIGS. 38-39. Objective function 3828 may be any function that defines the value of one or more control objectives as a function of the MV's, CV's, DV's, or other variables in the predictive optimization process. Several examples of objective functions that could be obtained in step 4004 are described above with reference to FIGS. 26-39. In some embodiments, objective function 3828 depends on the values of the MV's, CV's and/or DV's for all of the time steps within the optimization period. For example, objective function 3828 may be the summation or mean of a set of terms calculated for every time step (i.e., a step-wise objective) based on the values of the MV's, CV's, and/or DV's for that time step. In various embodiments, objective function 3828 can be a differentiable function or a non-differentiable function.

In some embodiments, step 4004 includes adding soft constraints or penalties to objective function 3828. Any type of soft constraint, penalty, or other term can be added to objective function 3828 to account for any of a variety of control objectives or constraints, as may be desirable based on the particular implementation of process 4000. In general, objective function 3828 can include any number of smaller objectives (e.g., terms within objective function 3828) or sub-goals of various types. Sub-goals can be applied to any MV, DV, or custom variable calculated on the basis of the MV's, CV's, and/or DV's. Sub-goals can include soft constraints such as upper and lower bounds, target values, value maximization or minimization, or any other function that can be expressed in terms of the MV's, CV's, DV's, and/or any other information.

Process 4000 is shown to include obtaining a set of constraints that apply to the CV's, MV's, and/or DV's over the optimization period (step 4006). In some embodiments, step 4006 is performed by constraints generator 3840 as described with reference to FIGS. 38-39 to generate or obtain constraints 3830. Constraints 3830 may define ranges of permissible values (e.g., upper bounds, lower bounds, allowed ranges, etc.), for any of the MV's, CV's, or other variables in the predictive optimization process (e.g., custom variables calculated based on the MV's, CV's and/or DV's). In some embodiments, constraints 3830 are based on operating limits of controllable equipment 3826. For example, constraints 3830 may limit the MV's to values within the minimum and maximum operating limits (e.g., maximum capacities, minimum capacities, etc.) of controllable equipment 3826 to ensure that the predictive optimization produces a feasible result that can realistically be achieved by controllable equipment 3826. In some embodiments, constraints 3830 impose limits on the rate of change of the MV's, CV's, or other variables in the predictive optimization process. For example, constraints 3830 may specify that the value of a given MV, CV, or other variable cannot change by an amount that exceeds a threshold rate of change (e.g., maximum increase or decrease between time steps). In some embodiments, constraints 3830 specify that the value of a given MV, CV, or other variable cannot change direction (e.g., change from increasing to decreasing or change from decreasing to increasing relative to the previous time step) if less than a threshold amount of time has elapsed since the last change in direction occurred. In some embodiments, constraints 3830 impose a limit on the number of changes in direction of a given variable or require the change in the value of the variable between time steps to be substantially uniform (e.g., increase or decrease at a substantially uniform or linear rate), or impose any other limit on the geometry of the trajectory of the variable over time (e.g., an upper limit on the number of linear segments or bend points in the trajectory of the variable over time).

In some embodiments, constraints 3830 require the values of the MV's, CV's, or other variables to be equal to a corresponding target value, or above, below, or within a threshold range of the corresponding target value (e.g., +/−5%, +/−10%, +/−25%, etc.). For example, step 4006 may include receiving target values for one or more of the CV's and generating constraints 3830 that require the CV's to be equal to or within a predetermined threshold of the corresponding target values. In some embodiments, constraints 3830 define relationships between two or more of the MV's, DV's, CV's or other variables (e.g., a given CV must be less than another CV, the product of two CVs must be greater than a threshold, the value of a CV must be equal to a given function of one or more of the MV's and/or DV's, etc.). The relationships defined by constraints 3830 can represent the physical realities of the plant (e.g., constraints that reflect laws of physics, chemistry, etc.) or may represent operational requirements that are desired to be achieved but are not mandated by physical laws.

In some embodiments, the relationship between the inputs to predictor neural network 3816 and the outputs of predictor neural network 3816 are implemented as constraints 3830. For example, predictor neural network 3816 can be used to define or establish a constraint that requires the MV's or MV moves at time step t+1 to be related to the values of the MV's at time step t+1 and the values of the MV's, DV's, and CV's defined by the state data from time step t−w to time step t. In other words, constraints 3830 may require the values of the CV's at time step t+1 to be related to the values of the MV's at time step t+1 and the values of the MV's, DV's, and CV's at previous time steps according to the relationship defined by predictor neural network 3816. In some embodiments, objective function 3828 is a function of the CV's at time t+1 as well as future time steps of the optimization period. Accordingly, the relationships or constraints provided by predictor neural network 3816 allow process 4000 to determine the values of the MV's that optimize objective function 3828 by relating the values of the MV's proposed by optimizer 3818 for the duration the optimization period to the predicted values of the CV's used in objective function 3828.

Step 4006 may include imposing the generated constraints as hard constraints and/or soft constraints. Hard constraints may be implemented as equality constraints or inequality constraints on the predictive optimization process. Hard constraints must be satisfied by any solution produced by optimizer 3818 and cannot be violated when performing the predictive optimization process. Conversely, soft constraints may be implemented as penalties on objective function 3828 (e.g., additional terms in objective function 3828) that impact the overall value of objective function 3828 when the constraint is violated. For example, a soft constraint may be defined as a penalty that is incurred when the value of a CV deviates from its corresponding target value by more than a given amount or otherwise violates a soft constraint. Soft constraints can be violated when performing the predictive optimization process, but optimizer 3818 is discouraged from selecting values of the MV's that result in soft constraint violations because any such violations will affect the value of objective function 3828. However, process 4000 may generate a solution that violates the soft constraints, for example, when no feasible solution exists without violating the soft constraints or if the penalties resulting from the soft constraints do not outweigh the benefits (e.g., other terms of objective function 3828 outweigh the penalties).

Process 4000 is shown to include forecasting trajectories of the DV's over the optimization period (step 4008). In some embodiments, step 4008 is performed by DV forecaster 3838 as described with reference to FIGS. 38-39. For example, step 4008 may include forecasting a trajectory of each of the DV's for the duration of the optimization period. As noted above, DV's may not be directly controllable, but can be predicted or forecasted prior to performing the predictive optimization process in step 4010. Step 4008 may include generating a trajectory or time series of each DV which includes a value of each DV at each time step of the optimization period. In some embodiments, step 4008 includes providing the forecasted DV trajectories in vector or matrix form, as shown in the following equations:

$$DV_1 = [DV_{1,1},\ DV_{1,2},\ DV_{1,3},\ \ldots\ DV_{1,h}]$$
$$DV_2 = [DV_{2,1},\ DV_{2,2},\ DV_{2,3},\ \ldots\ DV_{2,h}]$$
$$\vdots$$
$$DV_m = [DV_{m,1},\ DV_{m,2},\ DV_{m,3},\ \ldots\ DV_{m,h}]$$

where $DV_1$ is a vector containing a value for the first DV at each time step t=1 . . . h, $DV_2$ is a vector containing a value for the second DV at each time step t=1 . . . h, and $DV_m$ is a vector containing a value for the m'th DV at each time step t=1 . . . h, where m is the total number of DV's forecasted.

Step 4008 may use any of a variety of techniques to forecast the values of the DV's over the duration of the optimization period. In some embodiments, step 4008 includes extrapolating the values of the DV's from a historical pattern (e.g., historical values of the DV's prior to the beginning of the optimization period) using linear extrapolation, polynomial extrapolation, conical extrapolation, geometric extrapolation, constant extrapolation (e.g., holding the values of the DV's at their most recent known values), or any other extrapolation technique. In some embodiments, step 4008 includes applying noise to the extrapolated or forecasted values of the DV's. For example, step 4008 may include adding a noise signal (e.g., a random signal, a normally distributed or Gaussian noise signal, etc.) to the extrapolated or forecasted values of the DV's. In some embodiments, step 4008 includes using an auto-regressive model to predict the trajectory of the DV's based on their historical pattern. The DV trajectories generated in step 4008 can be provided as inputs to predictor neural network 3816 for use in predicting the CV's. The DV trajectories generated in step 4008 can also be provided as inputs to step 4010 for use in performing the predictive optimization process.

Process 4000 is shown to include performing a predictive optimization of the objective function subject to the constraints and using the predictor neural network determine optimal trajectories of the set of MV's over the optimization time period (step 4010). In some embodiments, step 4010 is performed by optimizer 3818 as described with reference to FIGS. 38-39. For example, step 4010 may include performing a model predictive control process to determine optimal values of a set of decision variables. In some embodiments, the decision variables include values for each of the MV's at each of the time steps within the optimization period. For example, if the optimization period includes ten time steps (i.e., t=1 . . . 10) and the set of MV's includes three decision variables (i.e., $MV_a$, $MV_b$, and $MV_c$), the set of decision variables may include thirty decision variables (i.e., $MV_{a,1}$, $MV_{a,2}$, . . . , $MV_{a,10}$, $MV_{b,1}$, $MV_{b,2}$, . . . , $MV_{b,10}$, $MV_{c,1}$, $MV_{c,2}$, . . . , $MV_{c,10}$). In some embodiments, the decision variables include a set of MV moves in addition to or in place of the optimal values of the MVs. The MV moves may indicate an amount by which the MV's should be changed relative to their previous values. For example, if step 4010 determines that the optimal value of a given MV at time step t−1 is $x_{t-1}$ and the optimal value of that same MV at time step t is $x_t$, step 4010 may calculate the optimal MV move from time step t−1 to time step t as $x_t−x_{t-1}$.

Step 4010 may include executing the predictive optimization process using any of a variety of optimization techniques. Examples of optimization techniques that can be used in step 4010 include zero-order, first-order, or second-order optimization algorithms. In some embodiments, step 4010 includes performing the optimization process iteratively to converge on the optimal set of values for the MV's or MV moves as the iterations progress.

In some embodiments, step 4010 includes determining the number of iterations to use and/or when to stop the iterative optimization process by monitoring results of the predictive optimization and evaluating whether the results are converging or have sufficiently converged. For example, step 4010 may include determining that the predictive optimization has sufficiently converged if the result of the most recent iteration deviates by less than a threshold (e.g., a percentage change, a change by less than a predetermined amount, etc.) relative to the previous iteration. In response to detecting such convergence, step 4010 may stop the iterative process and use the most recent set of results as the final results. The ability to adaptively determine when to stop the predictive optimization process may ensure that step 4010 includes a sufficient number of iterations to allow for convergence on the optimal values, but does not waste computational effort on unnecessary iterations once the results have sufficiently converged.

Process 4000 is shown to include determining whether there are any additional scenarios to consider (step 4012). If there are any additional scenarios to consider (i.e., the result of step 4012 is "yes"), process 4000 may advance to the next scenario (step 4014) and may repeat steps 4004-4010 for the next scenario. The various scenarios to be considered may be generated by scenarios generator 3836 as described with reference to FIGS. 38-39. The different scenarios may include multiple different and alternative sets of information that are used to define the optimization problem. For example, each of the alternative scenarios may include some or all of the information discussed above including, for example, a set of values for the DV trajectories, constraints 3830, target values of the CV's, or any other information needed to fully define the optimization problem. Each scenario may be a fully defined instance of the predictive optimization problem. However, each of the alternative scenarios may represent slightly different conditions and thus may include different values (relative to the other scenarios) for some or all of the DV trajectories, constraints 3830, target values of the CV's, or any other information needed to fully define the optimization problem.

In some embodiments, repeating steps 4004-4010 for the next scenario includes generating the next scenario by adding noise signals to a base set of the DV trajectories, constraints 3830, or target values of the CV's (e.g., different random noise signals, different normally distributed or Gaussian noise signals, etc.), by applying dropout to the neurons of predictor neural network 3816 (e.g., noise in internal neurons), or otherwise generating different and alternative sets of values for the various inputs to step 4010. By generating alternative scenarios in this manner, process 4000 can mimic the stochastic nature of the target environment and account for a variety of different scenarios that could potentially occur. This may result in a more robust control policy relative to any single scenario. Steps 4004-4012 may be repeated until there are no additional scenarios to consider in step 4012.

If there are no additional scenarios to consider in step 4012 (i.e., the result of step 4012 is "no"), process 4000 may merge the scenario-specific MV trajectories (step 4016). The scenario-specific MV trajectories may include the optimal trajectories of the set of MV's generated in step 4010 for each of the scenarios considered in process 4000. Each set of scenario-specific MV trajectories may be generated by performing an instance of steps 4004-4010 for a corresponding scenario. Each instance of steps 4004-4010 may be performed independently for the corresponding scenario (i.e., independent of the other scenarios) to generate a scenario-specific set of values for the MV's or MV moves that are optimal for that particular scenario.

Merging the scenario-specific MV trajectories in step 4016 may include combining (e.g., average, sum, aggregate, etc.) the scenario-specific results of the predictive optimization process from each instance of step 4010 to generate the final values for the MV's or MV moves. In some embodiments, step 4016 includes combining the scenario-specific results of the predictive optimization process using a weighted average that weights each scenario by the likelihood of that scenario occurring. For example, step 4016 may include calculating an amount by which the inputs for each scenario (i.e., the DV trajectories, constraints 3830, target values of the CV's, etc.) deviate from an average or mean of the set of scenarios (e.g., as a standard deviation, variance, etc.). Step 4016 may include assigning a greater weight to the scenarios that are closer to the average or mean, and a lower weight to the scenarios that are further from the average or mean (e.g., using a normally distributed set of weights that follow a bell-shaped curve centered at that average or mean scenario). One example of an equation that can be used to combine the scenario-specific MV trajectories in step 4016 is:

$$MV_t = \sum_{i=1}^{p} w_i MV_{i,t}$$

where $MV_t$ is the final value of a given MV at time t, $MV_{i,t}$ is the scenario-specific value of that same MV for the ith scenario generated by performing the predictive optimization using the scenario-specific inputs for the ith scenario, $w_i$ is the weight assigned to the ith scenario, and p is the total number of scenarios. The set of weights $w_1 \ldots w_p$ may sum to one in some embodiments. This same equation can be applied to each of the MV's in the MV trajectories and at each time step of the optimization period to combine the results of the scenario-specific predictive optimization processes into a final result that accounts for all of the different and alternative scenarios.

Process 4000 is shown to include using the optimal values of the MV's for a first time step of the optimization period to generate control signals for the first time step (step 4018). In some embodiments, step 4018 is performed by control signal generator 3820 as described with reference to FIGS. 38-39. For example, at time step t=1, steps 4004-4016 can be performed to generate a set of MV trajectories and/or MV moves for each time step from time step t=1 to time step t=h, where h is the total number of time steps within the optimization period. The MV trajectories can be provided in vector or matrix form, as shown in the following equations:

$$MV_1 = [MV_{1,1}, \ MV_{1,2}, \ MV_{1,3}, \ \ldots \ MV_{1,h}]$$
$$MV_2 = [MV_{2,1}, \ MV_{2,2}, \ MV_{2,3}, \ \ldots \ MV_{2,h}]$$
$$\vdots$$
$$MV_n = [MV_{n,1}, \ MV_{n,2}, \ MV_{n,3}, \ \ldots \ MV_{n,h}]$$

where $MV_1$ is a vector containing a value for the first MV or MV move at each time step t=1 ... h, $MV_2$ is a vector containing a value for the second MV or MV move at each time step t=1 ... h, and $MV_n$ is a vector containing a value for the n'th MV or MV move at each time step t=1 ... h, where n is the total number of MV's in the predictive optimization process. Step 4020 may include using the optimal values of the MV's or MV moves at time step t=1 and/or the optimal MV moves at time step t=1 to generate the control signals for controllable equipment 3826 at time step t=1. In some embodiments, step 4018 may ignore the optimal values of the MV's and/or MV moves for time steps t=2 ... h or store the optimal values of the MV's and/or MV moves for time steps t=2 ... h for later use.

Process 4000 is shown to include shifting the optimization period forward in time by one time step (step 4020) and returning to step 4004. In some embodiments, process 4000 includes repeating steps 4004-4020 at each time step to generate a new trajectory of values for each of the MV's and/or MV moves. Each trajectory may include a value of each of the MV's and/or MV moves for each of the time steps within the optimization period. For example, after shifting the optimization period forward in time by one time step, the optimization period may begin at time step t=2 and end at time step h+1. Steps 4004-4020 may be repeated to generate a set of MV trajectories and/or MV moves for each time step from time step t=2 to time step t=h+1, where h is the total number of time steps within the optimization period. The optimization period still has the same number of time steps, but is shifted forward in time relative to the previous optimization. The MV trajectories can be provided in vector or matrix form, as shown in the following equations:

$$MV_1 = [MV_{1,2}, \ MV_{1,3}, \ MV_{1,4}, \ \ldots \ MV_{1,h+1}]$$
$$MV_2 = [MV_{2,2}, \ MV_{2,3}, \ MV_{2,4}, \ \ldots \ MV_{2,h+1}]$$
$$\vdots$$
$$MV_n = [MV_{n,2}, \ MV_{n,3}, \ MV_{n,4}, \ \ldots \ MV_{n,h+1}]$$

where $MV_1$ is a vector containing a value for the first MV or MV move at each time step t=2 ... h+1, $MV_2$ is a vector containing a value for the second MV or MV move at each time step t=2 ... h+1, and $MV_A$ is a vector containing a value for the n'th MV or MV move at each time step t=2 ... h+1, where n is the total number of MV's in the predictive optimization process. When performing step 4018 the second time, process 4000 may use the optimal values of the MV's or MV moves at time step t=2 and/or the optimal MV moves at time step t=2 to generate the control signals for controllable equipment 3826 at time step t=2. Process 4000 may ignore the optimal values of the MV's and/or MV moves for time steps t=3 ... h+1 or store the optimal values of the MV's and/or MV moves for time steps t=3 ... h+1 for later use.

Steps 4004-4020 can be repeated iteratively by shifting the optimization period forward in time and performing another run of the predictive optimization process to provide control signal generator 3820 with an updated trajectory of MV's and/or MV moves at the beginning of each time step. Each time an updated trajectory of MV's and/or MV moves is received, step 4018 can implement the control decisions for the first time step in the updated trajectory (i.e., use the values of the MV's and/or MV moves for the first time step to generate the control signals for controllable equipment 3826) and ignore the control decisions for the remaining time steps in the updated trajectory. When another updated trajectory is received at the beginning of the next time step, step 4018 can overwrite the previously received trajectories of the MV's and/or MV moves with the most recent trajectories generated in step 4010.

As an alternative to overwriting the previously received trajectories each time a new trajectory is received, step 4018 may include storing in memory the full trajectories of the MV's and/or MV moves received at each time step. Step 4018 may include merging the updated trajectory with the previously generated trajectory or trajectories such that the value of a MV or MV move for a given time step evolves as additional trajectories containing that time step are received. For example, step 4018 may include calculating an average of all of the values of a given MV received for a given time step and use the average value to generate the control signals for controllable equipment 3826. In various embodiments, control signal generator 3820 can calculate the average value as simple average or a weighted average (e.g., an exponentially weighted average) which weighs more recently received trajectories more heavily.

By the time a given time step (e.g., time step t=x) becomes the first time step within a newly generated trajectory, process 4000 will have generated h trajectories that include the given time step (i.e., an initial trajectory that includes time step t=x as the last time step, an updated trajectory that includes time step t=x as the penultimate time step, etc.), where h is the number of time steps within the optimization period and the hth trajectory includes time step t=x as the first time step. Each successive trajectory may be shifted forward in time by one time step such that the given time step moves from the end of the trajectory (i.e., a trajectory ending at time step t=x) to the beginning of the trajectory (i.e., a trajectory beginning at time step t=x). Step 4018 can merge or combine the h values of the MV or MV move for the given time step t=x to calculate the value of the MV or MV move that is used to generate the control signals for controllable equipment 3826.

Referring now to FIG. 41, a block diagram of a process 4100 illustrating the functionality of predictor neural network 3816 and optimizer 3818 is shown, according to an exemplary embodiment. Predictor neural network 3816 can be configured to predict a set of CV's that will result from a set of MV's or MV moves at a given time based on the state of the plant during a time window leading up to the given time. The set of MV's or MV moves at the given time can be provided by optimizer 3818 and may be decision variables in the predictive optimization process. The state of the plant leading up to the given time may be defined by the trajectories of the MV's, CV's, and/or DV's within a time window leading up to the given time (e.g., time series or vectors of each of the MV's, CV's, and/or DV's containing a value for each of the MV's, CV's, and/or DV's at each time step within the time window). Optimizer 3818 can adjust the values of the MV's or MV moves when performing the predictive optimization process and can use predictor neural network 3816 to predict the values of the CV's that will result from the set of MV's or MV moves, in combination with the state of the plant leading up to the given time.

Process 4100 is shown to include a first stage 4102, a second stage 4104, and an h'th stage 4150. Any number of stages may occur between the second stage 4104 and the h'th stage 4150. In the first stage 4102, optimizer 3818 may provide predictor neural network 3816 with a set of MV's or MV moves for time step t+1. Predictor neural network 3816 may also receive the trajectories of the MV's, CV's, and/or DV's for a time window beginning at time step t−w and ending at time step t, where w is the duration of the time window. Predictor neural network 3816 may use these inputs to predict the values of the CV's at time step t+1. The set of MV's or MV moves at time step t+1 proposed by optimizer 3818 and the corresponding values of the CV's at time step t+1 output from predictor neural network 3816 may be appended to the trajectories of the MV's and the CV's for use in the next stage of process 4100.

The second stage 4104 is similar to the first stage 4102, but shifted forward in time by one time step. For example, in the second stage 4104, optimizer 3818 may provide predictor neural network 3816 with a set of MV's or MV moves for time step t+2. Predictor neural network 3816 may also receive the trajectories of the MV's, CV's, and/or DV's for a time window beginning at time step t+1−w and ending at time step t+1, where w is the duration of the time window. Predictor neural network 3816 may use these inputs to predict the values of the CV's at time step t+2. The set of MV's or MV moves at time step t+2 proposed by optimizer 3818 and the corresponding values of the CV's at time step t+2 output from predictor neural network 3816 may be appended to the trajectories of the MV's and the CV's for use in the next stage of process 4100.

Process 4100 may repeat these steps for each subsequent stage, advancing forward in time by one time step with each subsequent stage, until reaching the final stage 4150. In the final stage 4150, optimizer 3818 may provide predictor neural network 3816 with a set of MV's or MV moves for time step t+h, where h is the total number of stages, which may be equivalent to the number of time steps within the optimization period. Predictor neural network 3816 may also receive the trajectories of the MV's, CV's, and/or DV's for a time window beginning at time step t+h−1−w and ending at time step t+h−1, where w is the duration of the time window. Predictor neural network 3816 may use these inputs to predict the values of the CV's at time step t+h.

Upon completing the final stage 4150, optimizer 3818 may use the values of the MV's or MV moves for each time step and the predicted values of the CV's for each time step to evaluate objective function 3828. Optimizer 3818 may then adjust the proposed trajectories of the MV's and iteratively repeat process 4100 until objective function 3828 has sufficiently converged upon an optimal value. Upon reaching convergence, optimizer 3818 may output the values of the MV's or MV moves from the most recent iteration of process 4100 to control signal generator 3820 for use in generating the control signals for controllable equipment 3826.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for automatic operation of a coker, the control system comprising:
    a drum feeder operable to modulate a feed of oil into a coke drum of the coker;

a controller comprising a processing circuit configured to:
obtain an objective function that defines a control objective as a function of one or more controlled variables affected by modulating the feed of oil into the coke drum;
use a predictive model and the objective function to generate a target coker feed rate indicating a target rate at which to feed the oil into the coke drum, the predictive model configured to predict values of the one or more controlled variables predicted to result from the target coker feed rate; and
operate the drum feeder using the target coker feed rate to modulate the feed of oil into the coke drum.

2. The control system of claim 1, wherein the control objective defined by the objective function is a function of a target coke rate indicating a target rate at which to accumulate coke within the coke drum.

3. The control system of claim 1, wherein:
the controller is configured to generate the target coker feed rate by performing a model predictive control (MPC) process using the predictive model and the objective function;
the predictive model defines a relationship between the target coker feed rate and the values of the one or more controlled variables predicted to result from the target coker feed rate; and
performing the MPC process comprises optimizing the objective function to generate an optimal value of the target coker feed rate which optimizes the control objective according to the relationship defined by the predictive model.

4. The control system of claim 1, wherein:
the predictive model comprises a predictor neural network configured to predict the values of the one or more controlled variables based on values of one or more manipulated variables comprising the target coker feed rate; and
the controller is configured to generate the target coker feed rate by:
training a controller neural network using the predictor neural network and the objective function; and
using the controller neural network to generate the values of the one or more manipulated variables comprising the target coker feed rate based on a current state of the coker.

5. The control system of claim 1, wherein:
the predictive model comprises a predictor neural network configured to generate a gains matrix based on a current state of the coker; and
the controller is configured to generate the target coker feed rate by:
using the gains matrix to predict the values of the one or more controlled variables predicted to result from values of one or more manipulated variables comprising the target coker feed rate; and
performing an optimization process to determine optimal values of the one or more manipulated variables comprising the target coker feed rate according to a relationship between the values of the one or more controlled variables and the values of the one or more manipulated variables defined by the gains matrix.

6. The control system of claim 1, wherein:
the predictive model comprises a predictor neural network configured to generate a gains matrix based on a current state of the coker; and
the controller is configured to generate the target coker feed rate by:
training a controller neural network using the gains matrix to predict the values of the one or more controlled variables predicted to result from values of one or more manipulated variables comprising the target coker feed rate; and
using the controller neural network to generate the values of the one or more manipulated variables comprising the target coker feed rate based on the current state of the coker.

7. The control system of claim 1, wherein:
the predictive model comprises a predictor neural network configured to generate a plurality of gains matrices using a set of historical state data for the coker; and
the controller is configured to generate the target coker feed rate by:
training a controller neural network using the set of gains matrices to predict the values of the one or more controlled variables predicted to result from values of one or more manipulated variables comprising the target coker feed rate; and
using the controller neural network to generate the values of the one or more manipulated variables comprising the target coker feed rate based on a current state of the coker.

8. A controller for automatic operation of a coker, the controller comprising a processing circuit configured to:
obtain an objective function that defines a control objective as a function of one or more controlled variables affected by modulating a feed of oil into a coke drum of the coker;
use a predictive model and the objective function to generate a target coker feed rate indicating a target rate at which to feed the oil into the coke drum, the predictive model configured to predict values of the one or more controlled variables predicted to result from the target coker feed rate; and
operate a drum feeder using the target coker feed rate to modulate the feed of oil into the coke drum.

9. The controller of claim 8, wherein the control objective defined by the objective function is a function of a target coke rate indicating a target rate at which to accumulate coke within the coke drum.

10. The controller of claim 8, wherein:
the processing circuit is configured to generate the target coker feed rate by performing a model predictive control (MPC) process using the predictive model and the objective function;
the predictive model defines a relationship between the target coker feed rate and the values of the one or more controlled variables predicted to result from the target coker feed rate; and
performing the MPC process comprises optimizing the objective function to generate an optimal value of the target coker feed rate which optimizes the control objective according to the relationship defined by the predictive model.

11. The controller of claim 8, wherein:
the predictive model comprises a predictor neural network configured to predict the values of the one or more controlled variables based on values of one or more manipulated variables comprising the target coker feed rate; and the processing circuit is configured to generate the target coker feed rate by:
   training a controller neural network using the predictor neural network and the objective function; and
   using the controller neural network to generate the values of the one or more manipulated variables comprising the target coker feed rate based on a current state of the coker.

12. The controller of claim 8, wherein:
the predictive model comprises a predictor neural network configured to generate a gains matrix based on a current state of the coker; and
the processing circuit is configured to generate the target coker feed rate by:
   using the gains matrix to predict the values of the one or more controlled variables predicted to result from values of one or more manipulated variables comprising the target coker feed rate; and
   performing an optimization process to determine optimal values of the one or more manipulated variables comprising the target coker feed rate according to a relationship between the values of the one or more controlled variables and the values of the one or more manipulated variables defined by the gains matrix.

13. The controller of claim 8, wherein:
the predictive model comprises a predictor neural network configured to generate a gains matrix based on a current state of the coker; and
the processing circuit is configured to generate the target coker feed rate by:
   training a controller neural network using the gains matrix to predict the values of the one or more controlled variables predicted to result from values of one or more manipulated variables comprising the target coker feed rate; and
   using the controller neural network to generate the values of the one or more manipulated variables comprising the target coker feed rate based on the current state of the coker.

14. The controller of claim 8, wherein:
the predictive model comprises a predictor neural network configured to generate a plurality of gains matrices using a set of historical state data for the coker; and
the processing circuit is configured to generate the target coker feed rate by:
   training a controller neural network using the set of gains matrices to predict the values of the one or more controlled variables predicted to result from values of one or more manipulated variables comprising the target coker feed rate; and
   using the controller neural network to generate the values of the one or more manipulated variables comprising the target coker feed rate based on a current state of the coker.

15. A method for automatic operation of a coker, the method comprising:
   obtaining an objective function that defines a control objective as a function of one or more controlled variables affected by modulating one or more manipulated variables provided as inputs to the coker;
   using a predictive model and the objective function to generate values of the one or more manipulated variables, the predictive model configured to predict values of the one or more controlled variables predicted to result from the values of the one or more manipulated variables; and
   operating controllable equipment of the coker to modulate the one or more manipulated variables provided as inputs to the coker.

16. The method of claim 15, comprising generating the values of the one or more manipulated variables by performing a model predictive control (MPC) process using the predictive model and the objective function;
   wherein the predictive model defines a relationship between the values of the one or more manipulated variables and the values of the one or more controlled variables predicted to result from the values of the one or more manipulated variables; and
   wherein performing the MPC process comprises optimizing the objective function to generate optimal values of the one or more manipulated variables which optimize the control objective according to the relationship defined by the predictive model.

17. The method of claim 15, wherein:
the predictive model comprises a predictor neural network configured to predict the values of the one or more controlled variables based on the values of the one or more manipulated variables; and
generating the values of the one or more manipulated variables comprises:
   training a controller neural network using the predictor neural network and the objective function; and
   using the controller neural network to generate the values of the one or more manipulated variables based on a current state of the coker.

18. The method of claim 15, wherein:
the predictive model comprises a predictor neural network configured to generate a gains matrix based on a current state of the coker; and
generating the values of the one or more manipulated variables comprises:
   using the gains matrix to predict the values of the one or more controlled variables predicted to result from the values of the one or more manipulated variables; and
   performing an optimization process to determine optimal values of the one or more manipulated variables according to a relationship between the values of the one or more controlled variables and the values of the one or more manipulated variables defined by the gains matrix.

19. The method of claim 15, wherein:
the predictive model comprises a predictor neural network configured to generate a gains matrix based on a current state of the coker; and
generating the values of the one or more manipulated variables comprises:
   training a controller neural network using the gains matrix to predict the values of the one or more controlled variables predicted to result from the values of one or more manipulated variables; and
   using the controller neural network to generate the values of the one or more manipulated variables based on the current state of the coker.

20. The method of claim 15, wherein:
the predictive model comprises a predictor neural network configured to generate a plurality of gains matrices using a set of historical state data for the coker; and
generating the values of the one or more manipulated variables comprises:
   training a controller neural network using the set of gains matrices to predict the values of the one or more controlled variables predicted to result from the values of one or more manipulated variables; and using the controller neural network to generate the values of the one or more manipulated variables based on a current state of the coker.

* * * * *